US011871823B2

(12) United States Patent
James, Jr.

(10) Patent No.: US 11,871,823 B2
(45) Date of Patent: Jan. 16, 2024

(54) MAGNETIC TOOL CARRIER

(71) Applicant: Lewis William James, Jr., Paso Robles, CA (US)

(72) Inventor: Lewis William James, Jr., Paso Robles, CA (US)

( * ) Notice: Subject to any disclaimer, the term of this patent is extended or adjusted under 35 U.S.C. 154(b) by 408 days.

(21) Appl. No.: 16/261,416

(22) Filed: Jan. 29, 2019

(65) Prior Publication Data

US 2019/0159564 A1 May 30, 2019

Related U.S. Application Data

(60) Division of application No. 14/883,442, filed on Oct. 14, 2015, now Pat. No. 10,221,005, which is a continuation-in-part of application No. 14/511,978, filed on Oct. 10, 2014, now Pat. No. 10,279,980, which is a continuation-in-part of application No. 13/931,050, filed on Jun. 28, 2013, now abandoned,
(Continued)

(51) Int. Cl.

| | |
|---|---|
| ***A45C 13/02*** | (2006.01) |
| ***F25D 3/06*** | (2006.01) |
| ***B65D 81/38*** | (2006.01) |
| ***F25D 23/06*** | (2006.01) |
| ***F25D 3/08*** | (2006.01) |
| ***A45C 13/10*** | (2006.01) |
| *B67D 3/00* | (2006.01) |

(52) U.S. Cl.
CPC .......... *A45C 13/02* (2013.01); *A45C 13/1069* (2013.01); *B65D 81/3813* (2013.01); *F25D 3/06* (2013.01); *F25D 3/08* (2013.01); *F25D 23/06* (2013.01); *F25D 23/065* (2013.01); *F25D 23/066* (2013.01); *F25D 23/067* (2013.01); *B65D 81/3888* (2013.01); *B65D 2313/04* (2013.01); *B67D 3/0067* (2013.01); *B67D 2210/00144* (2013.01); *F25D 2400/12* (2013.01); *Y10T 29/49826* (2015.01); *Y10T 29/49963* (2015.01)

(58) Field of Classification Search
CPC ........... A45C 13/02; A45C 13/00; A45C 3/00; A45C 13/1069; B65D 81/3888; B65D 81/3813; B65D 81/38; B65D 81/3823; B65D 2313/04
USPC ............ 206/818; 220/592.2, 592.02, 592.09, 220/592.1, 592.25, 483; 383/38, 40
See application file for complete search history.

(56) References Cited

U.S. PATENT DOCUMENTS 3,007,568 A * 11/1961 Kurland ............... A45C 11/325
206/37.1
3,237,327 A * 3/1966 Griggs ...................... G09F 3/18
211/DIG. 1

(Continued)

*Primary Examiner* — Andrew D Perreault
(74) *Attorney, Agent, or Firm* — Larry E. Henneman, Jr.; Henneman & Associates, PLC

(57) ABSTRACT

A novel thermally insulated enclosure includes an insulated wall and a magnet assembly coupled thereto for mounting the insulated enclosure to ferromagnetic structures. In a particular embodiment, the magnet assembly includes a plurality of magnets coupled to the insulated wall. In another particular embodiment, the magnet assembly is a removable magnetic device that can be connected and disconnected from the insulated enclosure. In another particular embodiment, the magnet assembly is a removable magnet carrier that can be incorporated into the structure of the insulated enclosure.

16 Claims, 47 Drawing Sheets

Related U.S. Application Data which is a continuation-in-part of application No. 13/192,350, filed on Jul. 27, 2011, now abandoned.

(56) References Cited

U.S. PATENT DOCUMENTS

| | | | | | |
|---|---|---|---|---|---|
| 4,469,256 | A * | 9/1984 | McEwen | B62J 9/25 | 224/463 |
| 5,001,779 | A * | 3/1991 | Eggert | B60R 11/02 | 361/814 |
| 5,490,607 | A * | 2/1996 | Hsieh | A47G 21/14 | 220/232 |
| 5,897,040 | A * | 4/1999 | Ward | B60R 11/0241 | 224/183 |
| 6,895,642 | B2 * | 5/2005 | Huang | A47G 1/17 | 248/205.5 |
| 2009/0250576 | A1 * | 10/2009 | Fullerton | G09F 3/00 | 248/206.5 |
| 2009/0289090 | A1 * | 11/2009 | Fullerton | A45F 5/02 | 224/183 |
| 2014/0182088 | A1 * | 7/2014 | Roberts | B42F 1/06 | 24/303 |

* cited by examiner

MAGNETIC TOOL CARRIER

RELATED APPLICATIONS

This application is a divisional of U.S. patent application Ser. No. 14/883,442, filed Oct. 14, 2015 by the same inventor, which is a continuation-in-part of copending U.S. patent application Ser. No. 14/511,978, filed on Oct. 10, 2014 also by the same inventor, which is a continuation-in-part of U.S. patent application Ser. No. 13/931,050, filed on Jun. 28, 2013, now abandoned, by the same inventor, which is a continuation-in-part of U.S. patent application Ser. No. 13/192,350, filed on Jul. 27, 2011, now abandoned, by the same inventor, all of which are incorporated herein by reference in their entireties.

BACKGROUND OF THE INVENTION

Field of the Invention

This invention relates generally to thermally insulated enclosures, and more particularly to systems for mounting thermally insulated enclosures.

Description of the Background Art

There has long been a high demand for portable insulated containers such as, for example, coolers, food and beverage containers, water coolers, lunch boxes, etc. Such containers are frequently transported in highly dynamic and, therefore, unstable environments such as, for example, on off-road vehicles, boats, construction trailers, heavy construction equipment, etc. When transporting containers in such environments, it is almost always necessary that they be secured down in order to prevent any problems associated with tipping and/or sliding. Doing so typically entails securing the enclosure to a stable structure via some suitable fastener (e.g., elastic cord, rope, strap, etc).

Although tipping and sliding problems can be prevented by fastening the enclosure to a stable structure via mechanical fasteners, there are disadvantages to doing so. For example, the enclosure can only be secured in locations where there are available structures (e.g., eye bolt) for the mechanical fasteners to engage. Another disadvantage to the current solution is the inconvenience associated with having to make sure the enclosure is accompanied by the fastener. Not only is it inconvenient to always keep a fastener on hand, but it is also inconvenient to have to remember to secure the enclosure. For example, forgetting to secure lunchboxes down on work trailers is a very common problem that often results in it falling off while the trailer is moving. As another example, the current solutions also impose challenges on heavy equipment operators because they typically have to remain on the equipment for long periods of time and, therefore, have to keep their coolers nearby. This is problematic in that there are typically not very many convenient structures to which an enclosure can be mounted via fasteners.

In efforts to alleviate the aforementioned problems, manufacturers have incorporated various types of slip preventative features into the design of many insulated enclosures. For example, friction promoting features (e.g., rubber, treads, etc) are often formed on the bottom surfaces of insulated containers.

Although friction promoting features can increase the amount of friction between the bottom surface of the container and the underlying surface, it is typically insignificant in such unstable environments.

What is needed, therefore, is an insulated enclosure that can be secured to a structure without additional fasteners. What is also needed is an insulated enclosure that can be secured to structures where no fastener structures are available. What is also needed is an insulated enclosure that is simpler to secure onto structures.

SUMMARY

The present invention overcomes the problems associated with the prior art by providing a thermally insulated enclosure having a magnet assembly that facilitates magnetic coupling of the insulated enclosure to a ferromagnetic structure. The invention facilitates, for example, securing ice chests, water coolers, and the like to vehicles and/or other equipment or structures.

In an example embodiment, a thermally insulated enclosure includes an insulated wall, an opening, and a magnet assembly. The insulated wall includes a first surface defining an interior of the enclosure and a second surface defining an exterior of the enclosure. The opening is closable and defines a passageway between the exterior of the enclosure and the interior of the enclosure. The magnet assembly is coupled to the insulated wall, and provides an attractive magnetic force sufficient to fixedly secure the thermally insulated enclosure to a ferromagnetic structure. Optionally, the attractive magnetic force of the magnet assembly is sufficient to fixedly secure the thermally insulated enclosure to a vertical surface of ferromagnetic structures. In some disclosed embodiments, the attractive magnetic force of the magnet assembly is sufficient to fixedly secure the thermally insulated enclosure to a vertical surface of a ferromagnetic structure when the thermally insulated enclosure is full of liquid.

In one example embodiment, the magnet assembly includes at least one magnet mounted to the second surface of the insulated wall (exterior of enclosure). In an alternate embodiment, the magnet assembly includes at least one magnet mounted to the first surface of the insulated wall (interior of enclosure), and the thermally insulated enclosure is an insulated bag. In another alternate embodiment, the magnet assembly includes at least one magnet mounted between the first surface of the insulated wall and the second surface of the insulated wall (within the insulated wall).

In an example embodiment, a portion of the insulated wall defines a bottom region of the thermally insulated enclosure, and the magnet assembly is disposed at the bottom region of the thermally insulated enclosure. In another example embodiment, a portion of the insulated wall defines a side region of the thermally insulated enclosure, and the magnet assembly is disposed at the side region of the thermally insulated enclosure. Optionally, the magnet assembly includes at least one magnet coupled to the side region of the thermally insulated enclosure and at least one magnet coupled to the bottom region of the thermally insulated enclosure.

In an example embodiment, the magnet assembly is removable from the thermally insulated enclosure. The magnet assembly includes a rigid support structure adapted to engage the exterior of the enclosure. At least one magnet is fixedly coupled to the rigid support structure, and a fastening device is coupled to the rigid support structure. The fastening device is operative to fixedly couple the insulated wall to the rigid support member. Optionally, the magnet assembly is adapted to universally mount objects to ferromagnetic structures.

In a particular embodiment, the rigid support structure is a plate having a top surface and an opposite bottom surface. The top surface is adapted to engage the exterior of the insulated wall, and the at least one magnet of the magnet assembly is fixedly attached to the bottom surface of the plate. In one example embodiment, the fastening device is a strap. In another embodiment, the rigid support structure is a molded structure formed around at least a portion of the at least one magnet.

Optionally, the thermally insulated enclosure is collapsible. For example, in one particular embodiment, the insulated enclosure is a bag. In another example embodiment, the insulated enclosure is a collapsible chest. The collapsible chest includes a removable insert that has an inner surface defining at least a portion of the interior of the thermally insulated enclosure. The thermally insulated enclosure includes a collapsible outer shell, which has an outer surface defining at least a portion of the exterior of the thermally insulated enclosure, and the collapsible outer shell is adapted to receive the removable insert. The removable insert and the collapsible outer shell form components of the insulated wall, and the magnet assembly is coupled to a portion the collapsible outer shell. Optionally, the portion of the collapsible outer shell coupled to the magnet assembly is formed by molding material directly around at least a portion of the magnet assembly.

In another example embodiment, the thermally insulated enclosure is rigid. The insulated wall includes a first rigid layer, a second rigid layer, and an insulation layer. The first rigid layer has an outer surface and an opposite inner surface. The outer surface of the first rigid layer defines the exterior of the thermally insulated enclosure. The second rigid layer has an outer surface and an opposite inner surface. The inner surface of the second rigid layer defines the interior of the thermally insulated enclosure. The insulation layer is sandwiched between the inner surface of the first rigid layer and the outer surface of the second rigid layer. The magnet assembly includes at least one magnet fixedly coupled to the outer surface of the first rigid layer. Alternatively, the magnet assembly includes at least one magnet disposed between the inner surface of the first rigid layer and the insulation layer. As another alternative, a portion of the first rigid layer is molded directly on at least a portion of the magnet assembly.

In yet another example embodiment, the thermally insulated enclosure is a container adapted to dispense potable liquids (e.g., a water cooler). A portion of the insulated wall defines a bottom region of the water cooler, and the magnet assembly is removably coupled to the bottom region of the water cooler. The magnet assembly is operative to fixedly mount the water cooler on horizontal surfaces of ferromagnetic structures. Alternatively, a portion of the insulated wall defines a side region of the water cooler, the magnet assembly is removably coupled to the side region of the water cooler, so that the magnet assembly is operative to fixedly mount the water cooler to a vertical surface of a ferromagnetic structure.

The insulated wall of the water cooler includes a first rigid layer, a second rigid layer, and an insulation layer. The first rigid layer has an outer surface and an opposite inner surface. The outer surface of the first rigid layer defines the exterior of the thermally insulated enclosure. The second rigid layer has an outer surface and an opposite inner surface. The inner surface of the second rigid layer defines the interior of the thermally insulated enclosure. The insulation layer is sandwiched between the inner surface of the first rigid layer and the outer surface of the second rigid layer.

The magnet assembly is fixedly coupled to the outer surface of the first rigid layer of the insulated wall of the water cooler. Alternatively, the magnet assembly includes at least one magnet disposed between the inner surface of the first rigid layer and the insulation layer. As another alternative, a portion of said first rigid layer is molded directly on at least a portion of said magnet assembly. The magnet assembly can be coupled to a bottom region of the insulated wall and/or a side region of said insulated wall.

Each of the disclosed example embodiments includes means for coupling a thermally insulated enclosure to a ferromagnetic substrate.

A method for manufacturing a thermally insulated enclosure is also disclosed. The method includes providing an exterior structure, a plurality of magnets, an insulation structure, and an interior structure. The exterior structure includes an exterior surface and an interior surface. The interior surface of the exterior structure defines an inner region of the exterior structure. The insulation structure includes an exterior surface and an interior surface. The interior surface of the insulation structure defines an inner region of the insulation structure. The interior structure includes an exterior surface and an interior surface. The interior surface of the interior structure defines an inner region of the thermally insulated enclosure. The method further includes positioning the plurality of magnets in the inner region of the exterior structure. The method further includes positioning the insulation structure in the inner region of the exterior structure such that the plurality of magnets is disposed between the exterior structure and the insulation structure. The method further includes positioning the interior structure in the inner region of the insulation structure. The plurality of magnets and the insulation structure are disposed between the exterior structure and the interior structure. The method further includes coupling the interior structure to the exterior structure.

In a particular method, the exterior structure defines a plurality of screw holes, the exterior surface of the interior structure defines a plurality of screw bosses coaxially aligned with the plurality of screw holes, and the method further comprises providing a plurality screws disposed through the screw holes and into the plurality of screw bosses. In a more particular example, each of the magnets defines a through-hole and each of the screws is disposed through a respective one of the through-holes of the magnets. The insulation structure also defines a plurality of through-holes and each of the screw bosses is disposed in a respective one of the through-holes of the insulation structure.

Optionally, each of the screws can be fitted with a suction cup, which facilitates mounting the thermally insulated enclosure on a non-magnetic structure. As another option, a separate set of screws having suction cups connected thereto can be provided, such that the original screws and the suction cup screws can be interchanged depending on the surface upon which the thermally insulated enclosure is to be mounted.

In another particular method, the exterior structure defines a snap feature, the interior structure defines a complementary snap feature adapted to engage the snap feature of the exterior structure, and the exterior structure and the interior structure are coupled together via engaging the snap feature of the exterior structure and the complementary snap feature of the interior structure. In a more particular example, at least one of the snap feature and the complementary snap feature is a lip and the other of the snap features and the complementary snap features is a lip engaging structure. The lip is formed on the interior surface of the exterior structure.

In another particular method, the interior surface of the exterior structure defines a plurality of magnet seats. Furthermore, the method includes seating each of the plurality of magnets in a respective one of the plurality of magnet seats.

In another particular example of the method, each of the plurality of magnets includes a shunt structure.

In another particular example of the method, each of the plurality of magnets is annular shaped.

In another particular example of the method, each of the plurality of magnets is located at a different bottom corner of the thermally insulated enclosure. In a more specific example, the step of providing the plurality of magnets includes providing four discrete magnets.

In another particular example of the method, the exterior structure is a rigid structure. In a more specific example, the exterior structure is a molded polymer structure.

In another particular example of the method, the interior structure is a rigid structure. In a more specific example, the interior structure is a molded polymer structure.

In another particular example of the method, the insulation structure is a rigid structure. In a more specific example, the insulation structure is a foam structure.

In another particular example of the method, the exterior structure is a rigid structure that is formed before the thermally insulated enclosure is assembled, the interior structure is a rigid structure that is formed before the thermally insulated enclosure is assembled, and the insulation structure is a rigid structure formed before the thermally insulated enclosure is assembled.

In other embodiments, advantages are provided by fixing magnets in a carrier and incorporating the magnet carrier into the design of the thermally insulated enclosure. An example method for manufacturing a magnetic, thermally insulated enclosure includes providing a thermally insulated enclosure, providing a magnet carrier having a substrate and a plurality of magnets fixed to the substrate, and coupling the magnet carrier to the thermally insulated enclosure. Optionally, the step of coupling the magnet carrier to the thermally insulated enclosure can include coupling the magnet carrier to the thermally insulated enclosure during the process of manufacturing the thermally insulated enclosure. Alternatively, the step of coupling the magnet carrier to the thermally insulated enclosure can include coupling the magnet carrier to the thermally insulated enclosure after the process of manufacturing the thermally insulated enclosure.

In an example method, the step of providing the thermally insulated enclosure includes providing a thermally insulated enclosure having pliable sidewalls. However, the sidewalls and/or bottom wall can be rigid.

The magnet carrier can be made in different ways. In one advantageous method, the magnets can be molded into the substrate. In another method, the magnets can be mechanically fixed to the substrate.

Another method of manufacturing a thermally insulated enclosure with a liner is disclosed. The method includes providing a liner adapted to fit within the thermally insulated enclosure, placing the magnet carrier within the thermally insulated enclosure, and placing the liner within the thermally insulated enclosure with the magnet carrier disposed between a bottom wall or a side wall of the thermally insulated enclosure and the liner.

Another method of manufacturing a thermally insulated enclosure without a liner is disclosed. In that example method, the step of coupling the magnet carrier to the thermally insulated enclosure includes inserting the magnet carrier into one of the bottom wall or a side wall of the thermally insulated enclosure. Optionally, the step of inserting the magnet carrier into one of the bottom wall or the side wall of the thermally insulated enclosure includes removably inserting the magnet carrier through an opening in the bottom wall or the side wall. The opening is adapted to facilitate the insertion and removal of the magnet carrier. The magnet carrier can be positioned within the bottom wall or a side wall of the thermally insulated enclosure but outside of a thermally insulating layer of the bottom wall or side wall with respect to an interior of the thermally insulated enclosure. Beneficially, the insulating layer is then not interposed between the magnets and an external ferromagnetic surface.

Other example magnetic, thermally insulated enclosures are disclosed. One example includes a thermally insulating enclosure, a plurality of plurality of magnets, and a magnet carrier coupled to the magnets and to the thermally insulating enclosure, thereby coupling the magnets to the thermally insulating enclosure. The magnet carrier can be permanently coupled to the thermally insulating enclosure. Alternatively, the magnet carrier can be removably coupled to the thermally insulating enclosure. The thermally insulating enclosure can include a plurality of pliable side walls or, optionally, one or more rigid walls.

In one embodiment, the magnet carrier includes a substrate, and the plurality of magnets are molded into the substrate. In another embodiment, the magnet carrier includes a substrate, and the plurality of magnets are mechanically fastened the substrate.

Another magnetic, thermally insulated enclosure includes a liner adapted to fit with the thermally insulating enclosure. The magnet carrier is disposed between the liner and a bottom wall or a side wall of the thermally insulated enclosure. Optionally, the magnet carrier can be removed and/or replaced as desired by the end user.

In yet another embodiment, the thermally insulating enclosure includes a thermally insulating bottom wall and a plurality of thermally insulating side walls. The magnet carrier is disposed within the thermally insulating bottom wall or one of the thermally insulating side walls. The thermally insulating bottom wall and/or one or more of the thermally insulating side walls can include an opening adapted to facilitate the insertion and removal of the magnet carrier. The magnet carrier is disposed outside of a thermally insulating layer of the bottom wall or the side wall in which the magnet carrier is disposed.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a thermally insulated enclosure including a magnet assembly for mounting the enclosure to ferromagnetic structures. In the following description, numerous specific details are set forth (e.g., type of ferromagnetic structure, magnet geometry, fasteners, etc.) in order to provide a thorough understanding of the invention. Those skilled in the art will recognize, however, that the invention may be practiced apart from these specific details. In other instances, details of well known insulated enclosure manufacturing practices (e.g., molding, insulating, assembling, etc.) and components have been omitted, so as not to unnecessarily obscure the present invention.

Figure 1:
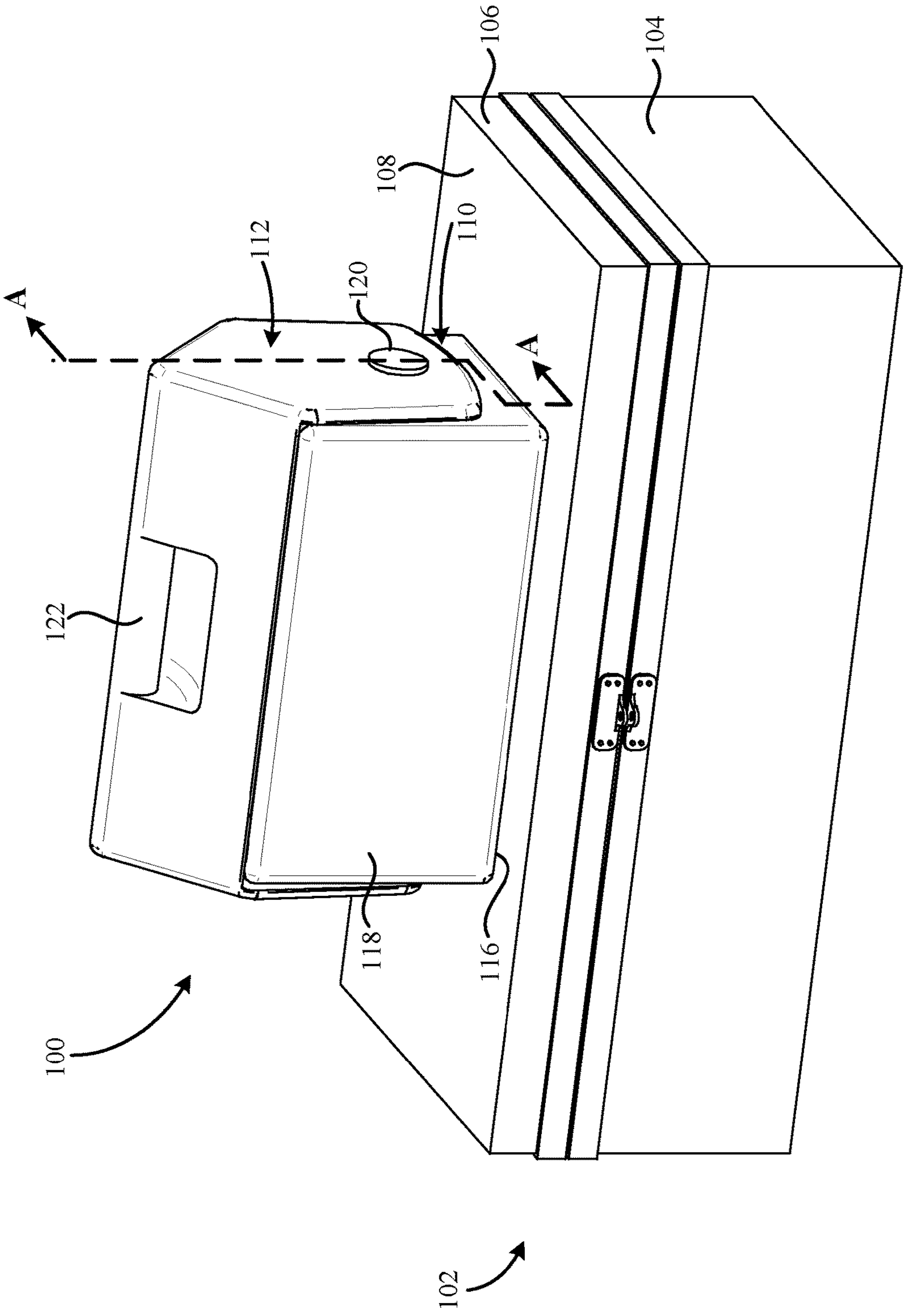
FIG. 1 is a perspective view of a rigid cooler mounted on a toolbox.

FIG. 1 is a perspective view of a thermally insulated enclosure which, in this particular embodiment, is depicted by way of example as a rigid cooler 100. As shown, cooler 100 is fixedly mounted on a ferromagnetic structure which, also by way of example, is depicted as a construction vehicle toolbox 102. In this example, toolbox 102 includes a bottom portion 104 and a lid 106 coupled together by some suitable means such as, for example, a hinge assembly. Further, lid 104 defines a horizontal top surface 108 whereon cooler 100 is securely mounted.

Figure 2:
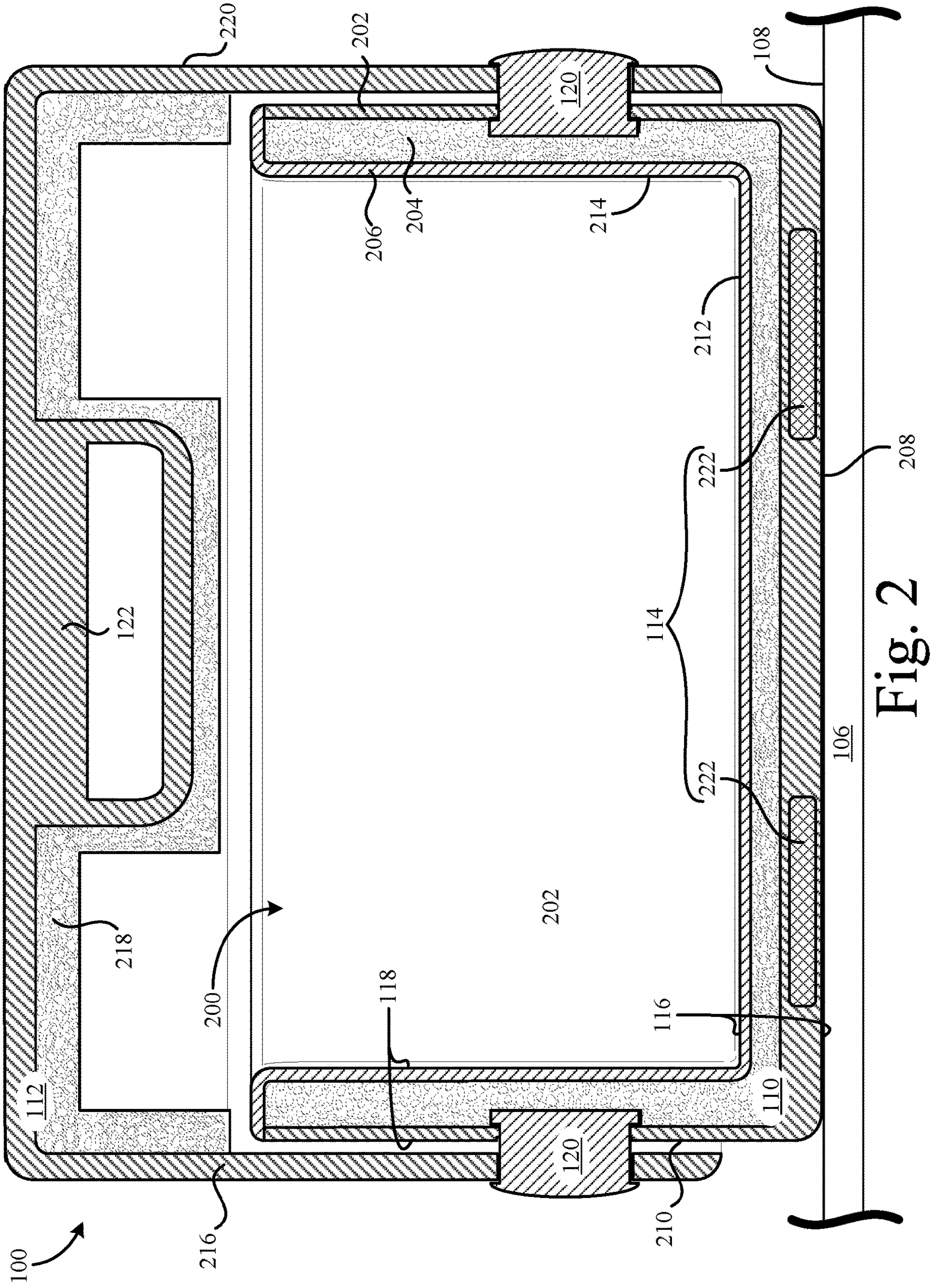
FIG. 2 is a cross-sectional view of the rigid cooler of FIG. 1 according to one embodiment of the present invention.

Cooler 100 includes an insulated wall 110, an insulated lid 112, and a magnet assembly 114 (visible in FIG. 2). Insulated wall 110 includes a bottom wall 116 and four side walls 118 extending upward therefrom. Insulated lid 112 is pivotally coupled to side walls 118 via a set of hinge features 120 that facilitate the opening and closing of cooler 100. As shown, lid 112 defines a handle 122 for carrying cooler 100. Magnet assembly 114 (not visible in FIG. 1) is coupled to bottom wall 116 and is magnetically attracted to ferromagnetic materials such as, for example, iron, iron alloys (i.e. steel), etc. This attraction provides a magnetic force sufficient to fixedly secure cooler 100 to ferromagnetic structures such as, for example, lid 106 of toolbox 102. The magnetic attraction of cooler 100 to toolbox 102 not only prevents cooler 100 from moving away from toolbox 102 in a direction perpendicular to top surface 108, but also provides normal force and, therefore, friction force between bottom wall 116 of cooler 100 and top surface 108 of toolbox 102 thereby preventing relative sliding therebetween.

Those skilled in the art will recognize that cooler 100 provides several advantages over prior art insulated enclosures. For example, cooler 100 can be secured to ferromagnetic structures without the need for mechanical fasteners. This is beneficial in that it not only eliminates the need always have mechanical fasteners on hand, but also enables cooler 100 to be mounted to structures (i.e. flat walls) that do not have physical features for mechanical fasteners to engage. Furthermore, cooler 100 is self mounting thus eliminating the process of manually fastening it to a suitable structure. This is not only convenient, but also ensures that cooler 100 remains secure in situations such as, for example, when left on the tailgate of a truck, toolbox, trailer, etc. As another example, cooler 100 can be very useful for heavy equipment operators because it can be placed at almost any location on the equipment without the risk of falling off during operation.

FIG. 2 shows a side view of cooler 100 sectioned along line A-A of FIG. 1. Cooler 100 is shown mounted on top surface 108 of toolbox 102. As shown, cooler 100 is in a closed position wherein an opening 200 defined at the top of side walls 118 is covered by lid 112 such that the interior of cooler 100 is enclosed by bottom wall 116, side walls 118, and lid 112. When lid 112 is pivoted about hinge features 120, it uncovers opening 200 such that the interior of cooler 100 is no longer enclosed.

Insulated wall 110 further includes a first rigid layer 202, an insulation layer 204, and a second rigid layer 206. First rigid layer 202 defines the exterior surfaces of insulated wall 110. More specifically, first rigid layer 202 defines a bottom exterior surface 208 of bottom wall 116 and four side exterior surfaces 210 of side walls 118. Insulation layer 204 is disposed between first rigid layer 202 and second rigid layer 206 so as to impede heat transfer through wall 110. Second rigid layer 206 defines the interior surfaces of insulated wall 110 including a bottom interior surface 212 of bottom wall 116 and four side interior surfaces 214 of side walls 118. Furthermore, second rigid layer 206 is coupled to first rigid layer 202 near the top of sidewalls 118 such that insulation layer 204 is enclosed therebetween.

Insulated lid 112 further includes a first rigid layer 216 and an insulation layer 218. First rigid layer 216 defines an exterior surface 220 of lid 112 and, therefore, the contour of handle 122. Accordingly, first rigid layer 216 of lid 112 and first rigid layer 202 of insulated wall 110, together, define the exterior surface of cooler 100. Insulation 218 is coupled to the interior surface of first rigid layer 216 so as to impede heat transfer through lid 112. When lid 112 is closed, insulation layer 218 covers and insulates opening 200 such that the interior of cooler 100 is completely enclosed with insulation on all six sides.

Magnet assembly 114 includes a plurality of magnets 222 coupled to bottom wall 116 of insulated wall 110. In this particular embodiment, magnets 222 are imbedded directly into first rigid layer 202 by some suitable means. For example, first rigid layer 202 could be a plastic structure that is formed by molding plastic material directly over magnets 222.

Figure 3:
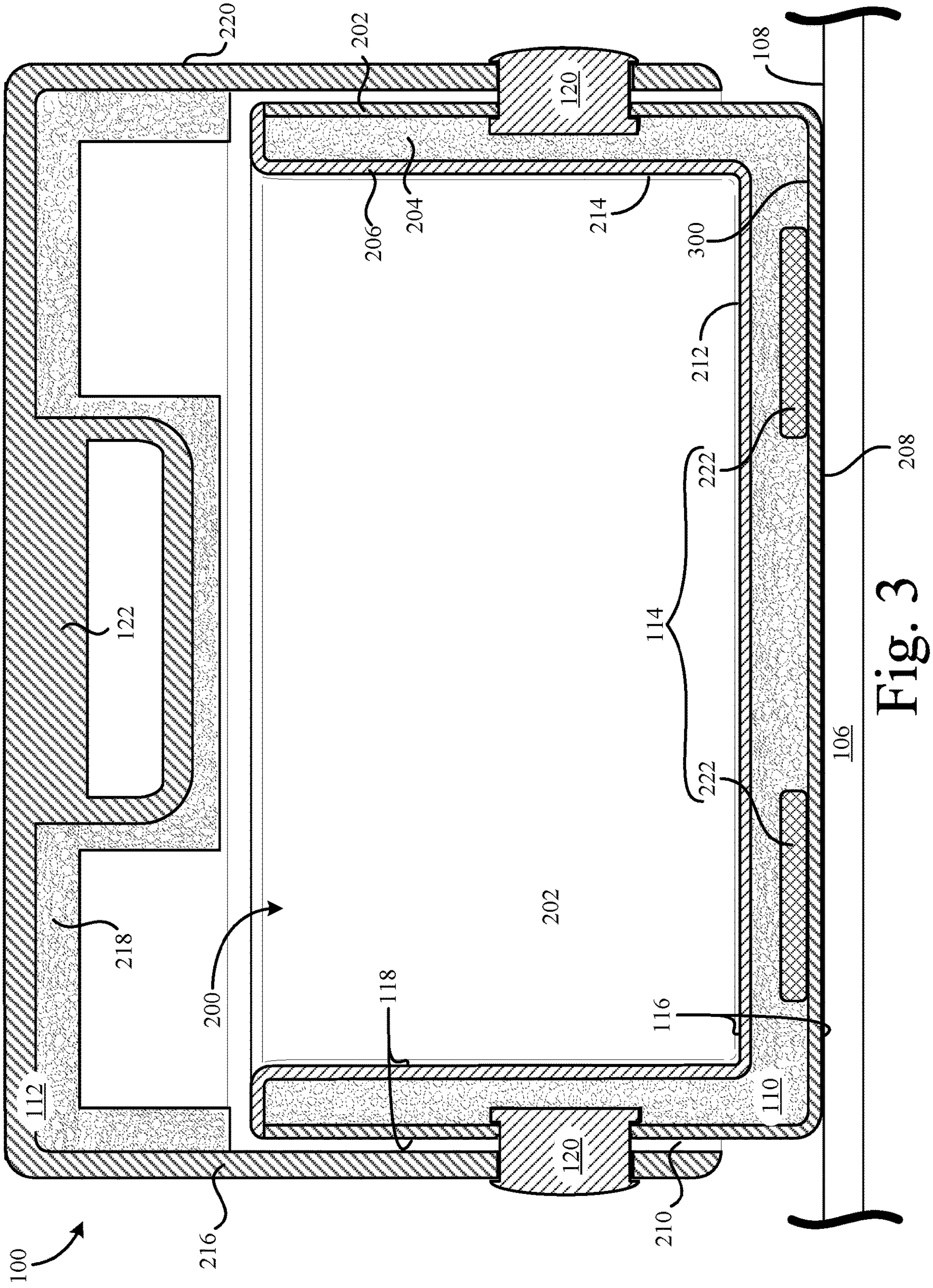
FIG. 3 is a cross-sectional view of the rigid cooler of FIG. 1 according to another embodiment of the present invention.

FIG. 3 shows a side view of cooler 100 according to an alternative embodiment of the present invention. Cooler 100 is shown sectioned along line A-A of FIG. 1. Note that the embodiments illustrated in FIG. 2, FIG. 3, FIG. 4, and FIG. 5 differ only slightly in that the location of magnets 222 with respect to first rigid layer 202 is slightly different for each. In order to avoid redundancy, the elements of FIG. 2, FIG. 3, FIG. 4 and FIG. 5 that are identical and/or substantially similar will be denoted with like reference numbers and not described repeatedly in detail.

As shown in FIG. 3, magnets 222 are coupled to an interior surface 300 of first rigid layer 202 opposite bottom exterior surface 208. This can be achieved by any suitable means such as, for example, an adhesive, mechanical fastener, forming insulation 204 directly over surface 212 after magnets 222 are positioned thereon, etc.

Figure 4:
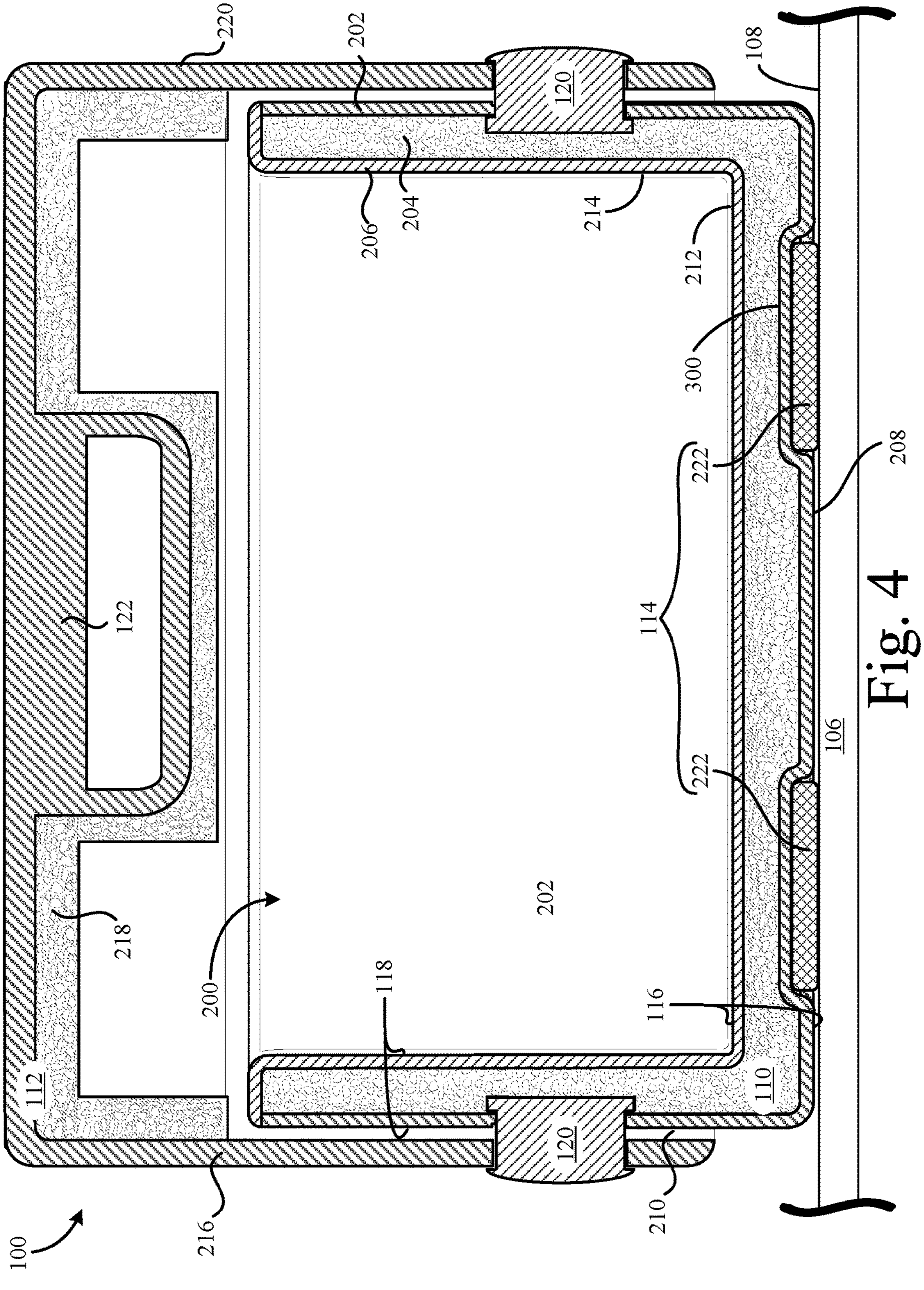
FIG. 4 is a cross-sectional view of the rigid cooler of FIG. 1 according to yet another embodiment of the present invention.

As shown in FIG. 4, magnets 222 are coupled to bottom exterior surface 208 of bottom wall 116. This can also be achieved by any suitable means such as, for example, an adhesive, mechanical fastener, etc.

Figure 5:
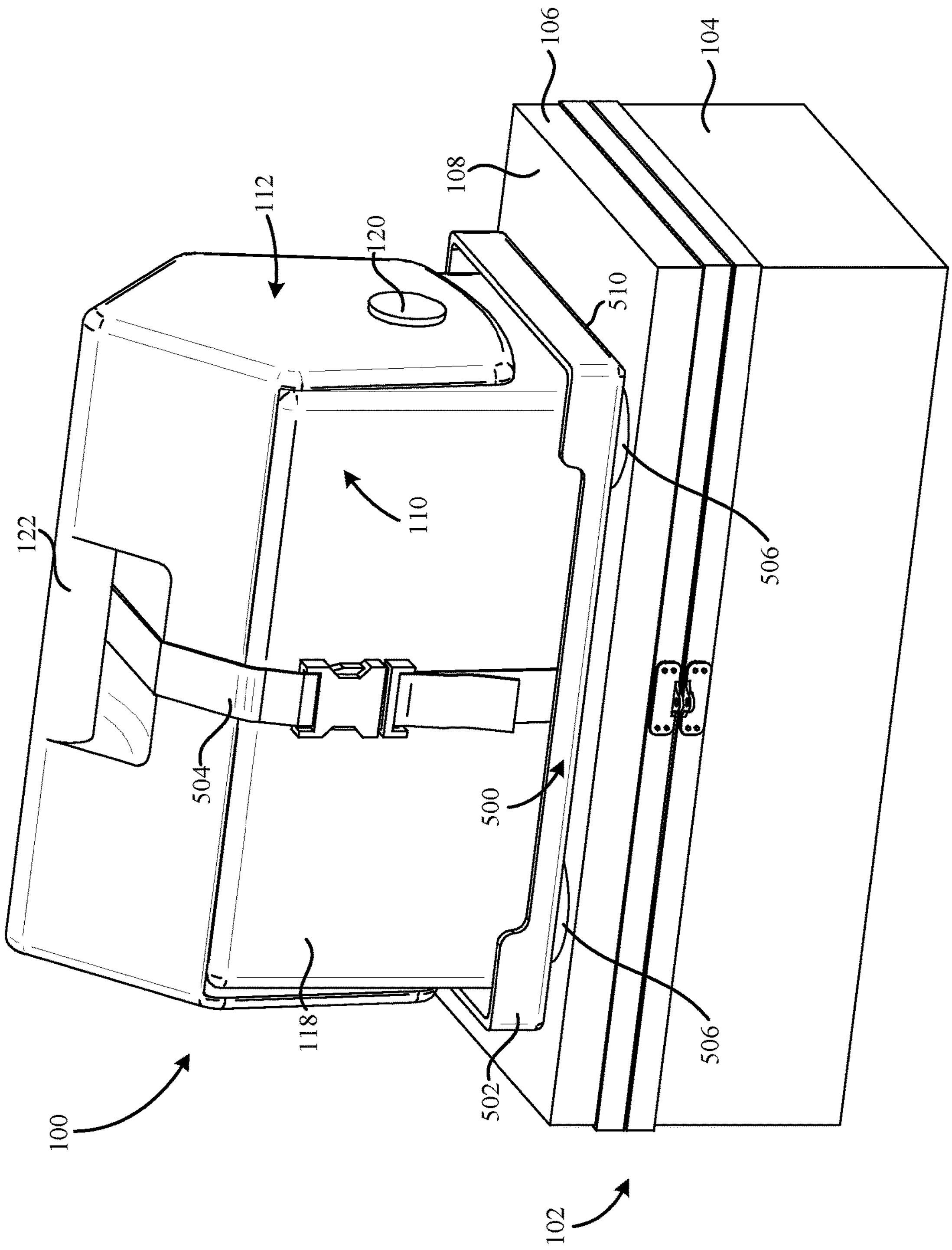
FIG. 5 is a perspective view of the rigid cooler of FIG. 1 mounted to toolbox via a removable magnetic tray.

FIG. 5 shows a perspective view of cooler 100 according to yet another alternative embodiment of the present invention. Cooler 100 is fastened to top surface 108 of toolbox 102 via a removable magnet assembly which, in this particular embodiment, is depicted by way of example as a magnetic tray 500. Further, tray 500 includes a rigid support structure 502, a fastening device 504, and a set of magnets 506. Rigid support structure 502 is adapted to receive insulated wall 110 of cooler 100. Fastening device 504 is coupled to rigid support structure 502 and provides a means for fixedly securing cooler 100 to rigid support structure 502. Magnets 506 are fixedly mounted to rigid support structure 502 and provide a means for magnetically fastening tray 500 to ferromagnetic structures (i.e. toolbox 102).

Figure 6:
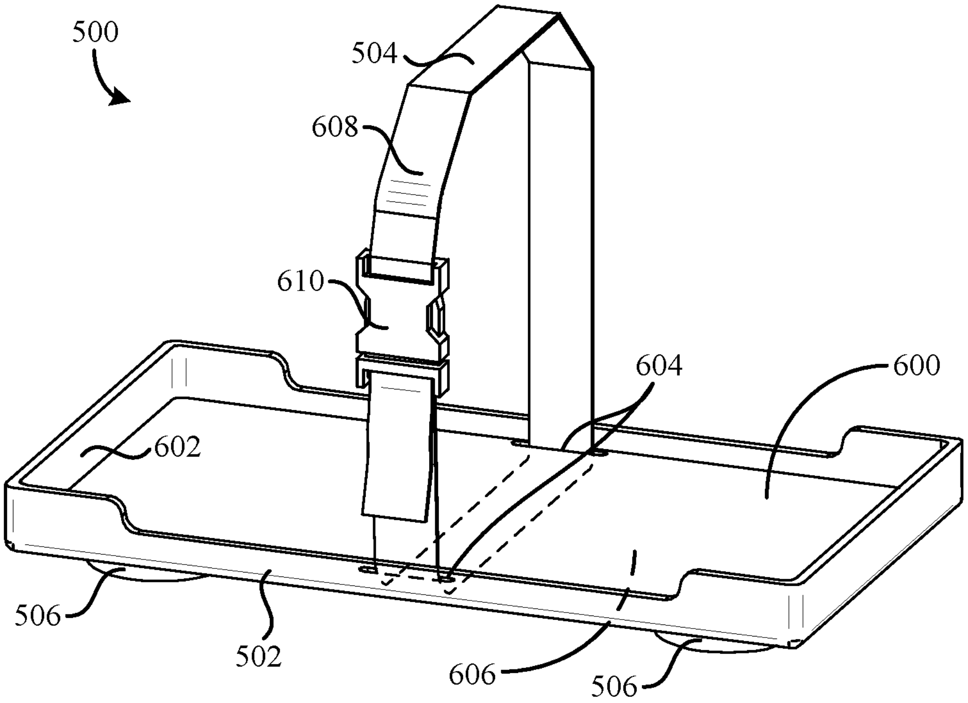
FIG. 6 is a perspective view of the magnetic tray of FIG. 5 according to one embodiment of the present invention.

FIG. 6 is a perspective view of tray 500 shown removed from cooler 100 to better illustrate the details of rigid support structure 502, fastening device 504, and magnets 506.

Rigid support structure 502 includes a top surface 600, a retaining feature 602, two slots 604, and a bottom surface 606. Top surface 600 is a planar surface whereon cooler 100 is seated when fastened to rigid support structure 502 via fastening device 504. Retaining feature 602 is a set of walls extending upward from the peripheral edges of top surface 600. When cooler 100 is seated on rigid support structure 502, retaining feature 602 encloses the outer perimeter of the lower region of exterior surfaces 210 of cooler 100. Slots 604 facilitate the coupling of fastening device 504 to rigid support member 502. More specifically, slots 604 are elongated throughholes formed at opposite sides of rigid support structure 502.

Fastening device 504 provides a means for securing cooler 100 onto rigid support structure 502. Further, fastening device 504 includes a flexible strap 608 and buckle 610. Flexible strap 608 is looped through slots 604 so as to engage bottom surface 606 of rigid support structure 502. Buckle 610 provides a means for connecting and disconnecting the open ends of strap 608 to one another such that tray 500 can be easily connected and disconnected from cooler 100. Furthermore, buckle 610 provides a means for adjusting the working length of strap 608. With fastening device 504 being adjustable, tray 500 can also be used universally for mounting miscellaneous objects other than cooler 100 onto ferromagnetic structures.

Magnets 506 provide a means for magnetically securing tray 500 to ferromagnetic structures. In this embodiment, magnets 506 are coupled to bottom surface 606 of rigid support structure 502 by some suitable means (e.g., threaded fasteners, adhesive, insert molding of rigid support structure 502 around magnets 506, etc.).

Although the present invention is not limited to any specific design of tray 500 and the components thereof, the inventor has achieved good results with at least two design concepts. In one design concept, rigid support structure 502 is a rigid plate and magnets 506 are fastened on bottom surface 606 via threaded fasteners (e.g., nuts, bolts, screws, etc.). In another design concept, rigid support structure 502 is formed by molding plastic directly over magnets 506 such that magnets 506 are fully, or at least partially, imbedded therein.

Figure 7:
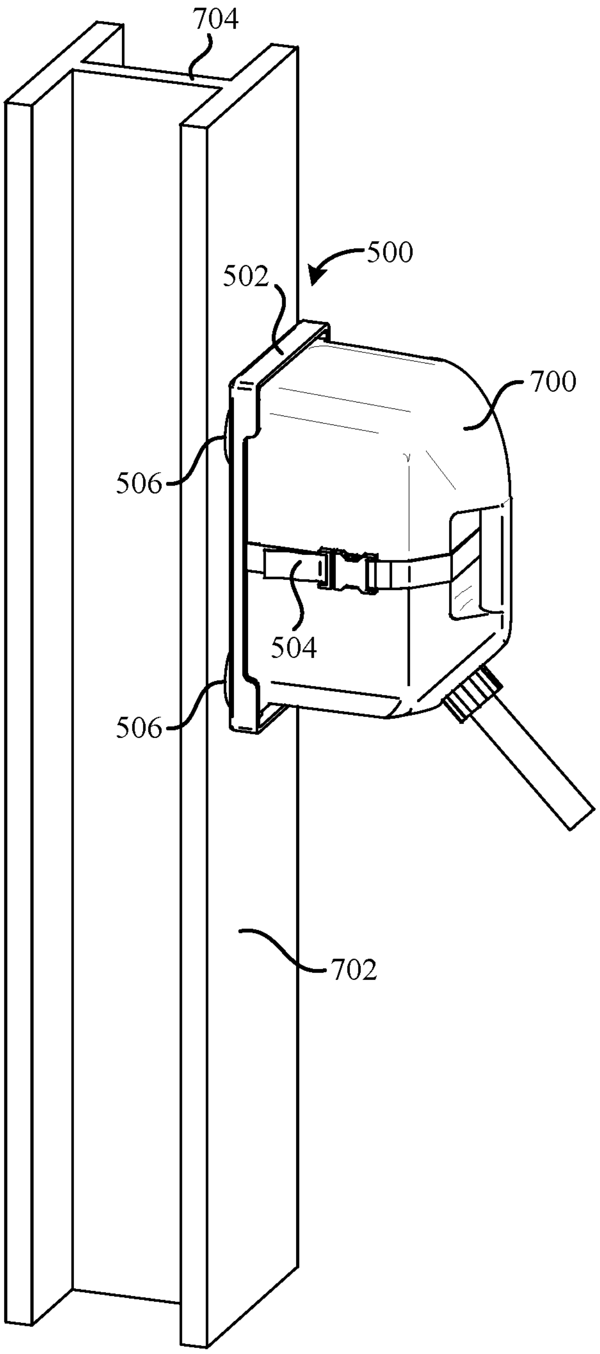
FIG. 7 is a perspective view of a gas can mounted vertically to an I-beam via magnetic tray 500.

FIG. 7 illustrates one embodiment wherein tray 500 is adapted for universal use. In this example, tray 500 is being used to secure a gas can 700 to the vertical flat surface 702 of an I-beam 704. It should be understood that gas can 700 is depicted by way of example to represent one of many possible objects that can be secured by tray 500. Likewise, I-beam 704 is depicted by way of example to represent one of many possible structures onto which tray 500 can magnetically mount to.

Figure 8:
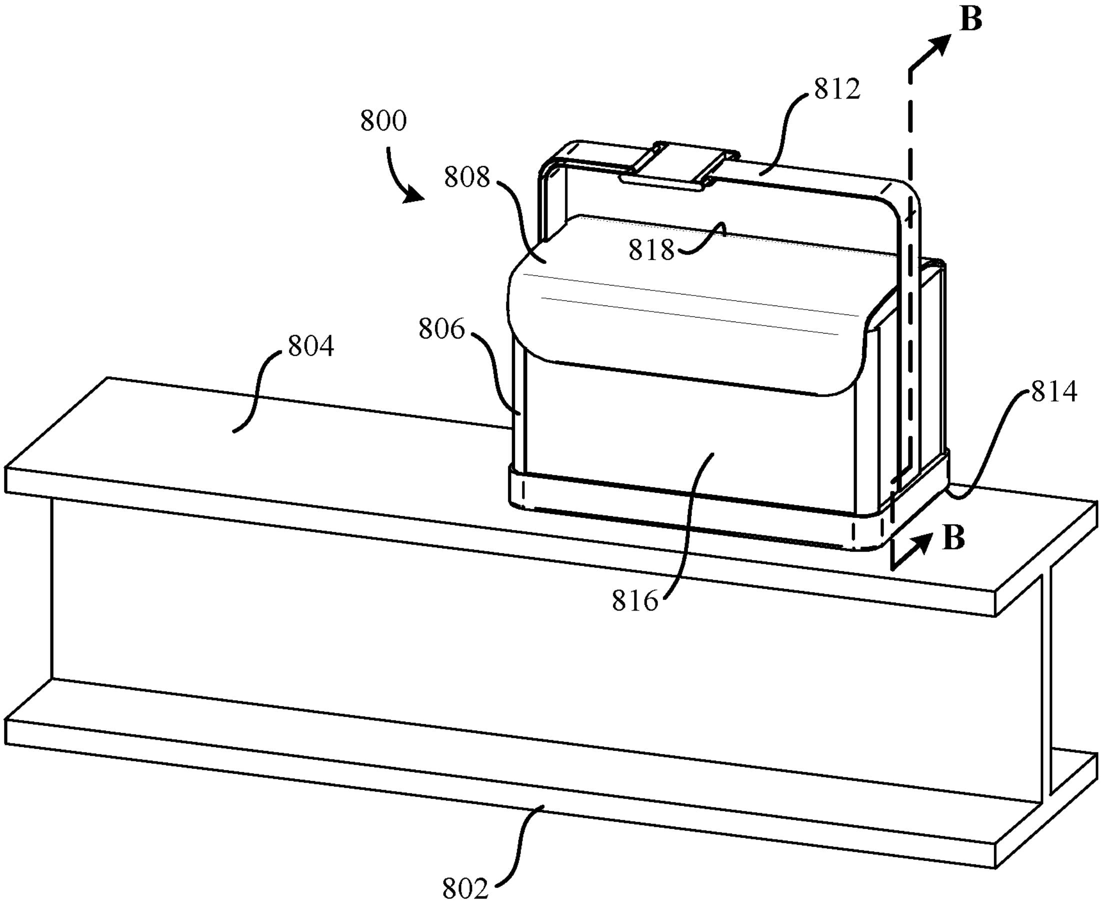
FIG. 8 is a perspective view of a collapsible cooler mounted on a horizontal I-beam.

FIG. 8 is a perspective view of a thermally insulated enclosure which, in this particular embodiment, is depicted by way of example as a collapsible cooler 800. As shown, cooler 800 is fixedly mounted on a ferromagnetic structure which, also by way of example, is depicted as a horizontal I-beam 802. In this example, I-beam 802 includes a flat horizontal top surface 804 whereon cooler 800 is securely mounted.

Cooler 800 includes an insulated wall 806, an insulated cover 808, a magnet assembly 810 (visible in FIG. 9), and a strap 812. Insulated wall 806 includes a bottom wall 814 and four side walls 816 extending upward therefrom. Insulated cover 808 is a flap-like cover extending from the rear one of side walls 816 and is foldably coupled thereto via a crease 818. Although not shown, the end of cover 808 opposite the end whereon crease 818 is formed could include some suitable type of fastening device (e.g., hook and loop, zipper, etc.) that fastens to the front one of side walls 816 to facilitate the closing of cover 808. Magnet assembly 810 (not visible in FIG. 8) is coupled to bottom wall 814 to facilitate the mounting of cooler 800 to ferromagnetic structures (i.e. toolbox 100, I-beam 700, I-beam 800, etc.). Adjustable strap 812 is attached to side walls 816 to facilitate the carrying cooler 800.

Figure 9:
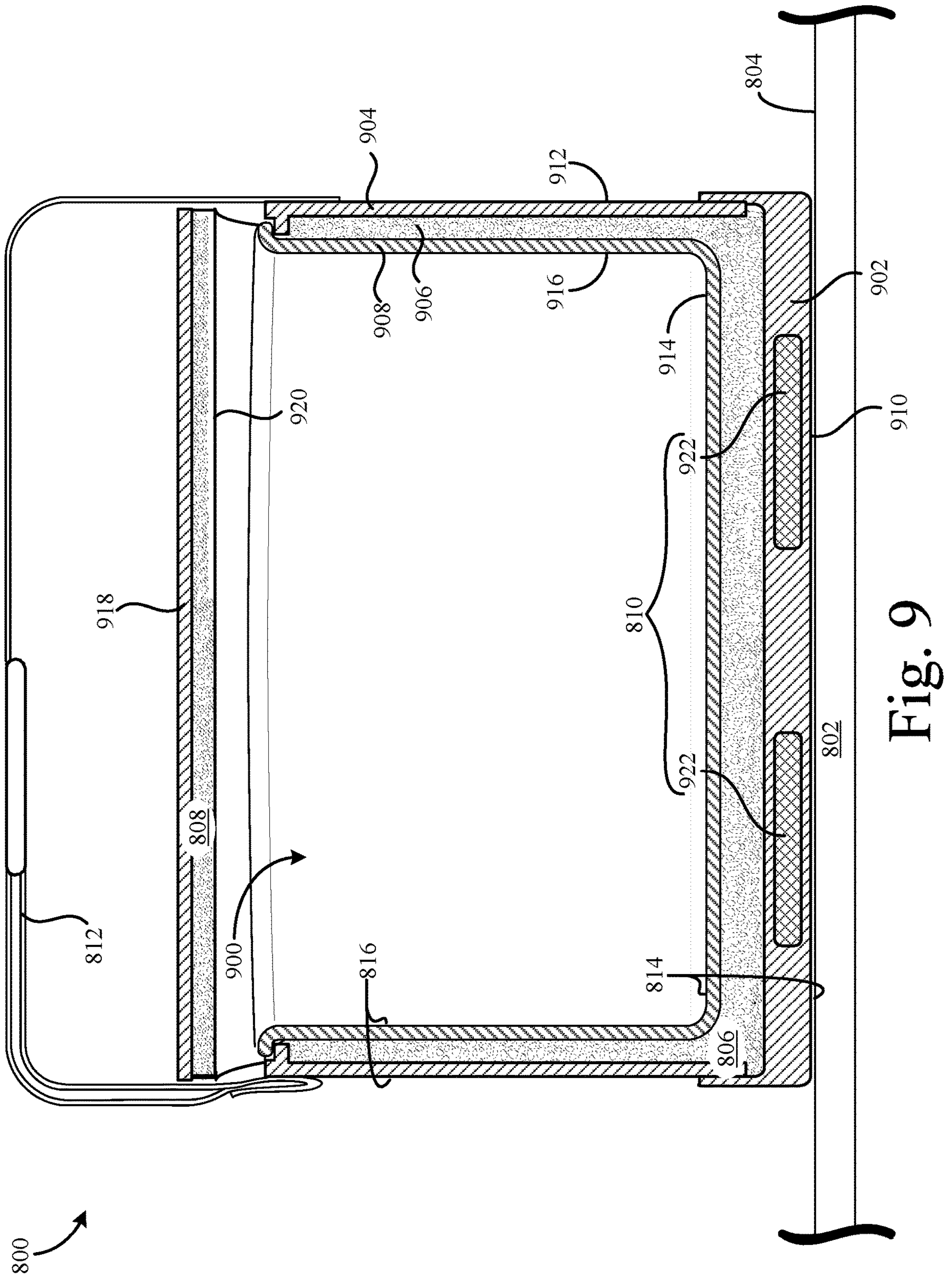
FIG. 9 is a cross-sectional view of the collapsible cooler 800 of FIG. 8 according to one embodiment of the present invention.

FIG. 9 shows a side view of cooler 800 mounted on top surface 804 of I-beam 802. Cooler 800 is shown sectioned along line B-B of FIG. 8. As shown, cooler 800 is in a closed position wherein cover 808 is positioned over an opening 900 defined at the top of side walls 816 such that the interior of cooler 800 is enclosed by bottom wall 814, side walls 816, and cover 808. Folding cover 808 back along crease 818 exposes opening 900 thereby providing access to the interior of cooler 800.

Insulated wall 806 further includes a base 902, a flexible layer 904, an insulation layer 906, and a rigid layer 908. Base 902 defines a bottom exterior surface 910 of bottom wall 814. Flexible layer 904 defines four side exterior surfaces 912 of side walls 816. Insulation layer 906 is disposed between rigid layer 908 and both of base 902 and flexible layer 904. Rigid layer 908 is a removable insert that defines the interior surfaces of insulated wall 806 including a bottom interior surface 914 of bottom wall 814 and four side interior surfaces 916 of side walls 816.

Insulated cover 808 further includes a flexible layer 918 and an insulation layer 920. In this particular embodiment, flexible layer 918 and insulation layer 920 are formed from sections of flexible layer 904 and insulation layer 906, respectively, extending from the rear one of side walls 816 to the front one of side walls 816.

Magnet assembly 810 includes a plurality of magnets 922 coupled to bottom wall 814 of insulated wall 806. In this particular embodiment, magnets 922 are imbedded directly into base 902 by some suitable means. For example, base 902 could be a plastic and/or rubber structure that is formed by molding plastic and/or rubber material directly over magnets 922.

Figure 10:
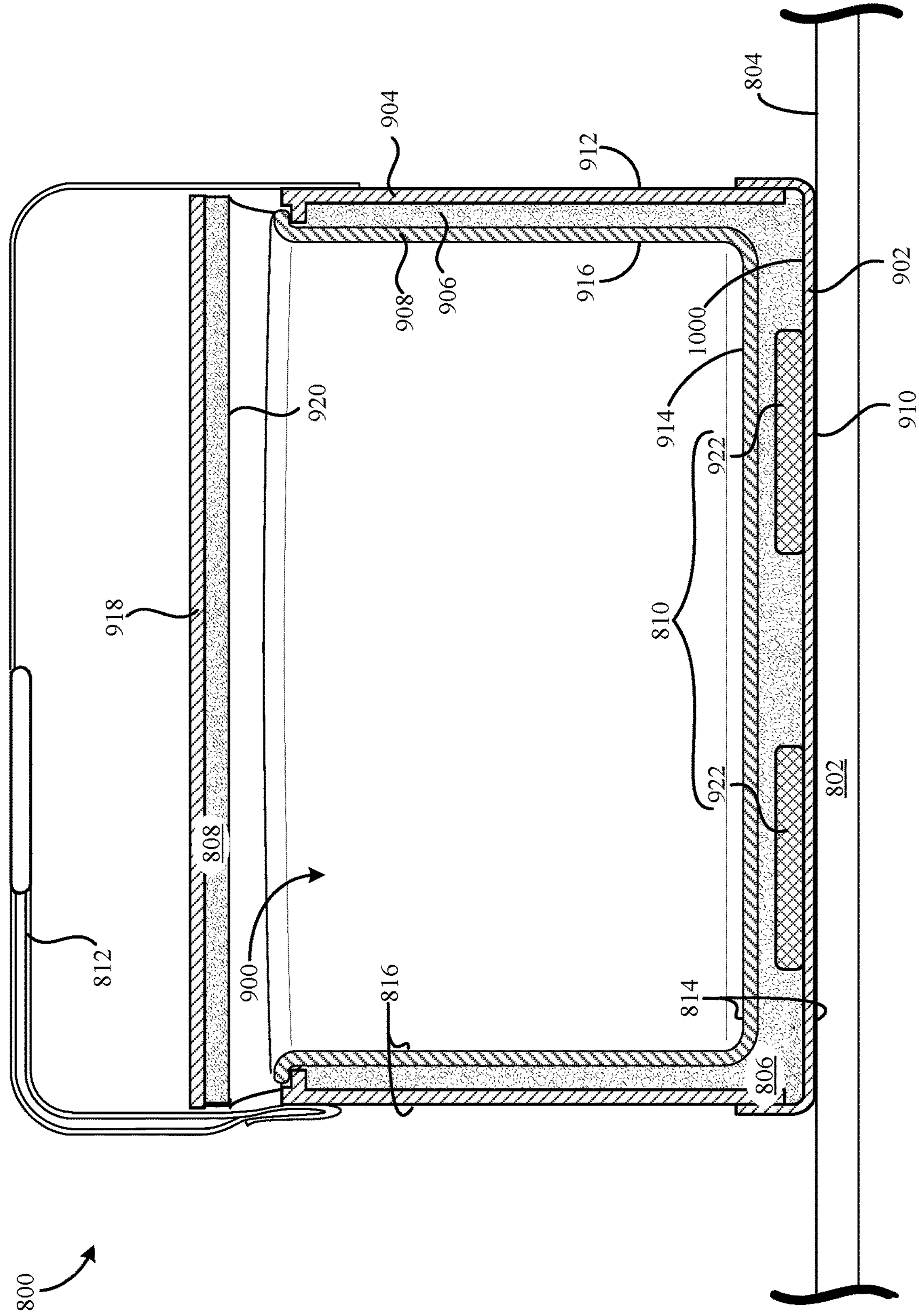
FIG. 10 is a cross-sectional view of the collapsible cooler of FIG. 8 according to another embodiment of the present invention.

FIG. 10 shows a side view of cooler 800 according to an alternative embodiment of the present invention. Cooler 800 is shown sectioned along line B-B of FIG. 8. Note that the embodiments illustrated in FIG. 9, FIG. 10, FIG. 11, and FIG. 12 differ only slightly in that the location of magnets 922 with respect to base 902 is slightly different for each. In order to avoid redundancy, the elements of FIG. 9, FIG. 10, FIG. 11 and FIG. 12 that are identical and/or substantially similar will be denoted with like reference numbers and not described repeatedly in detail.

As shown in FIG. 10, magnets 922 are coupled to an interior surface 1000 of base 902 opposite bottom exterior surface 910. This can be achieved by any suitable means such as, for example, an adhesive, mechanical fastener, etc.

Figure 11:
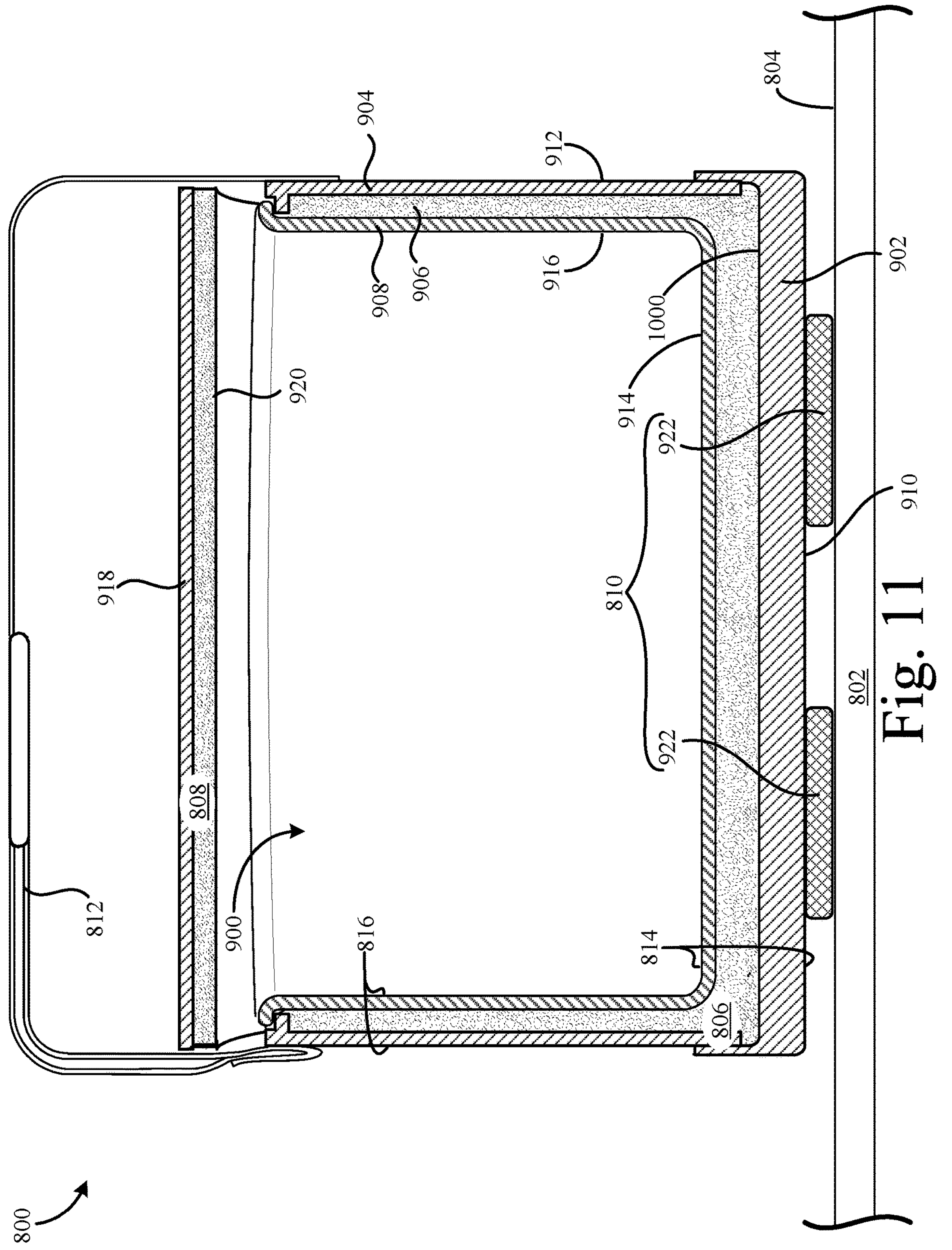
FIG. 11 is a cross-sectional view of the collapsible cooler of FIG. 8 according to yet another embodiment of the present invention.

As shown in FIG. 11, magnets 922 are coupled to bottom exterior surface 910 of bottom wall 814. This can also be achieved by any suitable means such as, for example, an adhesive, mechanical fastener, etc.

Figure 12:
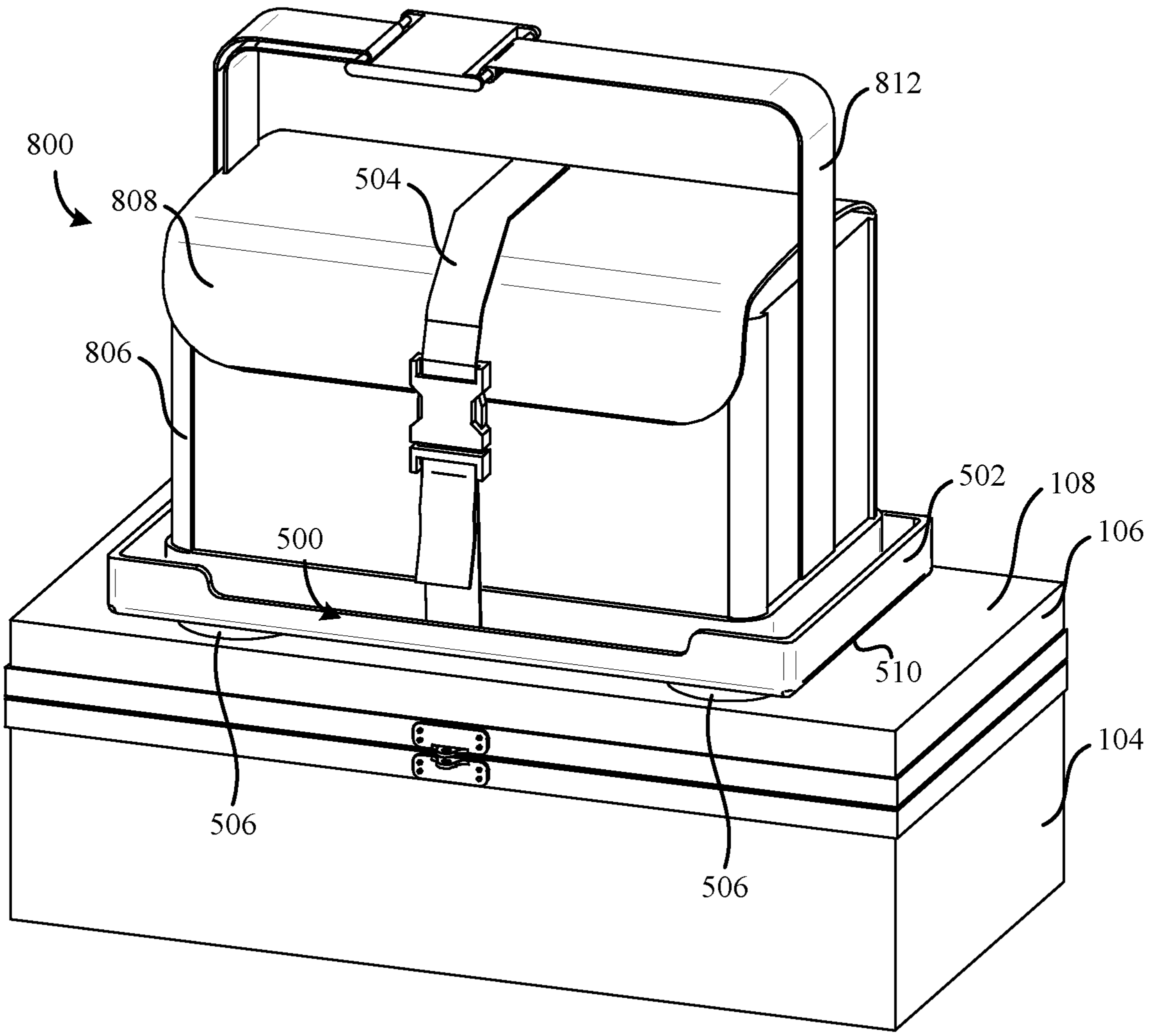
FIG. 12 is a perspective view of the collapsible cooler of FIG. 8 mounted to toolbox via removable magnetic tray.

FIG. 12 shows a perspective view of cooler 800 according to yet another alternative embodiment of the present invention. Cooler 800 is fastened to top surface 108 of toolbox 102 via tray 500.

Figure 13:
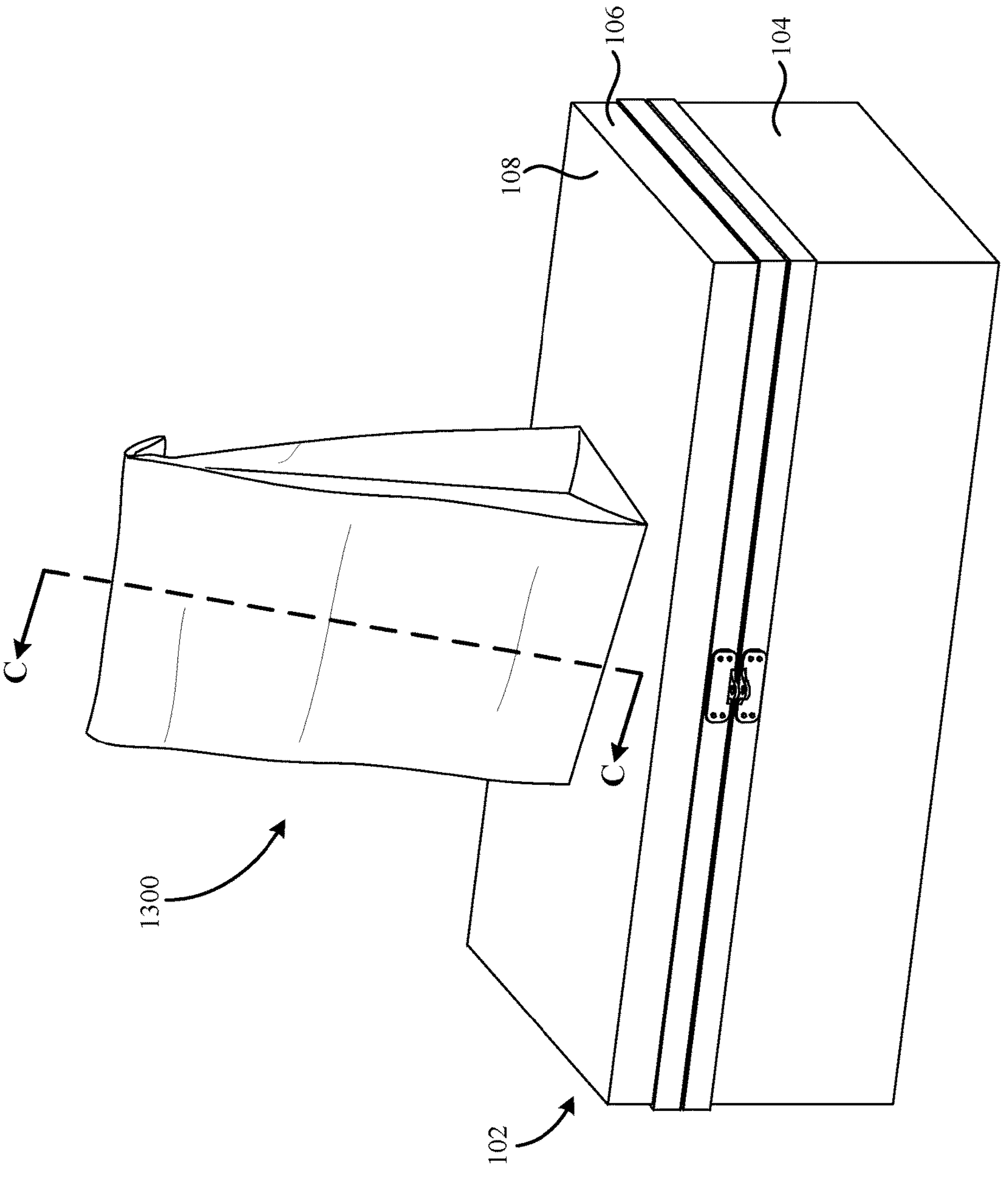
FIG. 13 is a perspective view of an insulated bag mounted on toolbox.

FIG. 13 is a perspective view of a thermally insulated enclosure which, in this particular embodiment, is depicted by way of example as an insulated bag 1300. As shown, bag 1300 is fixedly mounted on a ferromagnetic structure which, also by way of example, is depicted as top surface 108 of toolbox 102.

Figure 14:
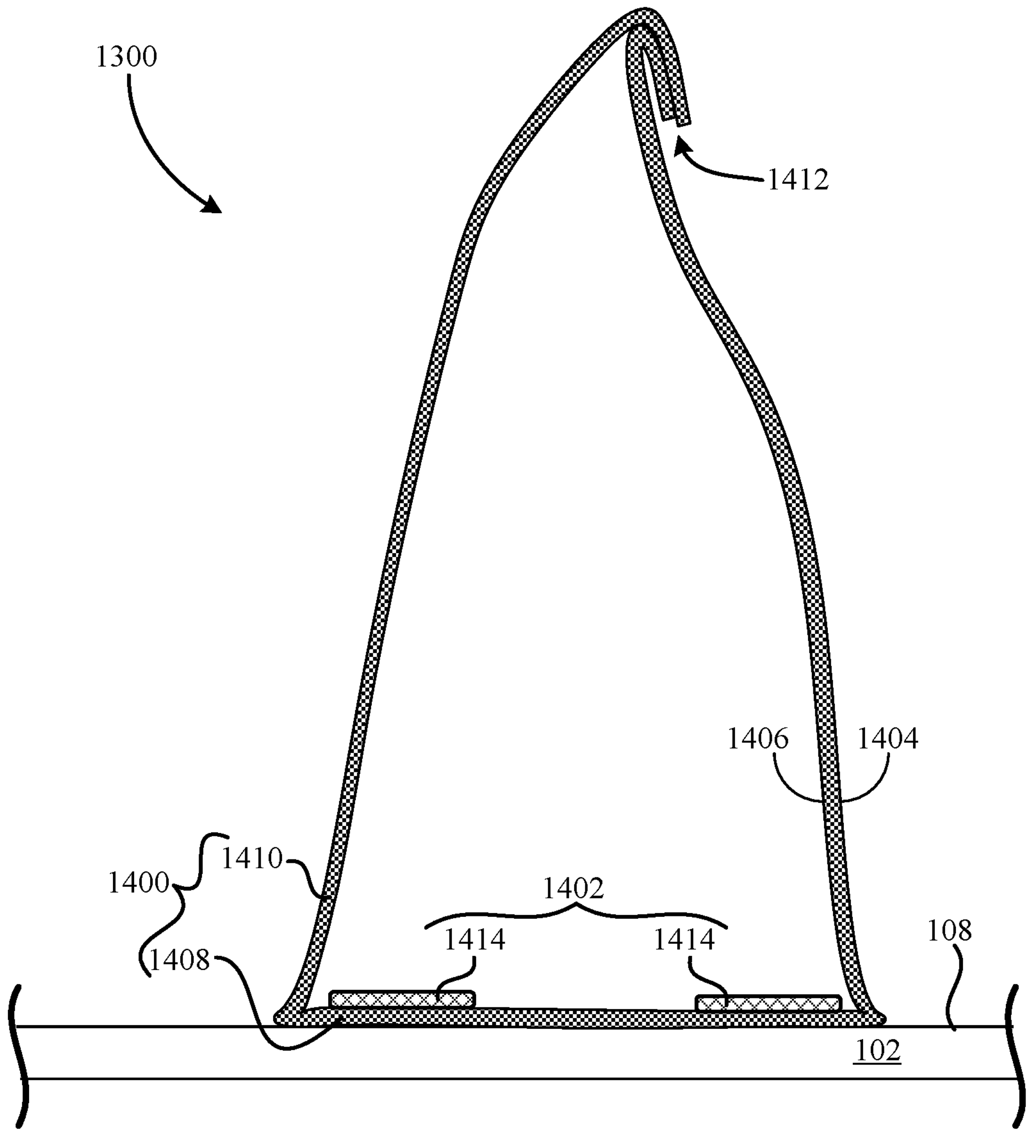
FIG. 14 is a cross-sectional view of the insulated bag of FIG. 13 according to one embodiment of the present invention.

FIG. 14 shows a side view of insulated bag 1300 mounted on top surface 108 of toolbox 102. Insulated bag 1300 is shown sectioned along line C-C of FIG. 13. As shown, bag 1300 includes an insulated wall 1400 and a magnet assembly 1402. Insulated wall 1400 is formed from a single piece of flexible insulated material defining an exterior surface 1404 and an opposite interior surface 1406 of bag 1300. Furthermore, the flexible insulated material is arranged such that insulated wall 1400 includes a bottom wall 1408 and four side walls 1410 extending upward therefrom. The top end of side walls 1410 defines an opening 1412. As shown, the top ends of side walls 1410 are folded such that opening 1412 is closed.

Magnet assembly 1402 includes a set of magnets 1414 coupled to interior surface 1406 of bottom wall 1408. Accordingly, the magnetic force attracting magnets 1414 to toolbox 102 is sufficient to secure bag 1300 to top surface 108.

Figure 15:
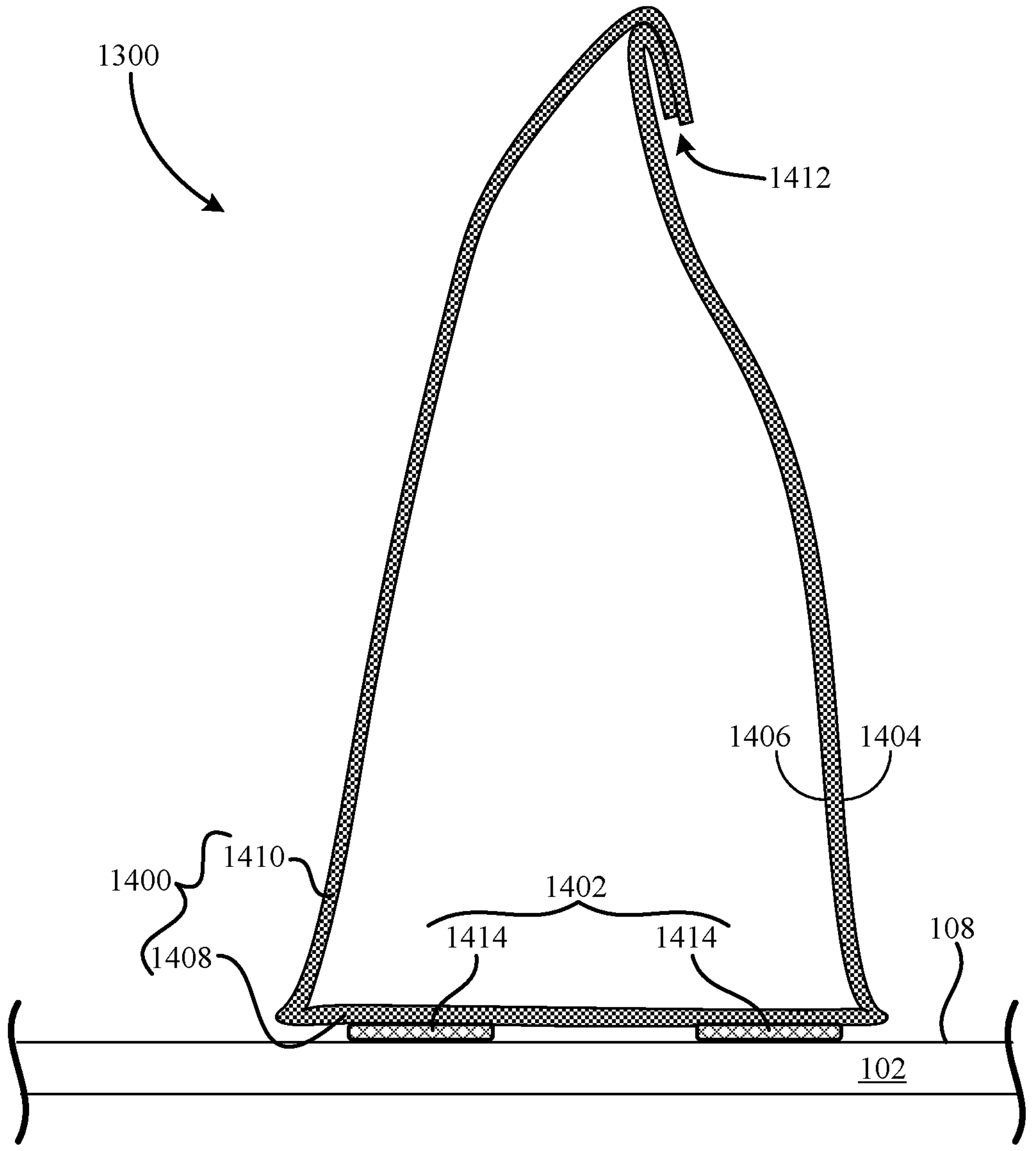
FIG. 15 is a cross-sectional view of the insulated bag of FIG. 13 according to another embodiment of the present invention.

FIG. 15 shows a side view of insulated bag 1300 according to another embodiment of the present invention. Insulated bag 1300 is shown sectioned along line C-C of FIG. 13.

As shown, magnets 1414 are coupled to exterior surface 1404 of bottom wall 1408 by some suitable means such as, for example, adhesive, threaded fastener, rivet, a pocket formed on exterior surface 1404 of bottom wall 1408, etc.

Other than magnets 1414 being coupled to exterior surface 1404 instead of being coupled to interior surface 1406, the components and features of bag 1300 illustrated in FIG. 15 are substantially similar to those illustrated in FIG. 14 and, therefore, denoted by the same reference numbers.

Figure 16:
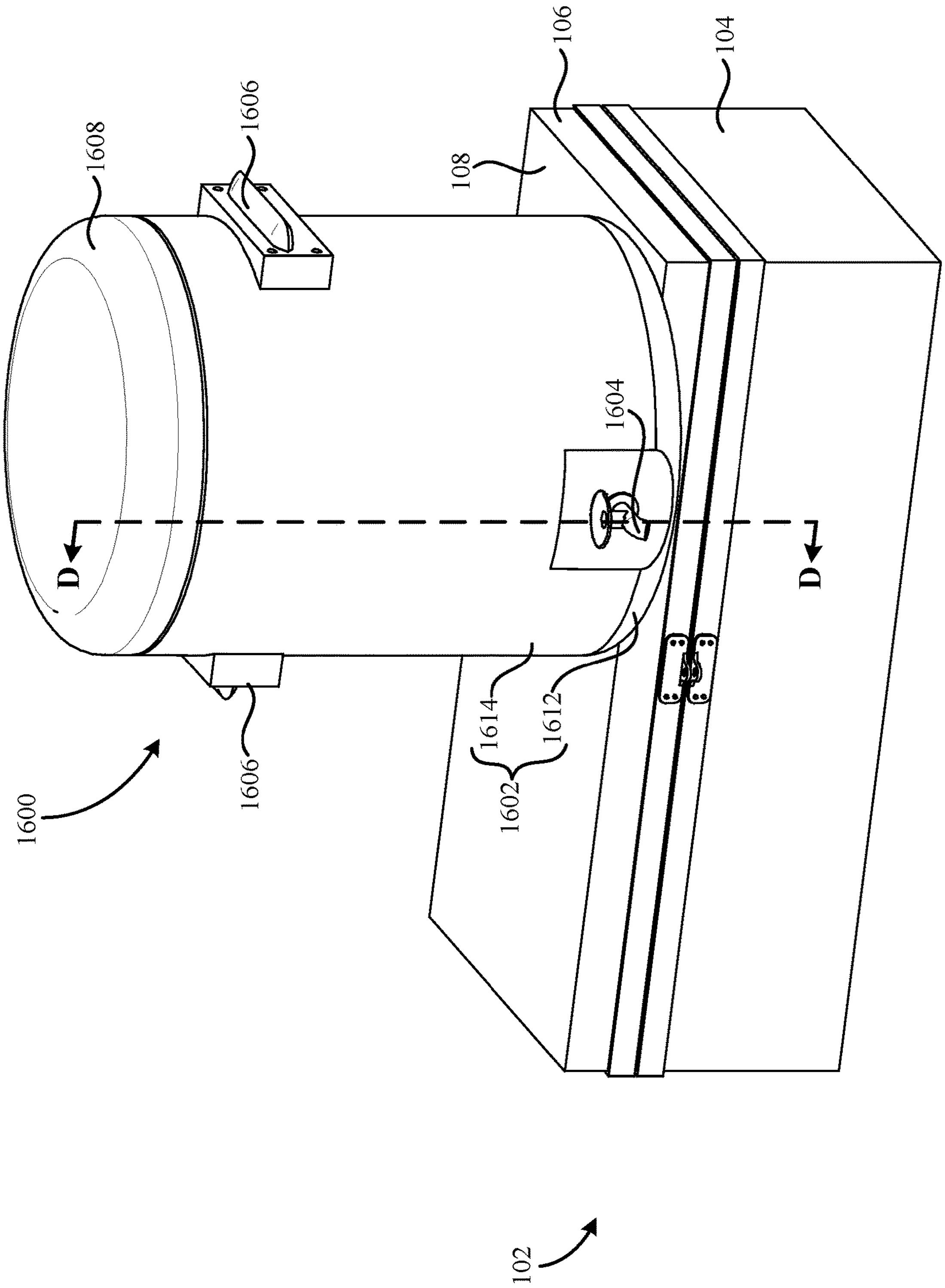
FIG. 16 is a perspective view of a water cooler mounted on toolbox.

FIG. 16 is a perspective view of a thermally insulated enclosure which, in this particular embodiment, is depicted by way of example as a water cooler 1600. As shown, cooler 1600 is fixedly mounted on top surface 108 of toolbox 102.

Figure 17:
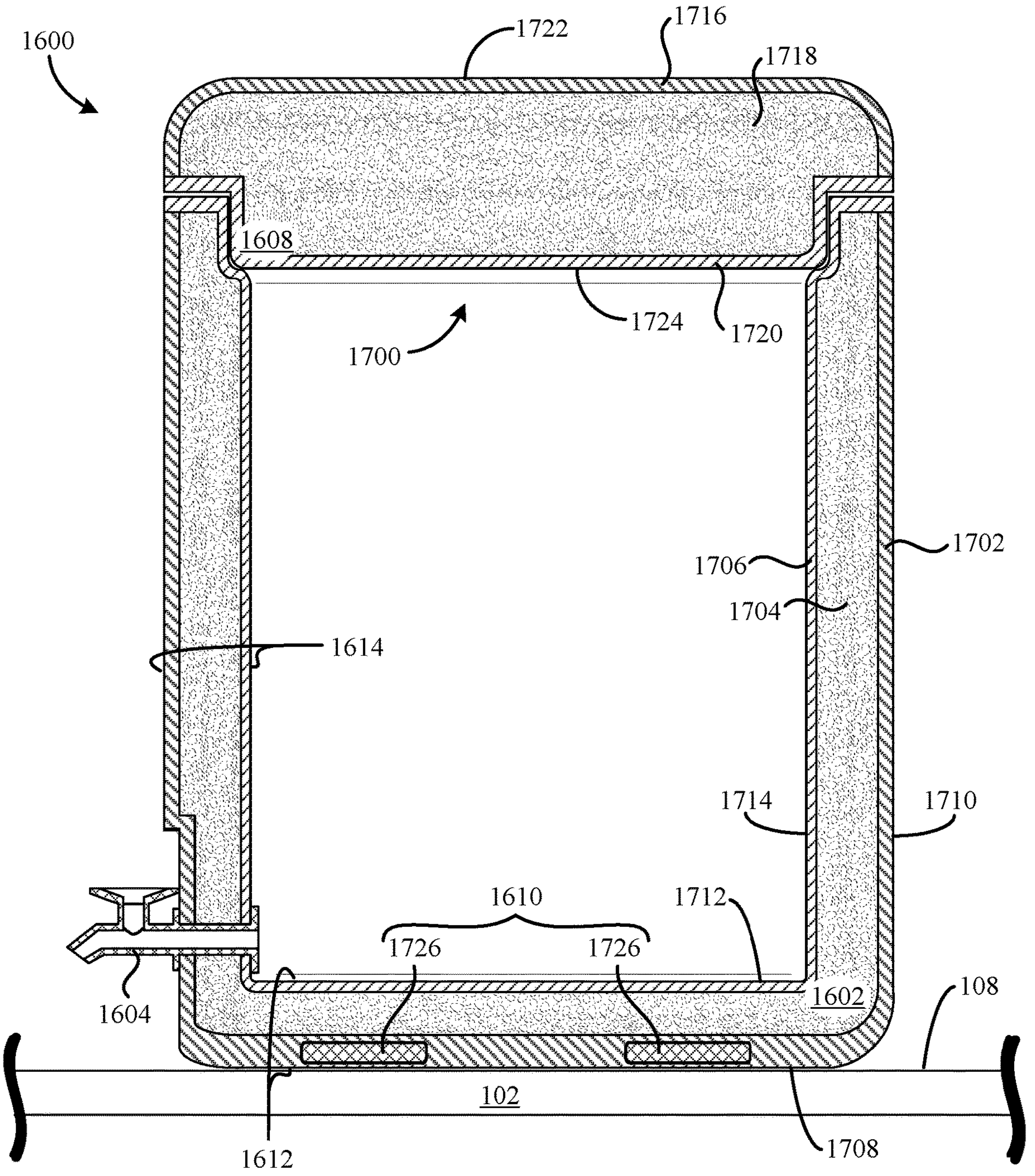
FIG. 17 is a cross-sectional view of the water cooler of FIG. 16 according to one embodiment of the present invention.

Water cooler 1600 includes an insulated wall 1602, a valve 1604, a set of handles 1606, an insulated lid 1608, and a magnet assembly 1610 (visible in FIG. 17). Insulated wall 1602 includes a bottom wall 1612 and a cylindrical side wall 1614 extending upward therefrom. Valve 1604 passes through insulated wall 1602, to facilitate the dispensing of fluid from water cooler 1600. Handles 1606 are mounted on opposite sides of side wall 1614 so as to facilitate the carrying and lifting of water cooler 1600. Insulated lid 1608 is a removable friction-fit lid coupled to the open ended top of side wall 1614. Magnet assembly 1610 (not visible in FIG. 16) is coupled to bottom wall 1612 of insulated wall 1602 so as to facilitate the mounting of water cooler 1600 onto ferromagnetic structures.

FIG. 17 shows a side view of water cooler 1600 mounted on top surface 108 of toolbox 102. Cooler 1600 is shown sectioned along line D-D of FIG. 16. As shown, water cooler 1600 is in a closed position wherein an opening 1700 defined at the top of side wall 1614 is covered by lid 1608 such that the interior of cooler 1600 is enclosed by bottom wall 1612, side wall 1614, and lid 1608. When lid 1608 is removed from insulated wall 1602, opening 1700 is exposed such that the interior of water cooler 1600 is no longer enclosed.

Insulated wall 1602 further includes a first rigid layer 1702, an insulation layer 1704, and a second rigid layer 1706. First rigid layer 1702 defines the exterior surfaces of insulated wall 1602. More specifically, first rigid layer 1702 defines a bottom exterior surface 1708 of bottom wall 1612 and a side exterior surface 1710 of side wall 1614. Insulation layer 1704 is disposed between first rigid layer 1702 and second rigid layer 1706 so as to impede heat transfer through wall 1602. Second rigid layer 1706 defines the interior surfaces of insulated wall 1602 including a bottom interior surface 1712 of bottom wall 1612 and a cylindrical interior surface 1714 of side wall 1614. Furthermore, second rigid layer 1706 is coupled to first rigid layer 1702 near the top of side wall 1614 such that insulation layer 1704 is enclosed therebetween.

Insulated lid 1608 includes a first rigid layer 1716, an insulation layer 1718, and a second rigid layer 1720. First rigid layer 1716 and second rigid layer 1720 define an exterior surface 1722 and an interior surface 1724, respectively, of lid 1608. Accordingly, exterior surface 1722 of lid 1608 and exterior surface 1710 of insulated wall 1602, together, define the exterior surface of water cooler 1600. Likewise, interior surface 1724 of lid 1608 and interior surface 1714 of insulated wall 1602, together, define the exterior surface of water cooler 1600.

Magnet assembly 1610 includes a plurality of magnets 1726 coupled to bottom wall 1612 of insulated wall 1602. In this particular embodiment, magnets 1726 are imbedded directly into first rigid layer 1702 by some suitable means. For example, first rigid layer 1702 could be a plastic or rubber structure that is formed by molding plastic or rubber material directly over magnets 1726.

Figure 18:
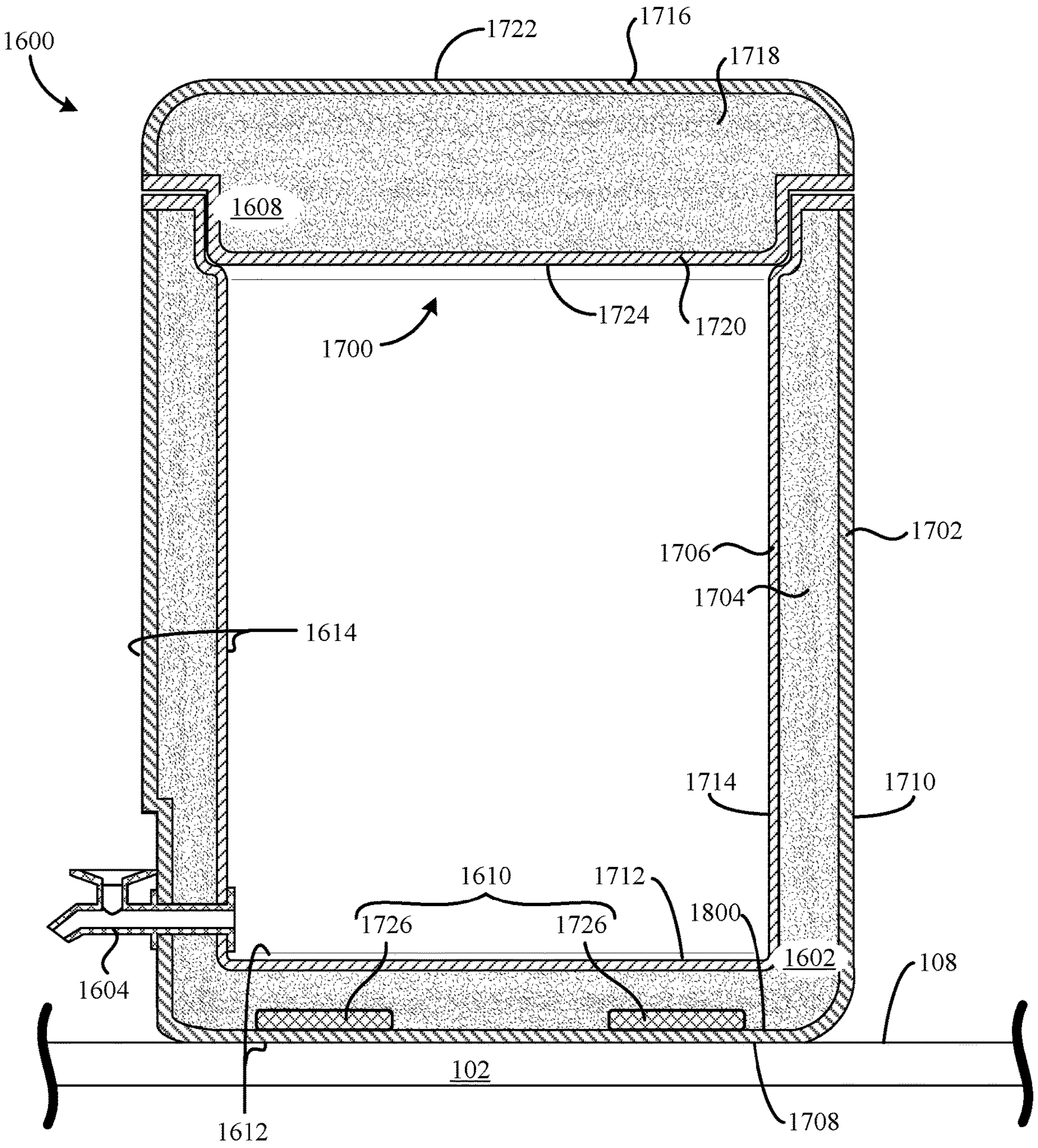
FIG. 18 is a cross-sectional view of the water cooler of FIG. 16 according to another embodiment of the present invention.
Figure 19:
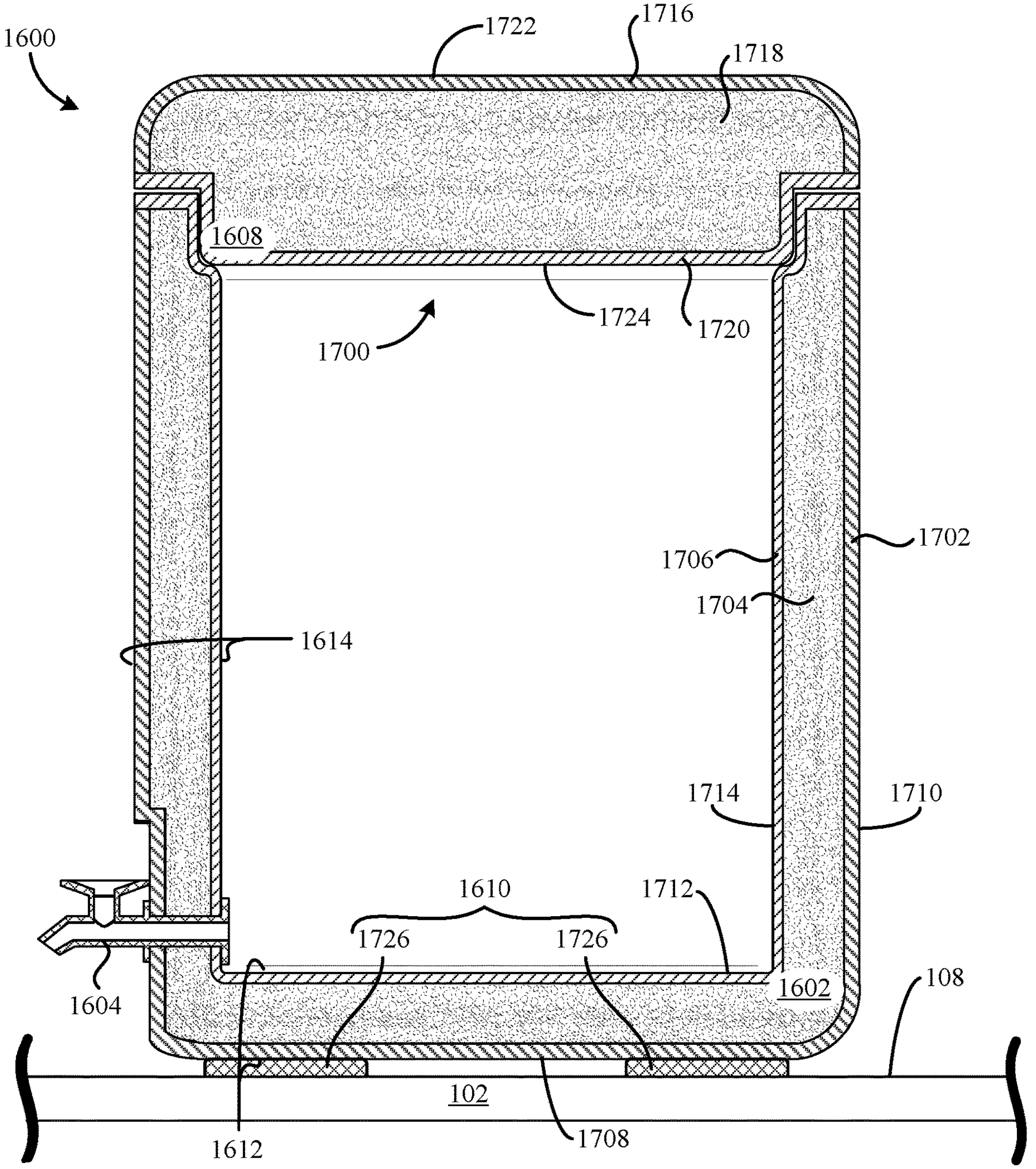
FIG. 19 is a cross-sectional view of the water cooler of FIG. 16 according to yet another embodiment of the present invention.
Figure 20:
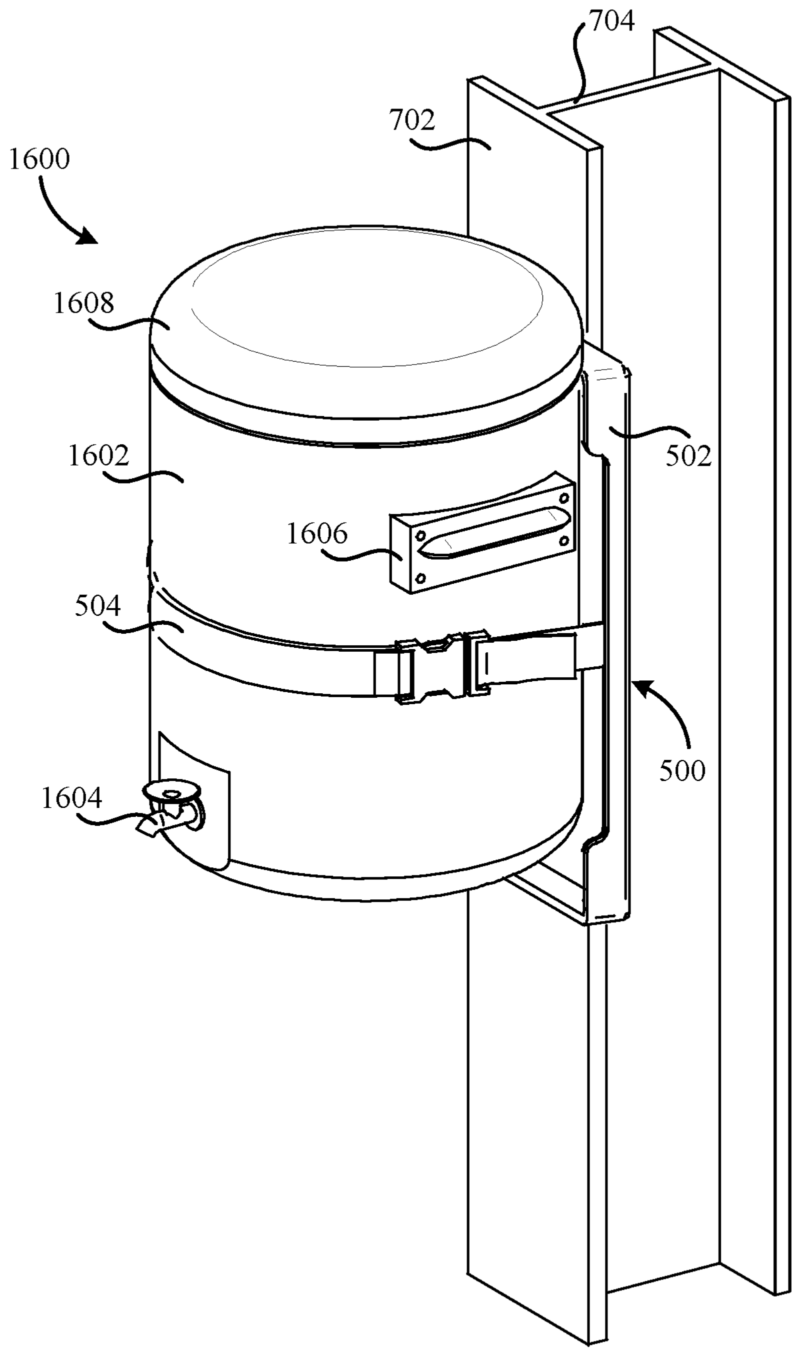
FIG. 20 is a perspective view of the water cooler of FIG. 16 mounted to vertical I-beam via magnetic tray.

FIG. 18 shows a side view of water cooler 1600 according to an alternative embodiment of the present invention. Cooler 1600 is shown sectioned along line D-D of FIG. 16. Note that the embodiments illustrated in FIG. 17, FIG. 18, FIG. 19, and FIG. 20 differ only slightly in that the location and/or layout of the magnet assembly thereof. FIGS. 17-19 differ only in that the location of magnets 1726 with respect to first rigid layer 1702 is slightly different for each. FIG. 20 differs in that the magnet assembly is in the form of a removable magnetic assembly. In order to avoid redundancy, the elements of FIG. 16, FIG. 17, FIG. 18, FIG. 19, and FIG. 20 that are identical and/or substantially similar will be denoted with like reference numbers and will not be described repeatedly in detail.

As shown in FIG. 18, magnets 1726 are coupled to an interior surface 1800 of first rigid layer 1702 opposite bottom exterior surface 1708. This can be achieved by any suitable means such as, for example, an adhesive, mechanical fastener, forming insulation 1704 directly over surface 1800 after magnets 1726 are positioned thereon, etc.

As shown in FIG. 19, magnets 1726 are coupled to bottom exterior surface 1708 of bottom wall 1612. This can also be achieved by any suitable means such as, for example, an adhesive, mechanical fastener, etc.

FIG. 20 shows a perspective view of water cooler 1600 according to yet another alternative embodiment of the present invention. Water cooler 1600 is fastened to flat vertical surface 702 of I-beam 704 via tray 500. As shown, fastening device 504 is fastened around side wall 1614 of water cooler 1600 so as to secure water cooler 1600 onto rigid support structure 502 of tray 500. As shown, bottom wall 1612 of water cooler 1600 is suspended above the ground to provide easy access to valve 1604. Accordingly, magnets 506 (not visible) of tray 500 provide a magnetic force sufficient to mount water cooler 1600 to vertical ferromagnetic surface when water cooler 1600 is full of fluid.

Figure 21:
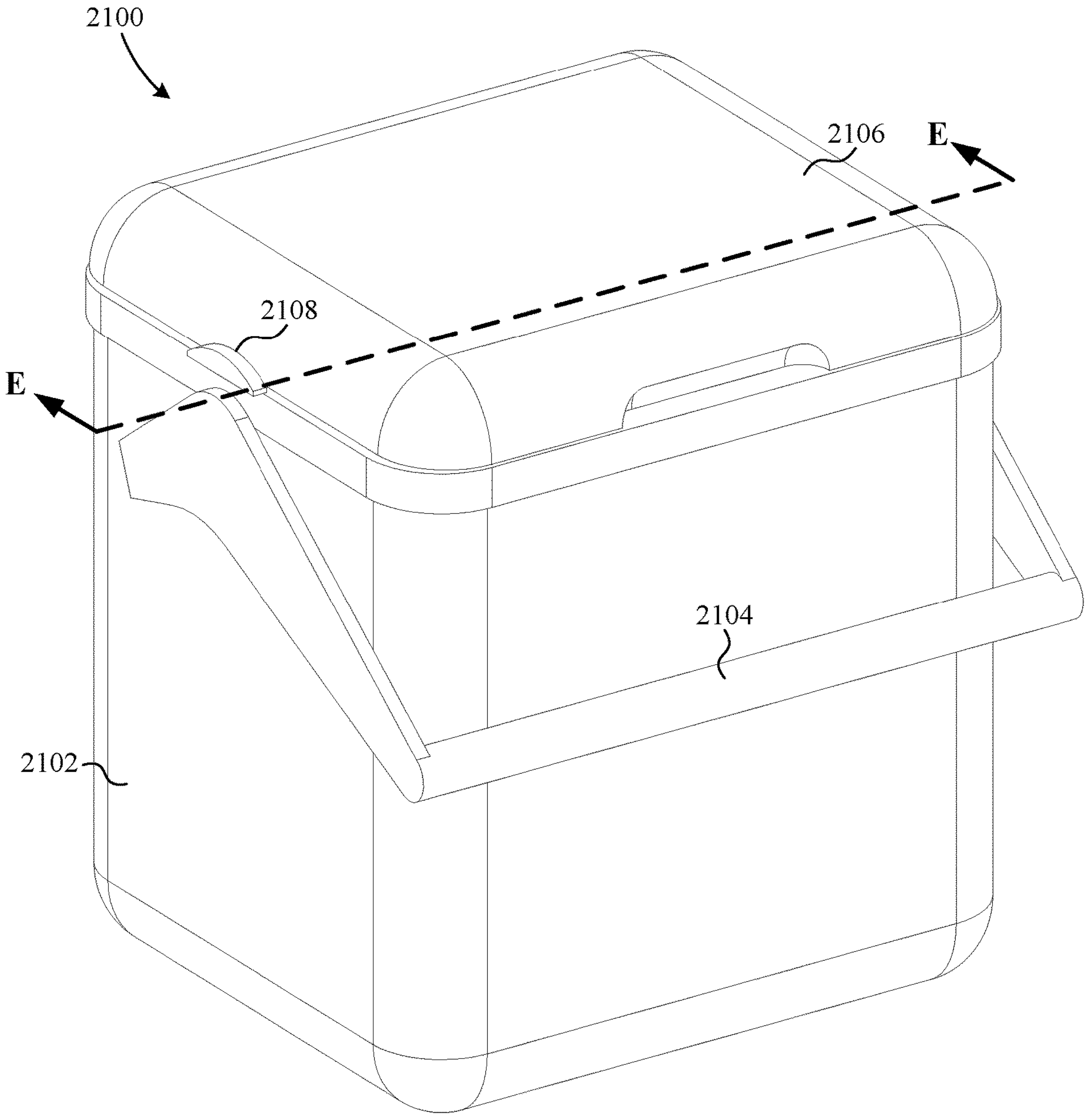
FIG. 21 is a perspective view of a rigid cooler.

FIG. 21 is a perspective view of a rigid cooler 2100 according to yet another embodiment of the present invention. As shown, cooler 2100 includes a body 2102, a handle 2104, and a lid 2106.

Lid 2106 includes a set of locking features 2108 protruding horizontally therefrom. Locking features 2108 and handle 2104, together, facilitate the locking of lid 2106 onto body 2102. The position of handle 2104 dictates whether or not lid 2106 is locked onto body 2102. For example, when handle 2104 is rotated forward as shown, lid 2106 can be lifted off of body 2102. When handle 2104 is upright, it engages locking features 2108 and, therefore, locks lid 2106 onto body 2102. When handle 2104 is rotated backward, it engages locking features 2108 and, therefore, locks lid 2106 onto body 2102.

Figure 22:
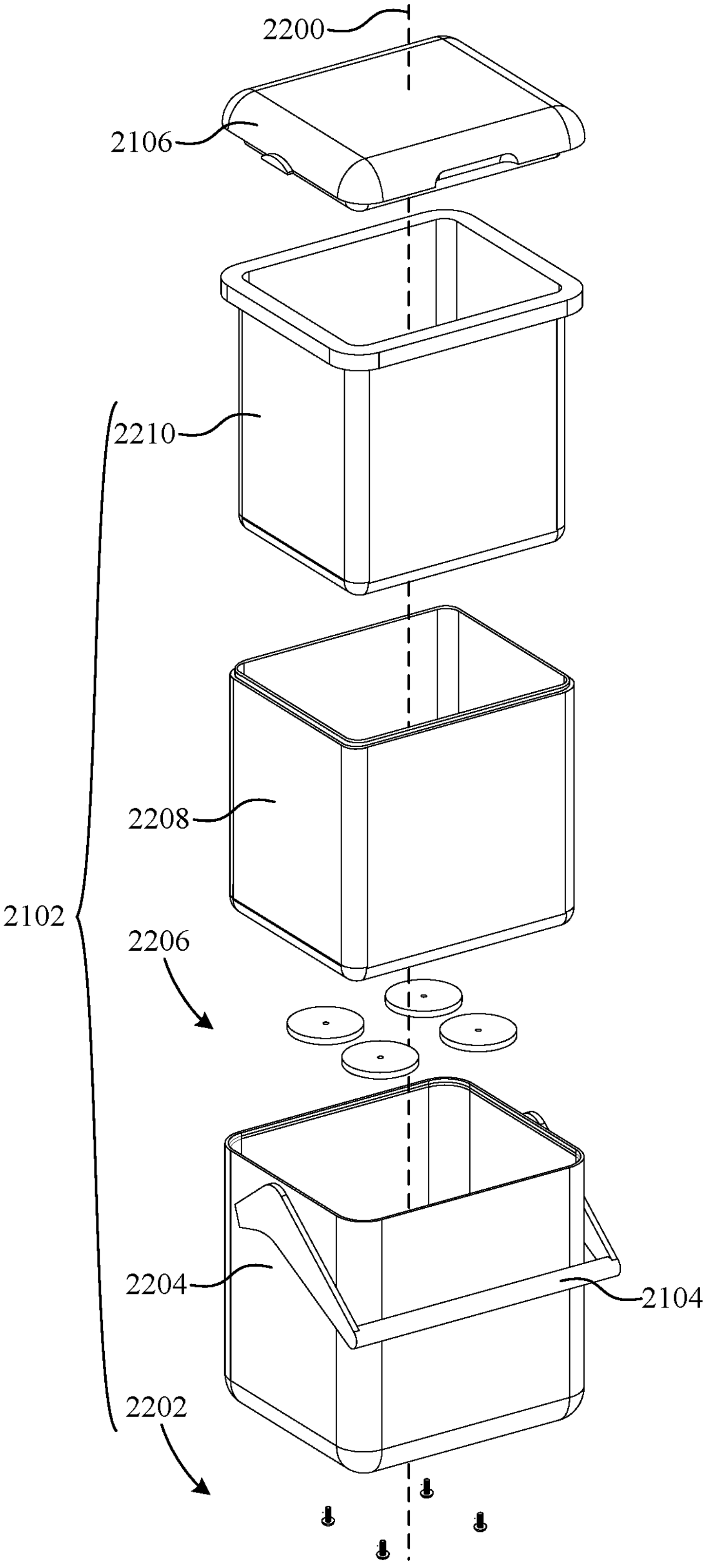
FIG. 22 is an exploded perspective view of the rigid cooler of FIG. 21.

FIG. 22 is a perspective view of cooler 2100 exploded along an axis 2200. As shown, body 2102 includes a set of screws 2202, an exterior structure 2204, a set of magnets 2206, an insulation structure 2208, and an interior structure 2210. Screws 2202 are disposed at the bottom of exterior structure 2204. Magnets 2206 are disposed between exterior structure 2204 and insulation structure 2208. Insulation structure 2208 is disposed between exterior structure 2204 and interior structure 2210.

Figure 23:
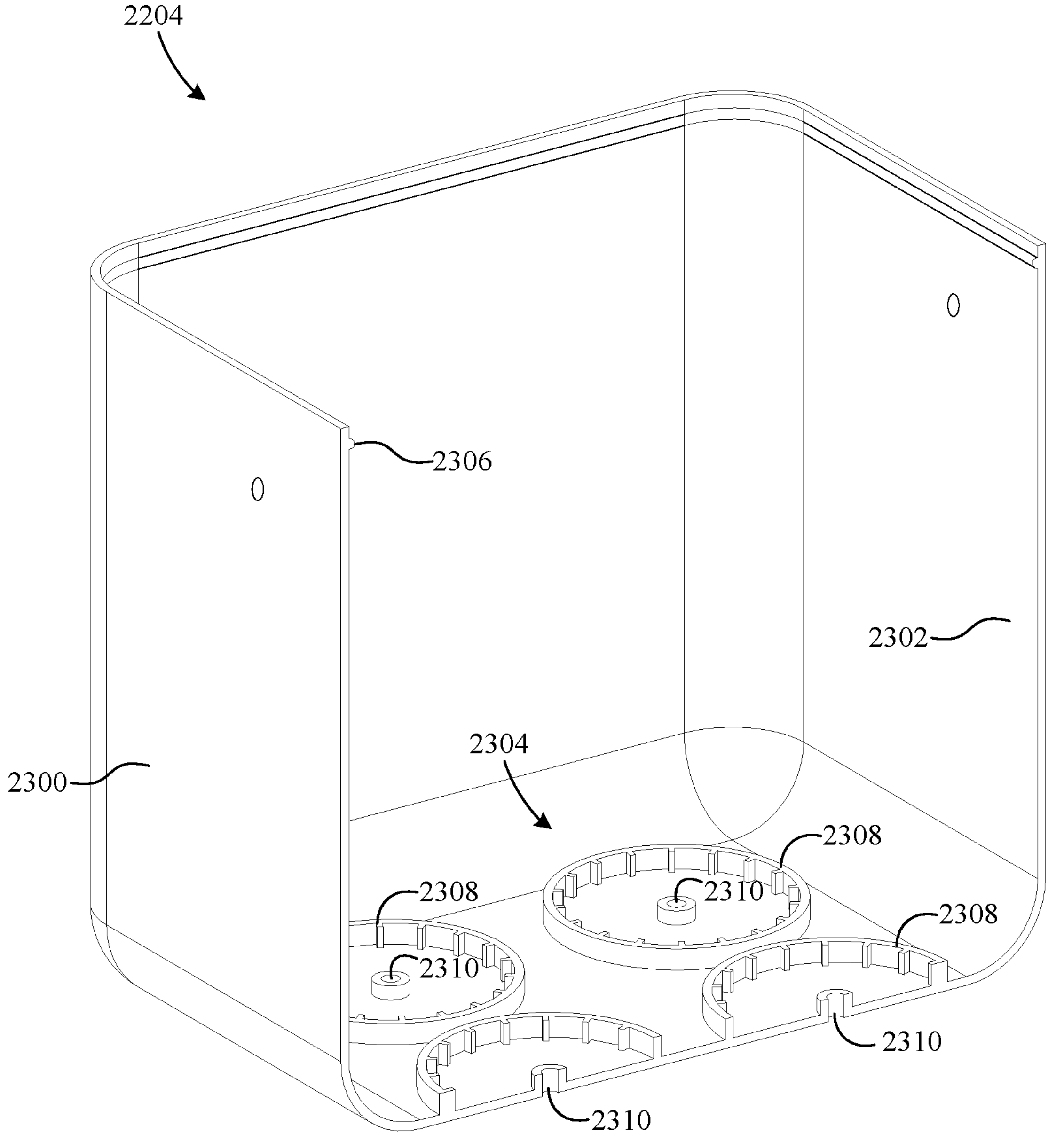
FIG. 23 is a cross-sectional perspective view of an exterior structure of the cooler of FIG. 21.

FIG. 23 is a perspective view of exterior structure 2204 sectioned along line E-E of FIG. 21. Exterior structure 2204 includes an exterior surface 2300 and an interior surface 2302. Exterior surface 2300 defines the exterior surface of cooler 2100. Interior surface 2302 defines a plurality of magnet seating features 2304 and a snap feature 2306 formed thereon. Each magnet seating feature 2304 includes an outer wall 2308 coaxially aligned with a screw hole 2310. Snap feature 2306 is a lip formed on interior surface 2302 of exterior structure 2204 so as to facilitate the direct mechanical coupling of exterior structure 2204 and interior structure 2210. In the example embodiment, exterior structure 2204 is a molded polymer structure that is formed prior to assembling cooler 2100.

Figure 24:
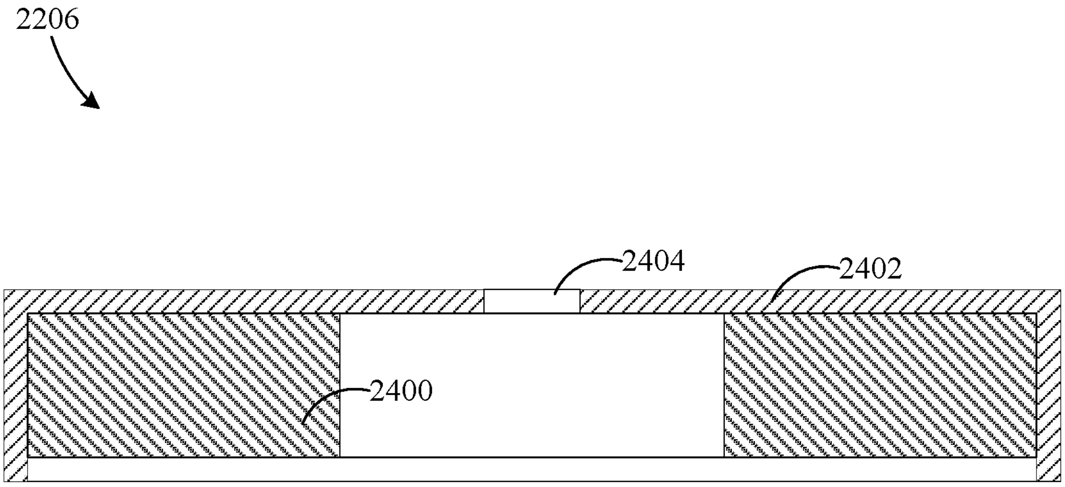
FIG. 24 is a cross-sectional side view of a magnet of the cooler of FIG. 21.

FIG. 24 is a side view showing one of magnets 2206 sectioned along line E-E of FIG. 1. Each of magnets 2206 includes an annular magnetic body 2400 and a shunt shield 2402. Although not shown, body 2400 is mounted in shield 2402 by some suitable means such as, for example, adhesive. Shield 2402 includes a screw hole 2404 through which one of screws 2202 is disposed when cooler 2100 is assembled.

Figure 25:
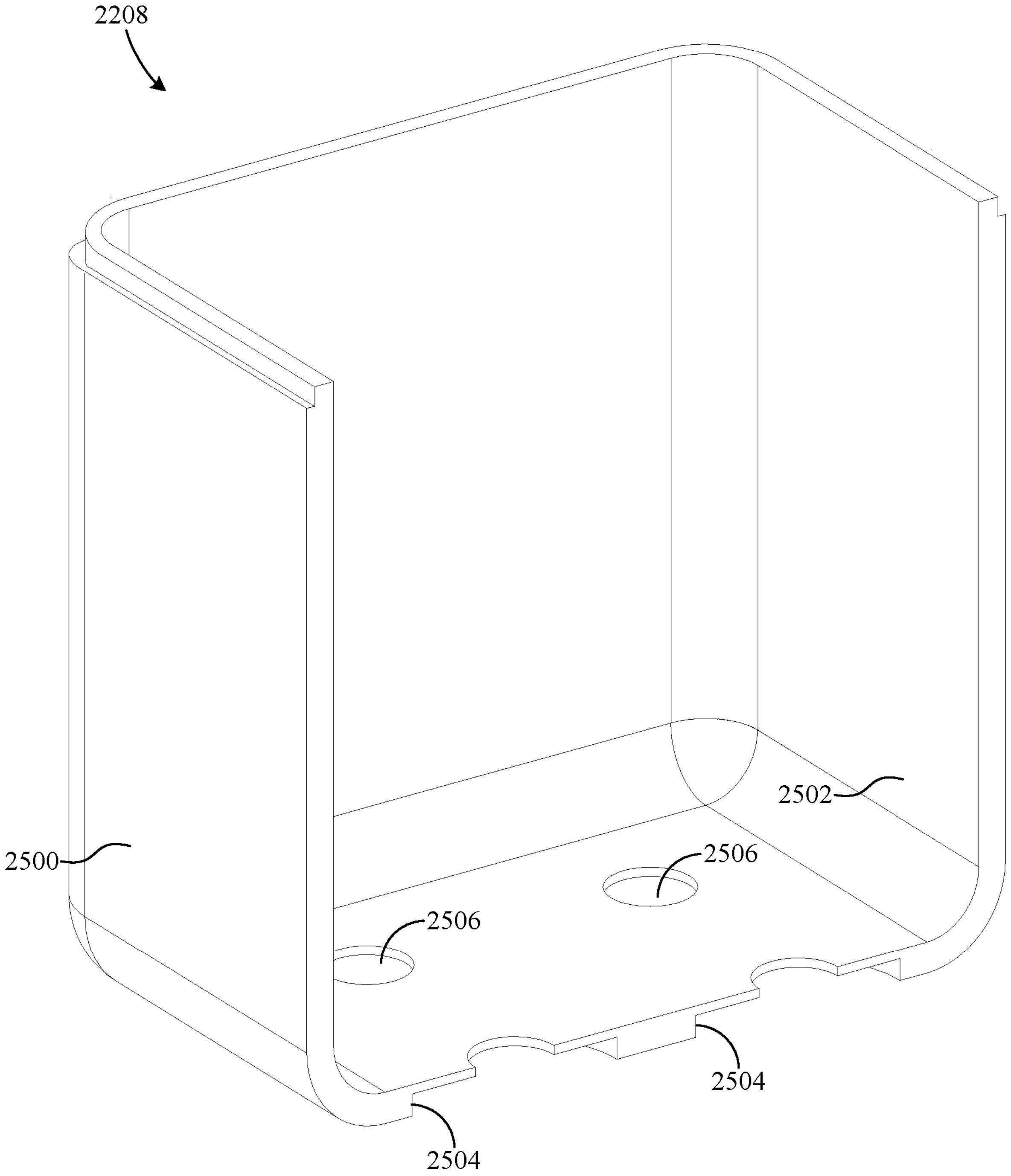
FIG. 25 is a cross-sectional perspective view of an insulation structure of the cooler of FIG. 21.

FIG. 25 is a perspective view of insulation structure 2208 sectioned along line E-E of FIG. 21. Insulation structure 2208 includes an exterior surface 2500 and an interior surface 2502. Exterior surface 2500 defines a plurality of recessed regions 2504 wherein magnet seating features 2304 are disposed when cooler 2100 is assembled. Interior surface 2502 defines a plurality of through-holes 2506 through which interior structure 2210 can be accessed by screws 2202. In the example embodiment, insulation structure 2208 is a rigid, molded foam structure that is formed prior to assembling cooler 2100.

Figure 26:
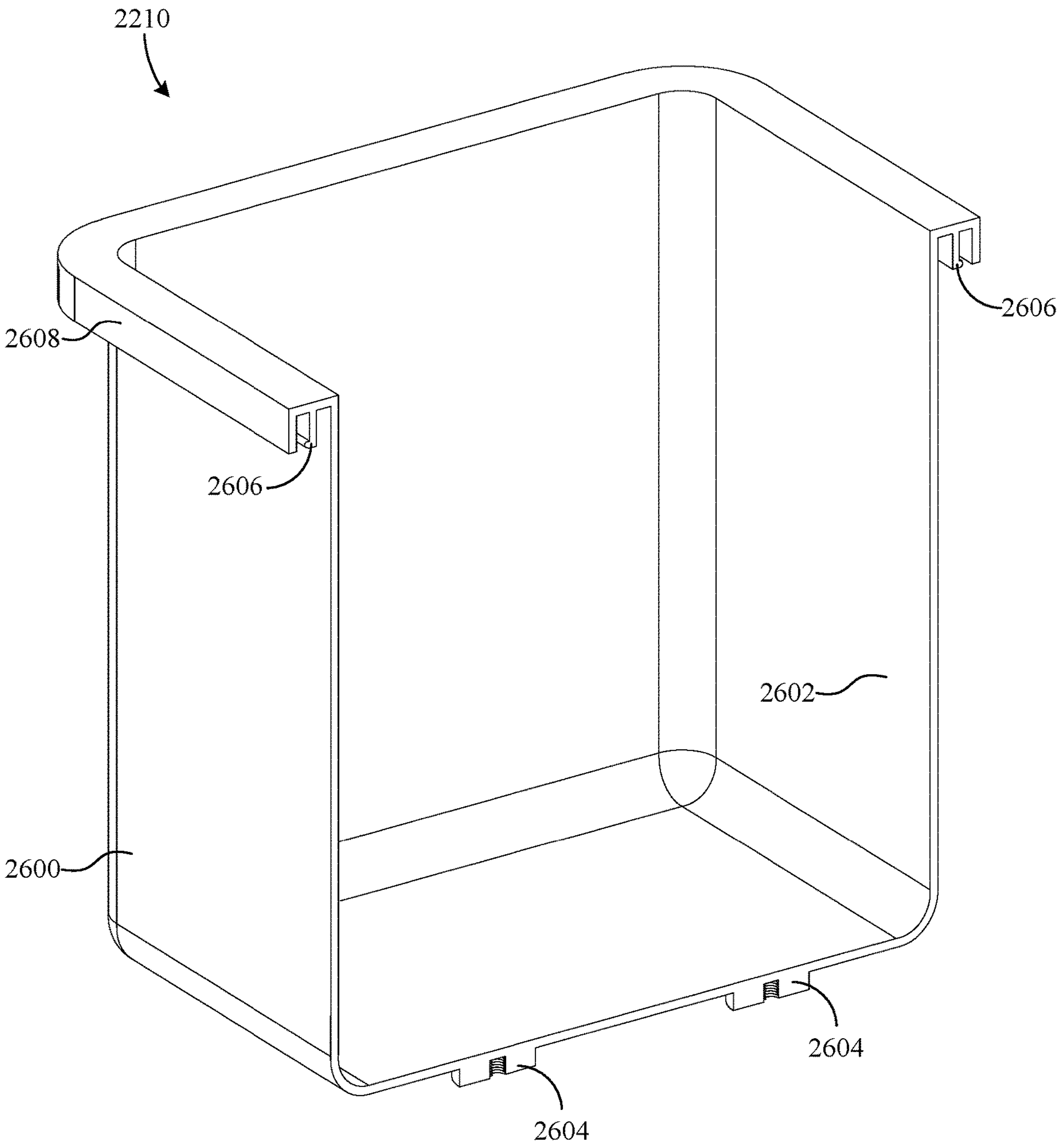
FIG. 26 is a cross-sectional perspective view of an interior structure of the cooler of FIG. 21.

FIG. 26 shows a perspective view of interior structure 2210 sectioned along line E-E of FIG. 21. Interior structure 2210 includes an exterior surface 2600 and an interior surface 2602. Exterior surface 2600 defines a plurality of screw bosses 2604 and snap feature 2606. Screw bosses 2604 are adapted to abut the top of magnet shield 2402 and receive screws 2202. Snap feature 2606 is adapted to engage complementary snap feature 2306 of exterior structure 2204 so as to facilitate the mechanical coupling of exterior structure 2204 and interior structure 2210. As shown, snap feature 2606 is formed on a lip 2608 of interior structure 2210. In the example embodiment, interior structure 2210 is a molded polymer structure that is formed prior to assembling cooler 2100.

Figure 27:
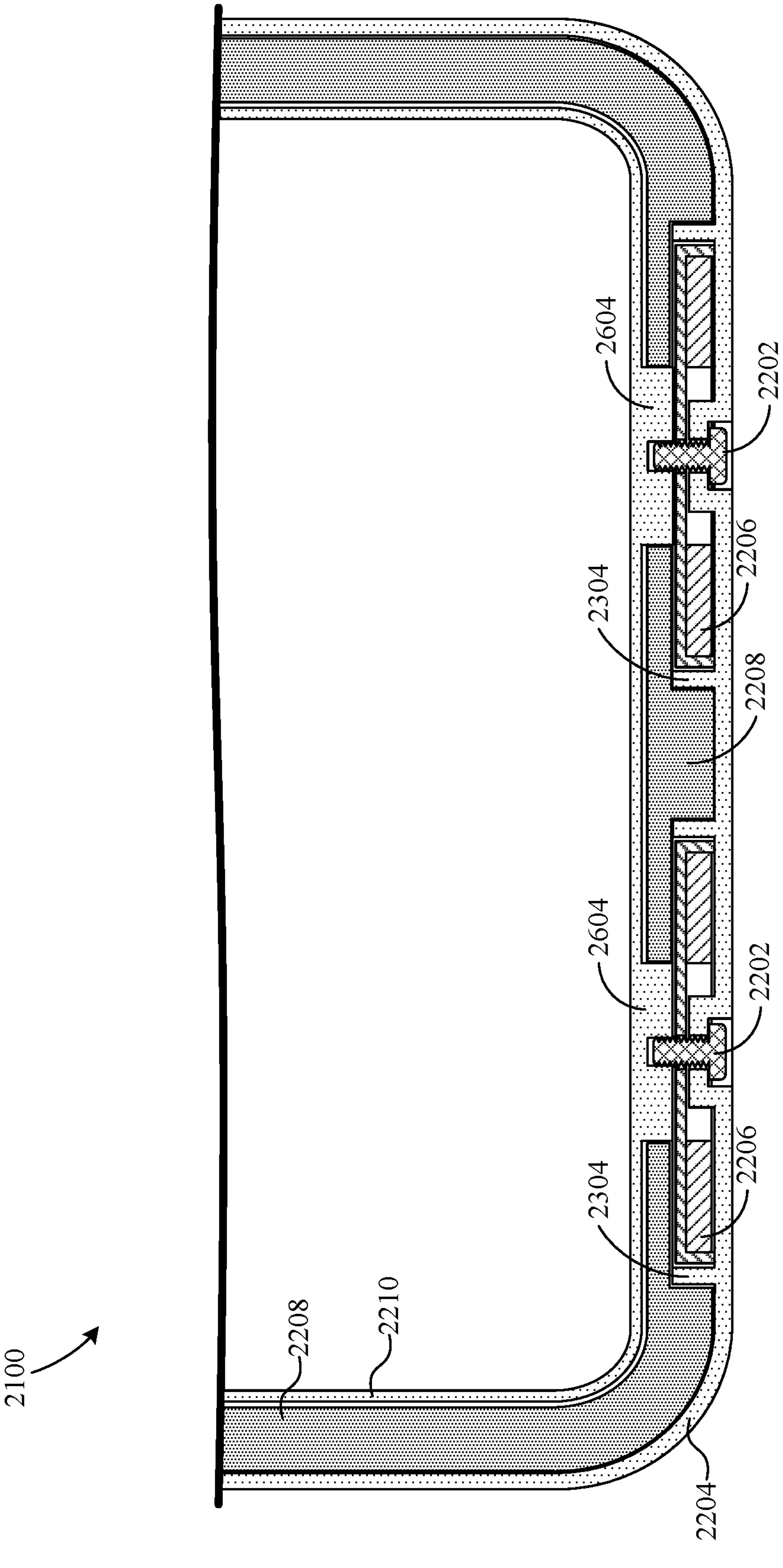
FIG. 27 is a cross-sectional side view of the bottom of the cooler of FIG. 21 assembled.
Figure 28:
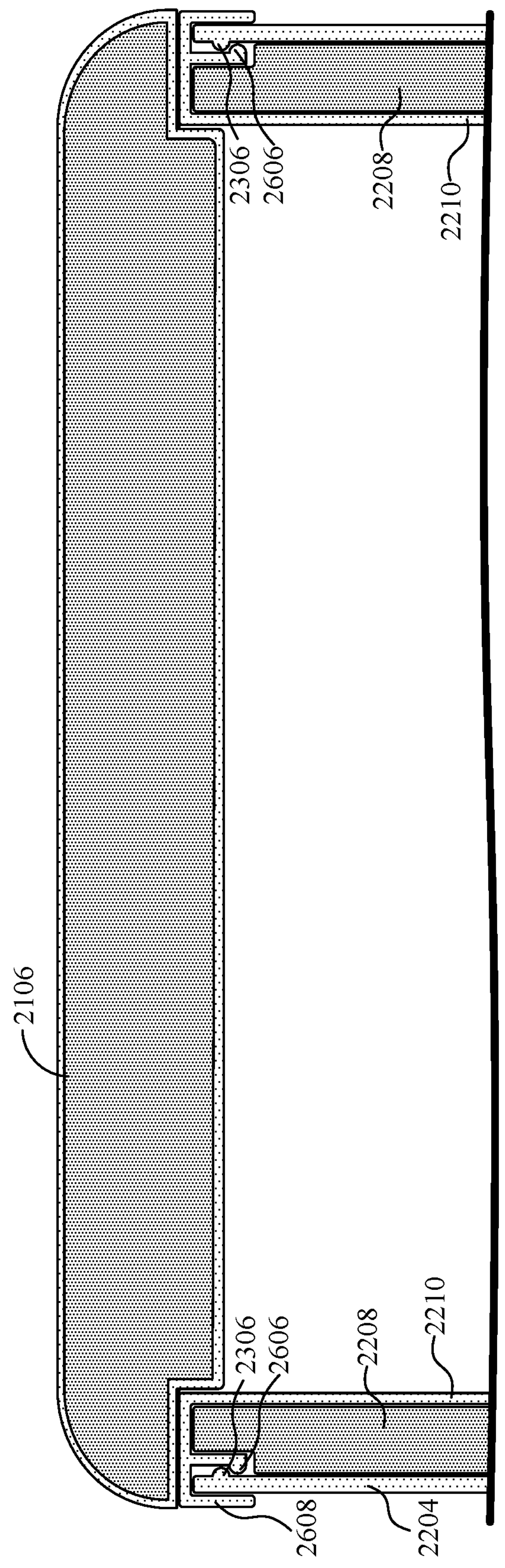
FIG. 28 is a cross-sectional side view of the top of the cooler of FIG. 21 assembled.

FIGS. 27 and 28 show cross-sectional side views of the bottom and top, respectively, of cooler 2100 taken along line E-E of FIG. 21. The assembly of cooler 2100 is described with reference to FIGS. 27 and 28. First, each of magnets 2206 is seated in a respective one of magnet seat features 2304 of exterior structure 2204. Then, insulation structure 2208 is inserted into exterior structure 2204 such that each of magnet seat features 2304 are seated in a respective one of recesses 2504. Next, interior structure 2210 is inserted into insulation structure 2208 such that each of screw bosses 2604 is disposed through a respective one of holes 2506. Interior structure 2210 is then urged down until snap feature 2306 and complementary snap feature 2606 snap together as shown in FIG. 28. Then, screws 2202 are dispose through holes 2310 of exterior structure 2204, holes 2404 of magnets 2206, and into screw bosses 2604 of interior structure 2210. As screws 2202 are tightened, each of screw bosses 2604 abuts the top of a respective one of magnets 2206.

Figure 29:
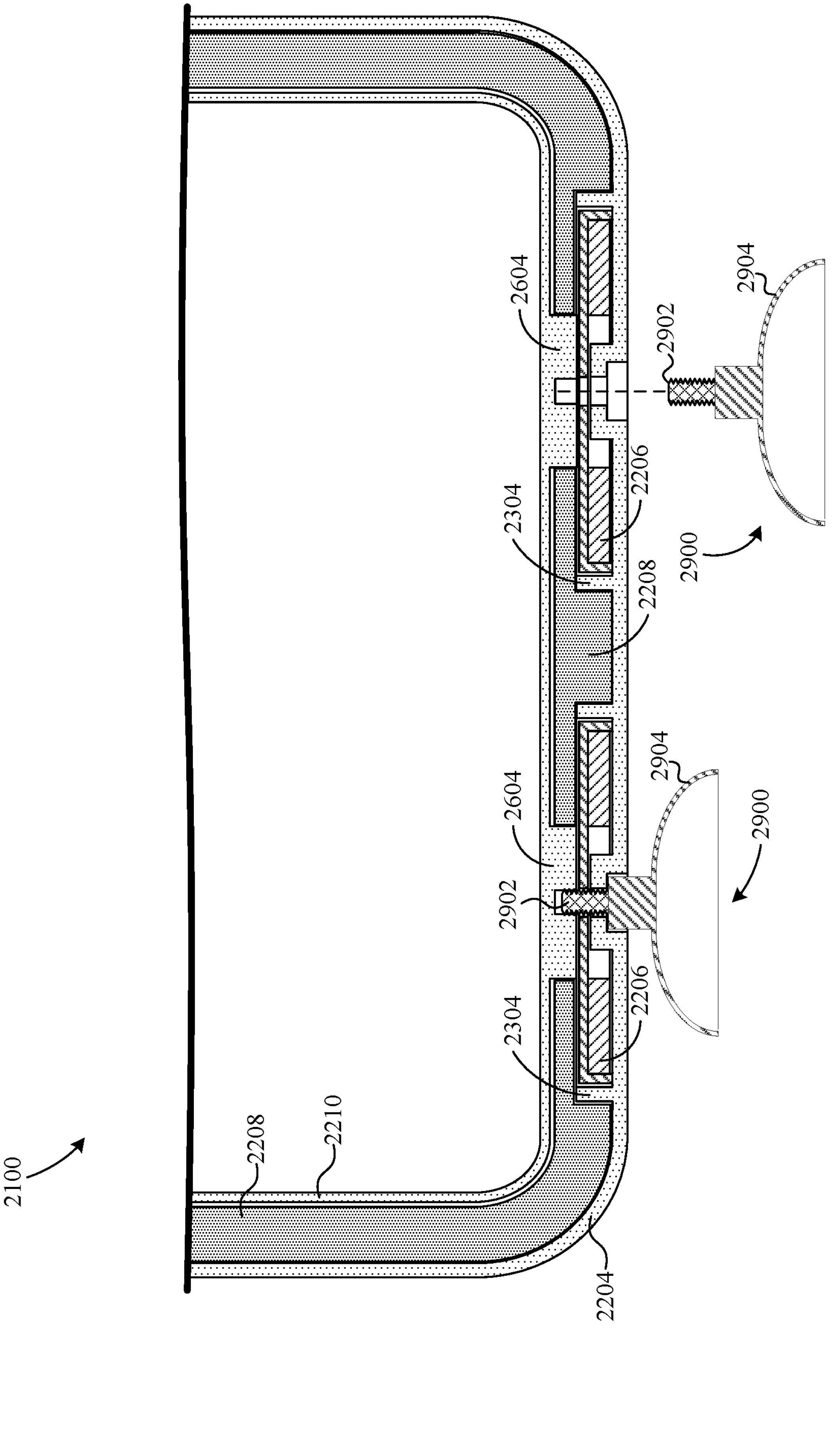
FIG. 29 is a cross-sectional side view of the bottom of the cooler of FIG. 21 showing an optional feature of the present invention.

FIG. 29 is a cross-sectional side view of cooler 2100 according to another embodiment of the present invention. In this particular embodiment, cooler 2100 is also adapted to be affixed to smooth flat surfaces such as, for example, glass, plastic, fiber glass, etc. As shown, cooler 2100 includes a plurality of suction cup assemblies 2900 that can be optionally attached to the bottom of cooler 2100. To install suction cup assemblies 2900, each of screws 2202 is simply removed and replaced by a respective one of suction cup assemblies 2900. To be able to magnetically attach cooler 2100 to ferrous objects, suction cups assemblies 2900 are simply removed and replaced by screws 2202. Indeed, with this optional feature, cooler 2100 can be adapted to attach to ferrous objects or, optionally, smooth flat surfaces that may or may not contain ferrous material. Such a feature is particularly useful when cooler 2100 is used in places where there are no ferrous structures available such as, for example, on a fiberglass boat. Thus, providing both screws 2202 and suction cup assemblies 2900 with cooler 2100 provides an advantage.

Each of suction cup assemblies 2900 includes a threaded metal shaft 2902 and a resilient body 2904. Threaded metal shaft 2902 has the same thread specifications (i.e. pitch, inner diameter, outer diameter, etc.) as screws 2202. As shown, threaded shafts 2902 not only facilitate the mounting of suction cup assemblies 2900 onto cooler 2100, but also provide the same fastening function as screws 2202. That is, threaded shafts 2902 are also operative to fasten interior structure 2210 and exterior structure 2204 together. Resilient body 2904 is a conventional suction cup that attaches to flat smooth surfaces. Body 2904 is permanently attached to threaded shaft 2902 by some suitable means. For example, body 2904 could be insert-molded around an end structure of threaded shaft 2904. As another example, body 2904 could be formed separately from threaded shaft 2904 and then bonded to one another thereafter.

Figure 30:
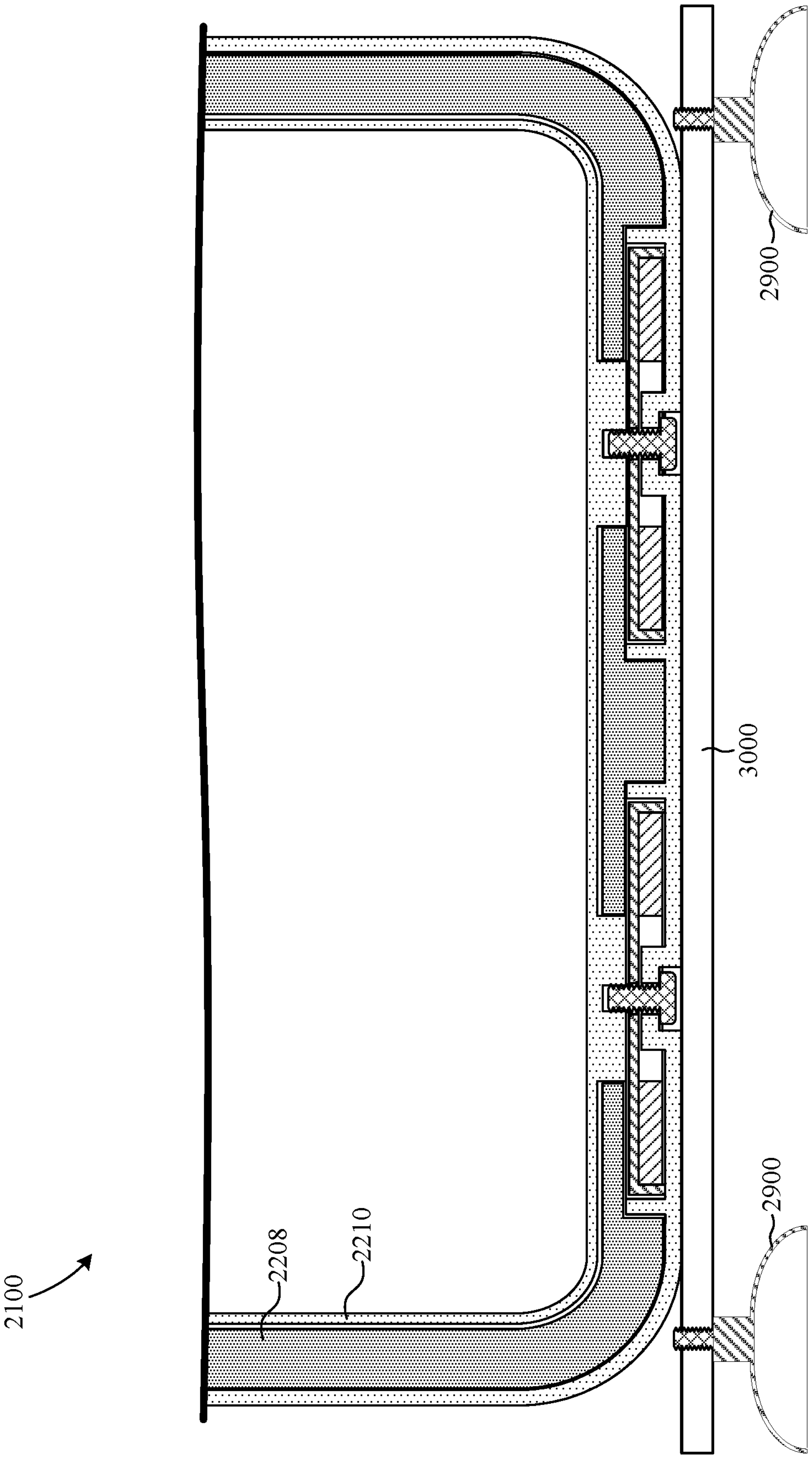
FIG. 30 is a cross-sectional side view of the bottom of the cooler of FIG. 21 showing another optional feature of the present invention.

FIG. 30 shows another optional feature of the present invention. In particular, suction cup assemblies 2900 are fixed to a rigid ferromagnetic plate 3000. Suction cup assemblies facilitate the attachment of plate 3000 to smooth, nonmagnetic surfaces, as described above. Cooler 2100 can then be magnetically coupled to plate 3000 as described above, and thereby indirectly coupled to the smooth, nonmagnetic surface to which plate 3000 is attached.

Figure 31:
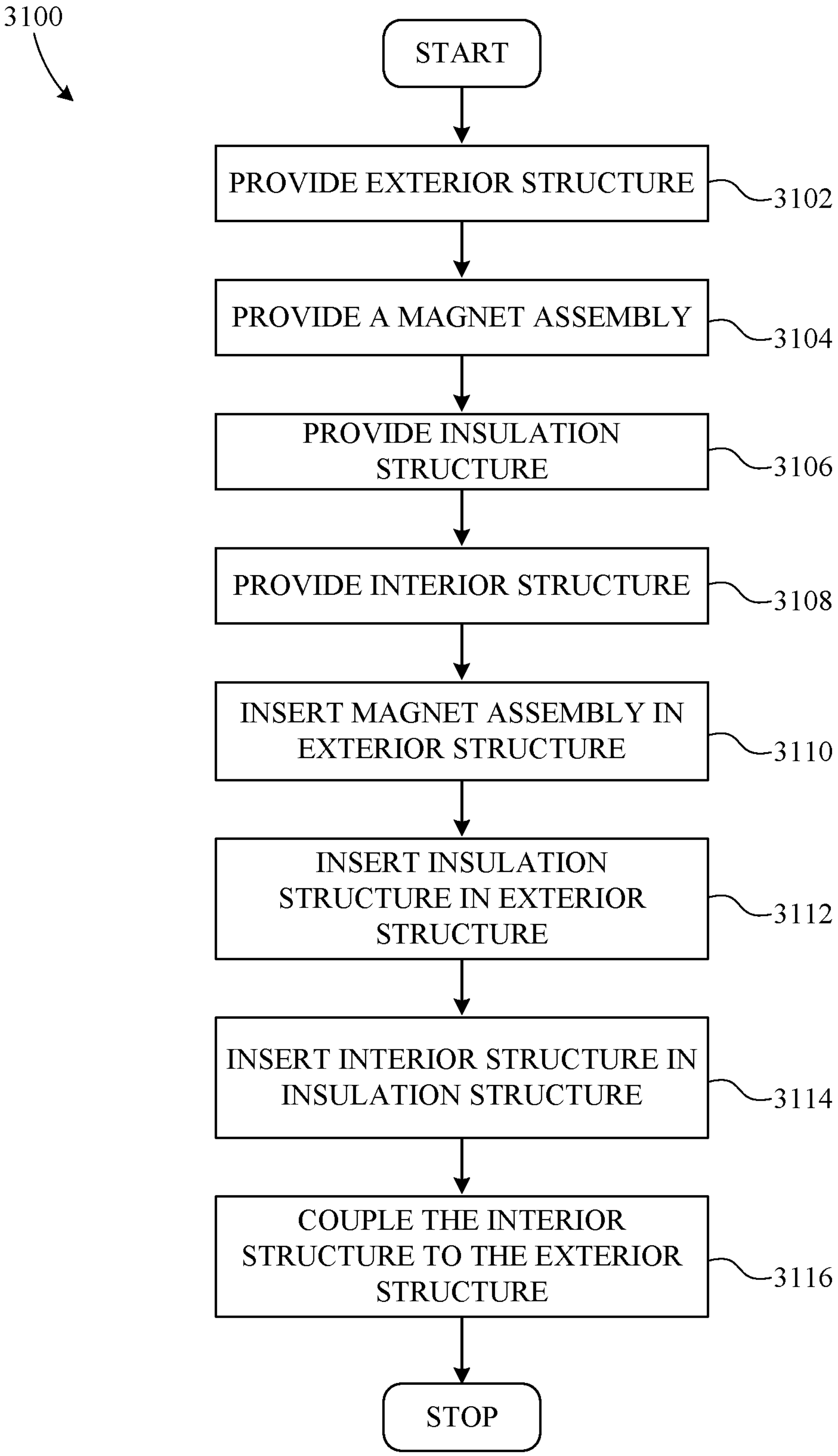
FIG. 31 is a flowchart summarizing a method for manufacturing a thermally insulated enclosure.

FIG. 31 is a flowchart summarizing a method 3100 for manufacturing a thermally insulated enclosure. In a first step 3102, an exterior structure is provided. Then, in a second step 3104, a magnet assembly is provided. Next, in a third step 3106, an insulation structure is provided. Then, in a fourth step 3108, an interior structure is provided. Next, in a fifth step 3110, the magnet assembly is inserted into the exterior structure. Then, in a sixth step 3112, the insulation structure is inserted in the exterior structure. Next, in a seventh step 3114, the interior structure is inserted in the insulation structure. Finally, in an eighth step 3116, the interior structure is coupled to the exterior structure.

Figure 32:
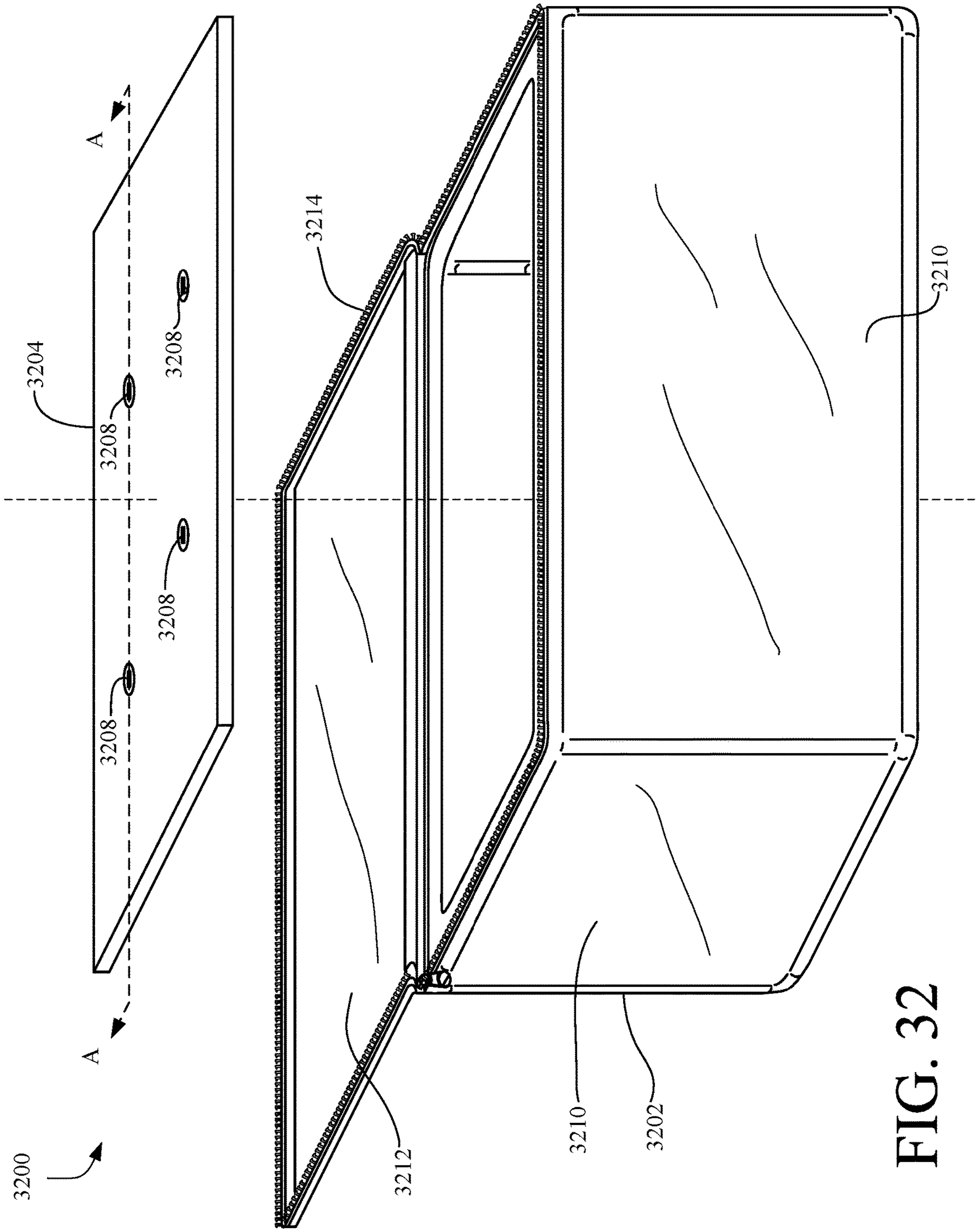
FIG. 32 is a perspective view of a collapsible cooler in combination with a magnet carrier insert.

FIG. 32 is a perspective view of a magnetic cooler 3200, which includes a collapsible cooler 3202 in combination with a magnet carrier insert 3204. Magnet carrier insert 3204 includes a plurality of magnets (not visible in the view of FIG. 32), each fixed to magnet carrier insert 3204 by an associated fastener 3208.

Collapsible cooler 3203 includes four walls 3210, a bottom (not visible in the view of FIG. 32), and a hinged top 3212. Each of walls 3210, the bottom, and top 3212 are pliable and include an insulating material to inhibit the flow of heat therethrough. Top 3212 can be closed and secured to the top edges of walls 3210 by any suitable fastener. In this example embodiment, the fastener is a zipper 3214.

In use, magnet carrier 3204 is placed inside of cooler 3202, to rest on the bottom of cooler 3202. Ice and other contents (e.g., drinks, food, etc.) are then placed inside cooler 3202 on top of magnet carrier 3204, and top 3212 is secured by zipper 3214. Then, when cooler 3202 is placed on a ferromagnetic surface, the magnets fixed to magnet carrier 3204 magnetically engage the ferromagnetic surface through the bottom of cooler 3202 and hold cooler 3202 in place.

Magnet carrier 3204 provides an important advantage over other magnetic coolers and/or warmers. In particular, the use of magnetic carrier 3204 eliminates, or at least minimizes, design constraints on cooler 3202. Indeed, in this particular embodiment, collapsible cooler 3202 is a conventional cooler that can be used with or without magnet carrier 3204. No alterations of cooler 3202 are required to use cooler 3202 in combination with magnet carrier 3204.

The ability to use magnet carrier 3204 (or similar magnet carrier) with conventional coolers, or to introduce magnet carrier 3204 into the manufacturing process of previously designed coolers, with few or no alterations of the original cooler design, provides tremendous savings in design time, tooling costs, and manufacturing complexity. Additional embodiments are described below to further illustrate this important feature of the present invention.

Figure 33:
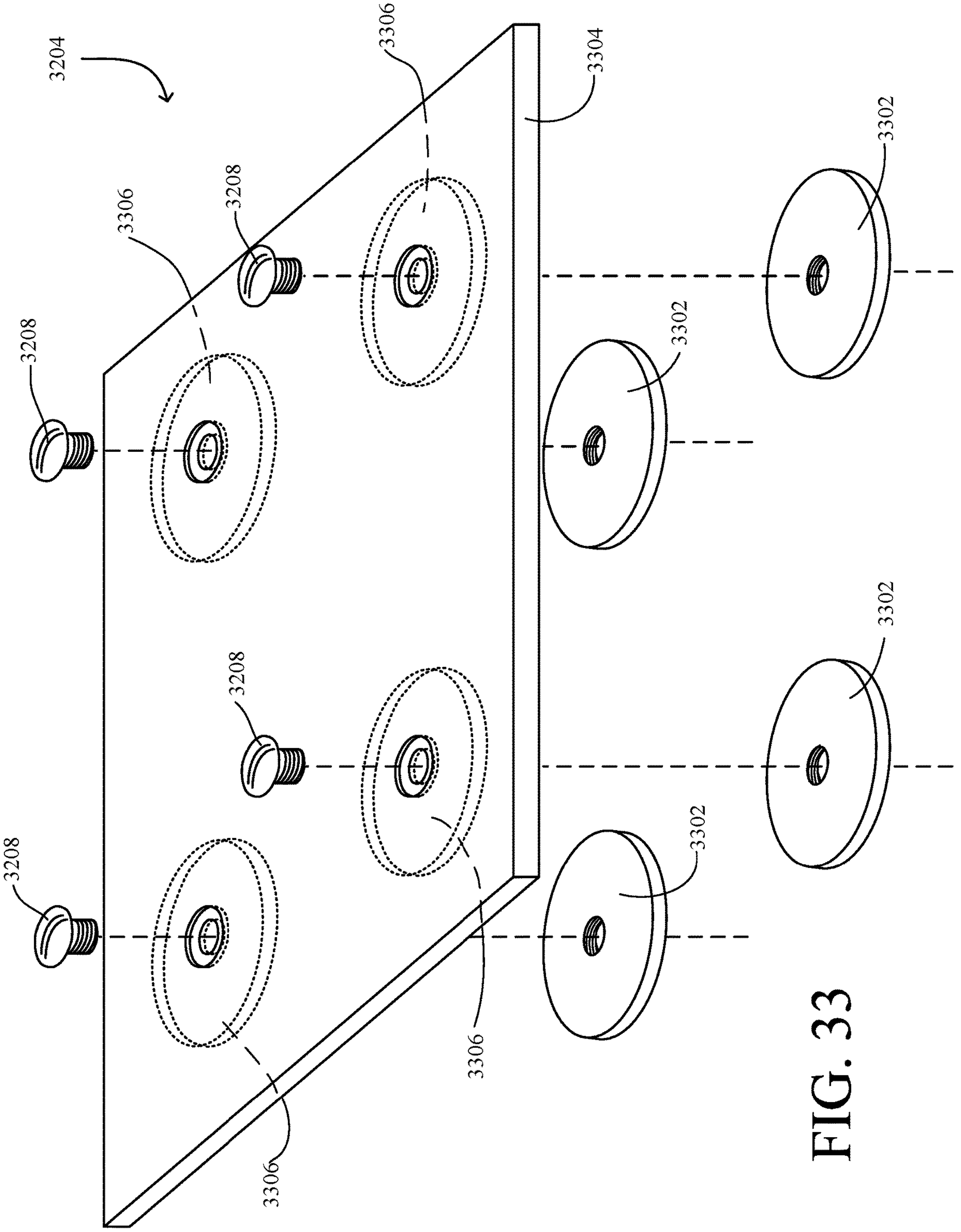
FIG. 33 is an exploded view of the magnet carrier insert of FIG. 32.

FIG. 33 is an exploded view of magnet carrier insert 3204, which includes a plurality of magnets 3302 fixed to a substrate 3304. Each magnet 3302 is disposed in a corresponding recess 3306 formed in the bottom of substrate 3304 and held in recess 3306 by an associated one of screws 3208. Recesses 3306 are of a depth that positions the bottom surface of each magnet 3302 at or just protruding from the bottom surface of substrate 3304. Screws 3208 pass through apertures in substrate 3304 and engage a complementary thread set formed in a center aperture of each magnet 3302. The heads of screws 3208 are countersunk into the top surface of substrate 3304 so that they do not protrude above the top surface of substrate 3304.

In FIG. 33, magnets 3302 are shown representationally as simple annular discs. However, magnets 3302 can be housed in a shunt shield as described above with reference to FIG. 24. In addition to providing a shunt for the magnetic field, the shunt casing can also provide a means (e.g., the screw threads shown in FIG. 33) to mount magnets 3302 to substrate 3304.

In this example embodiment, magnets 3302 are mechanically fastened to substrate 3304. However, any suitable means can be used to fix magnets to substrate 3304. For example, magnets 3302 can be molded into substrate 3304. For example, in a particular alternate embodiment, substrate 3304 is made from a thermally insulating material by molding the thermally insulating material around magnets 3302, leaving only the bottom surfaces of magnets 3302 exposed.

Figure 34:
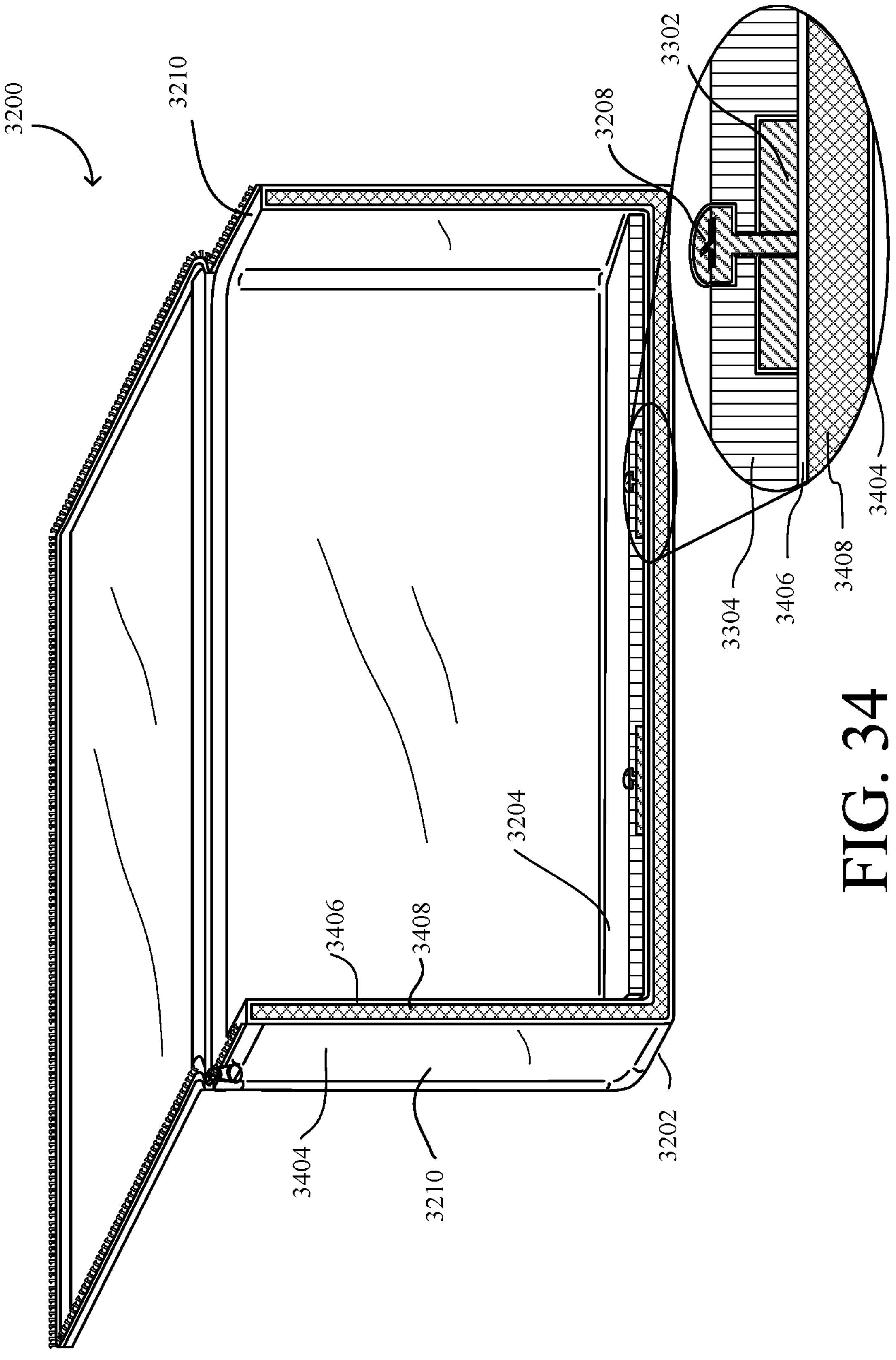
FIG. 34 is a cross-sectional view of the collapsible cooler of FIG. 32 with the magnet carrier inserted therein.

FIG. 34 is a cross-sectional view of collapsible cooler 3200 with magnet carrier 3204 inserted therein. Each wall 3210 of cooler 3200 includes a pliable outer covering 3404 (e.g., nylon fabric), a pliable inner covering 3406 (e.g., nylon fabric), and a pliable, thermally insulating layer 3408 (e.g., rubber) disposed between outer covering 3404 and inner covering 3406. Magnet carrier 3204 rest on the bottom of cooler 3200, directly on top of inner covering 3406, and can magnetically engage ferromagnetic surfaces, upon which cooler 3200 is placed, through inner covering 3406, insulating layer 3408, and outer covering 3404.

It is not necessary for each wall 3210 to be formed with multiple layers. For example, in an alternate embodiment, the walls of a cooler are formed from a single layer of thermally insulating material.

Figure 35:
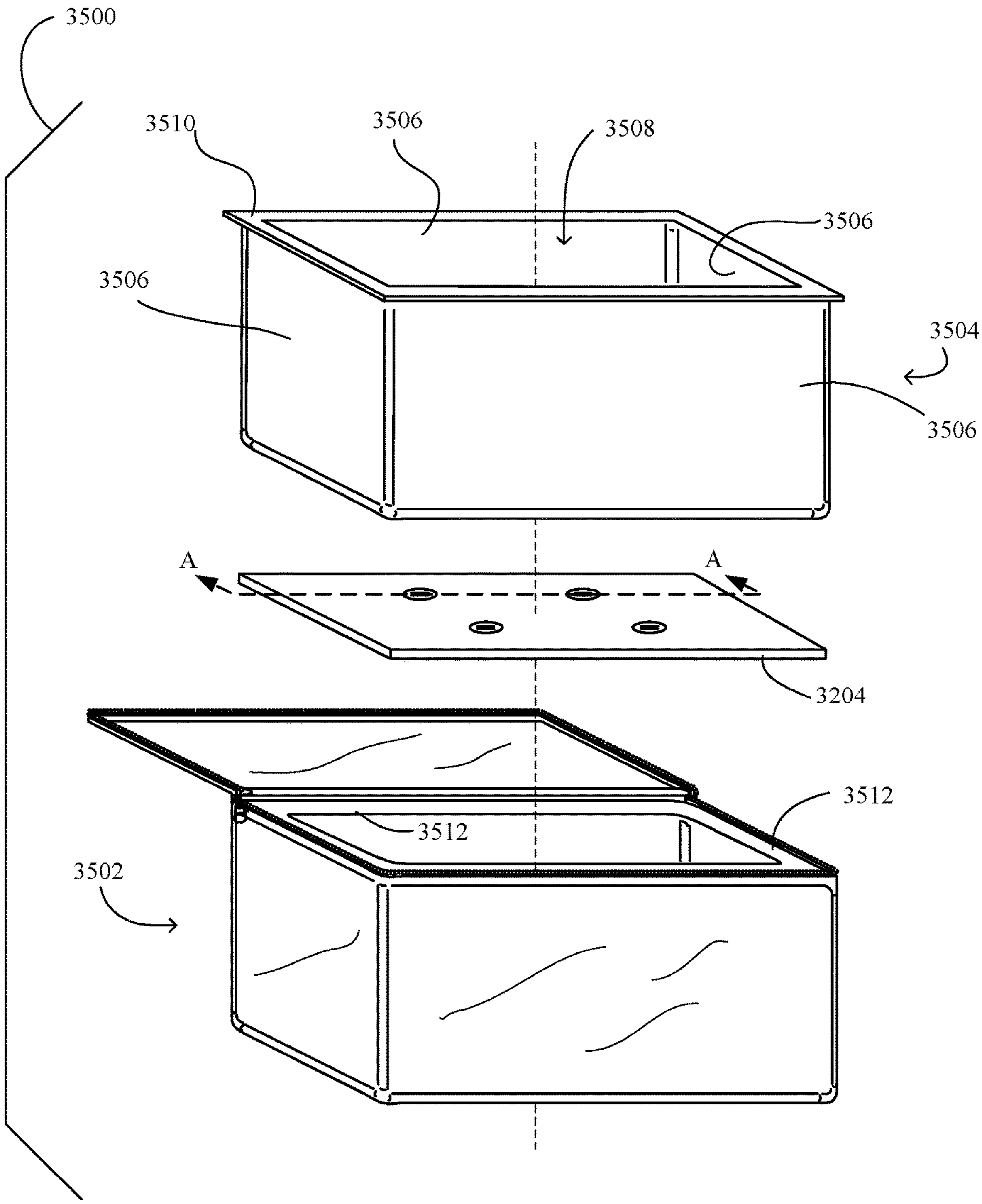
FIG. 35 is a perspective view of a collapsible cooler with a removable liner in combination with a magnet carrier insert.

FIG. 35 is a partially exploded, perspective view of a magnetic cooler 3500, which includes a collapsible cooler 3502 and a removable liner 3504, in combination with magnet carrier 3204. Collapsible cooler 3502 is similar to collapsible cooler 3202, except that collapsible cooler 3502 is sized to receive liner 3504. In this embodiment, liner 3504 is a molded plastic receptacle that fits inside collapsible cooler 3502. Liner 3504 includes a bottom (not visible in FIG. 35), four walls 3506, an opening 3508 defined by the top edges of walls 3506, and a lip 3510 surrounding opening 3508.

Magnetic cooler 3500 is assembled by placing magnet carrier 3204 inside and resting on the bottom of collapsible cooler 3502. Liner 3504 is then placed inside of collapsible cooler 3502, resting on magnet carrier 3204. The disposition of collapsible cooler 3502, magnet carrier 3204, and liner 3504 with respect to one another in the assembled position is shown in the cross-sectional view of FIG. 36.

Liner 3504 can be permanently fixed to or removably inserted into cooler 3502. In embodiments where liner 3504 is permanently fixed to cooler 3502 (e.g., by fixing lip 3510 to the top edges 3512 of the walls of collapsible cooler 3502), magnet carrier 3204 is inserted into collapsible cooler 3502 during the manufacturing process and remains in magnetic cooler 3500 throughout the life of the product. In embodiments where liner 3504 is removable from collapsible cooler 3502, magnet carrier 3204 can be inserted between collapsible cooler 3502 and liner 3504 either during the manufacturing process or after purchase by the consumer. Indeed, collapsible cooler 3502 and liner 3504 can be sold together as a non-magnetic cooler, and the consumer can purchase magnetic carrier 3204 separately. Then, the consumer can remove liner 3504 from collapsible cooler 3502, insert magnet carrier 3204 into collapsible cooler 3502, and reinsert liner 3504 into collapsible cooler 3502 on top of magnet carrier 3204, thereby creating a magnetic cooler from a previously non-magnetic cooler.

Figure 36:
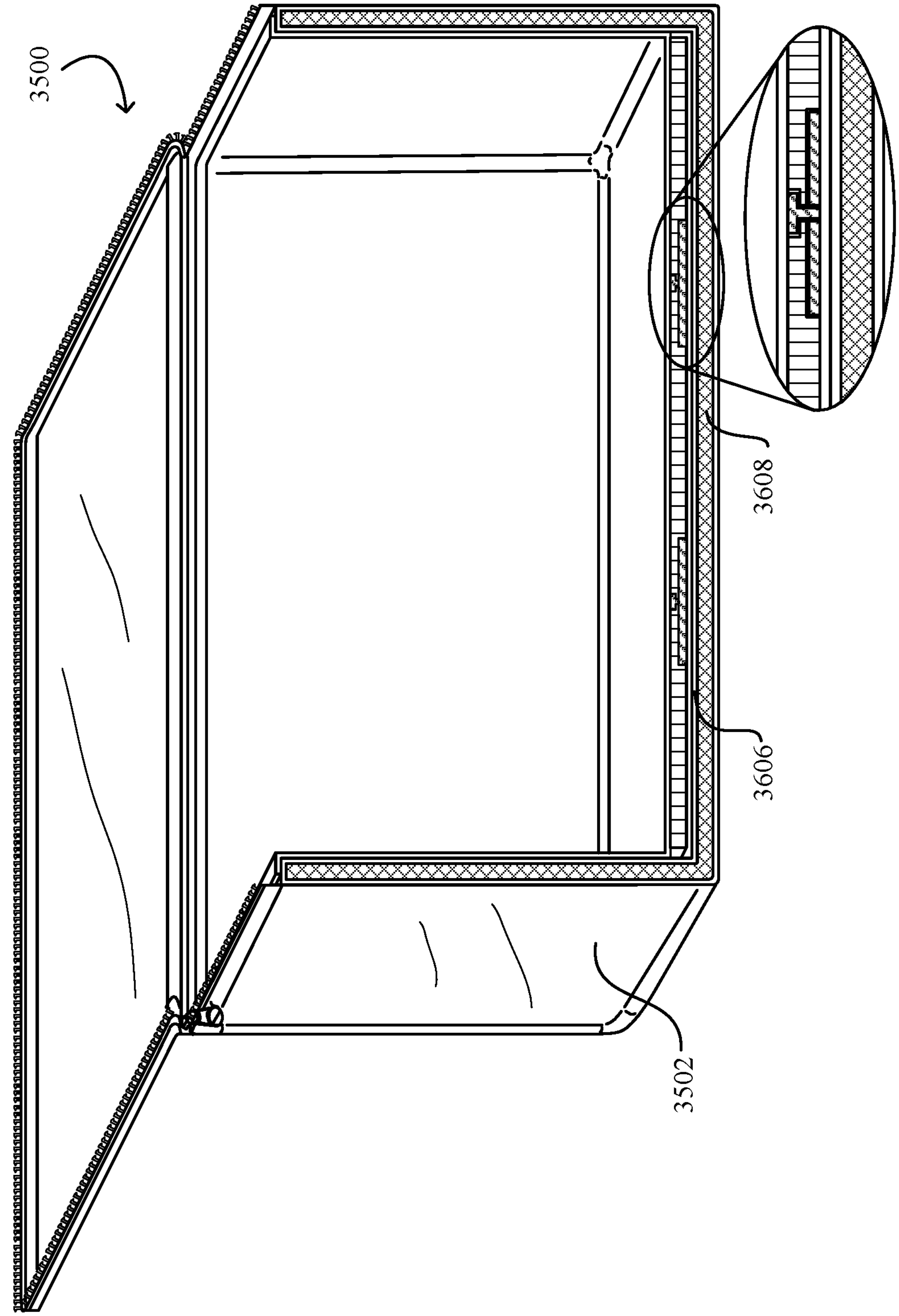
FIG. 36 is a cross-sectional view of the collapsible cooler of FIG. 35 with the removable liner and the magnet carrier inserted therein.

FIG. 36 is a cross-sectional view of collapsible cooler 3502 with liner 3504 and magnet carrier 3204 inserted therein. As shown in the enlarged portion of the view of FIG. 36, magnets 3302 are disposed below liner 3504 but above the inner covering 3606 and the insulating layer 3608.

In an alternate embodiment, the insulating layer 3608 and, optionally, the inner covering 3606, can be removable from the bottom wall of collapsible cooler 3502. In such embodiments, insulating layer 3608 can be removed before inserting magnet carrier 3204 into collapsible cooler 3502 and then replacing insulating layer 3608 into collapsible cooler 3502 on top of magnet carrier 3204. Disposing magnet carrier 3204 below insulating layer 3608 decreases the distance between magnets 3302 and the surface upon which cooler 3502 rests. As a result, weaker, less expensive, and/or lighter magnets can be advantageously used. As yet another option, substrate 3304 can be formed from an insulating material, and insulating layer 3608 can be omitted from the bottom wall of cooler 3502.

Figure 37:
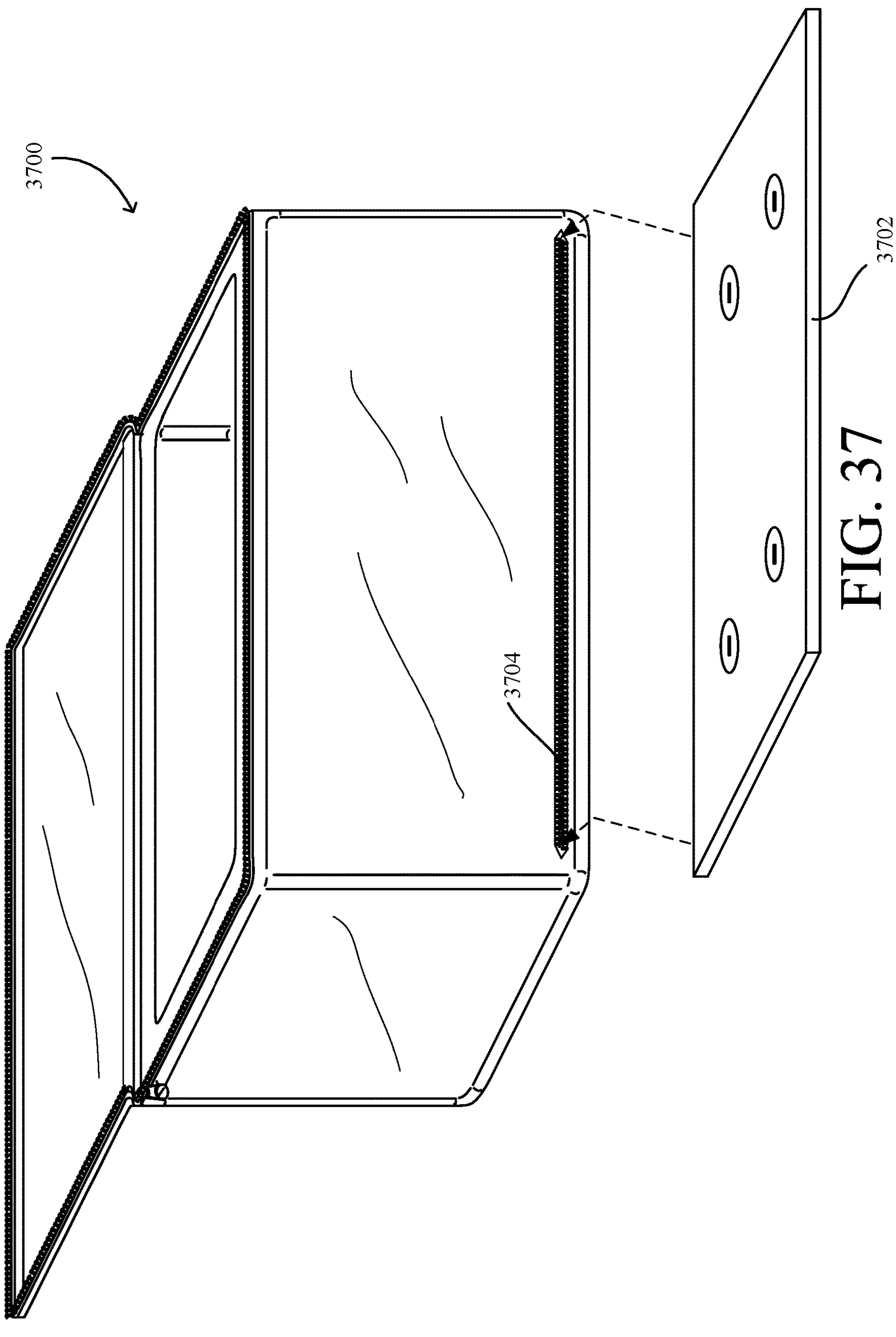
FIG. 37 is a perspective view of a collapsible cooler specifically adapted to accept a magnet carrier insert in a bottom wall of the collapsible cooler.

FIG. 37 is a perspective view of a collapsible cooler 3700 specifically adapted to accept a magnet carrier insert 3702 in a bottom wall of collapsible cooler 3700. Magnet carrier 3702 is substantially similar to magnet carrier 3204 and will not, therefore, be described in greater detail. Collapsible cooler 3700 is similar to collapsible cooler 3202, except that cooler 3700 includes a zippered opening 3704, through which magnet carrier 3702 can be inserted into the bottom wall of cooler 3700. Alternate closure means (e.g., hook and loop fastener, snaps, etc.) can be substituted for the zipper used to secure opening 3704.

Figure 38:
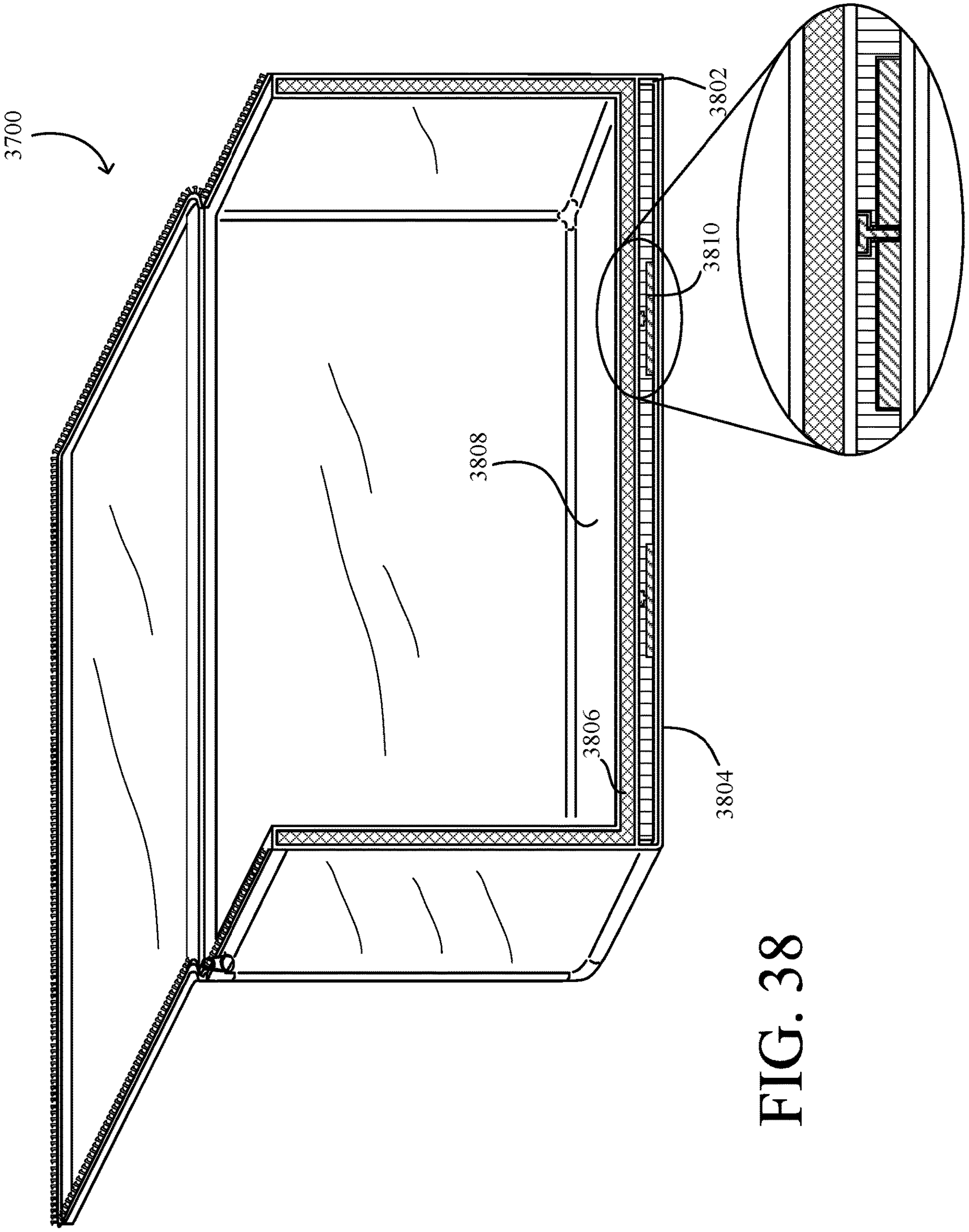
FIG. 38 is a cross-sectional view of the collapsible cooler of FIG. 37 with the magnet carrier inserted therein.

FIG. 38 is a cross-sectional view of collapsible cooler 3700 with magnet carrier 3702 inserted therein. Opening

3704 (FIG. 37) opens into a compartment 3802 formed between an outer covering 3804 and a thermally insulating layer 3806 of bottom wall 3808. In this embodiment, the only thing between magnets 3810 and a supporting surface upon which cooler 3700 rests is outer covering 3804. As a result, the magnetic attraction between magnets 3810 and the supporting surface is significantly increased. Because of the proximity between magnets 3810 and the supporting surface, magnets 3810 can be smaller, lighter, and/or weaker, and therefore less expensive.

Cooler 3700 can be used with or without magnet carrier 3702. If a user wants to immobilize cooler 3700 on a ferromagnetic surface, then magnet carrier 3702 is placed inside compartment 3802 to provide the desired magnetic attraction. Otherwise, magnet carrier 3702 can be removed, reducing the weight of cooler 3700 when the magnetic feature is not desired.

Figure 39:
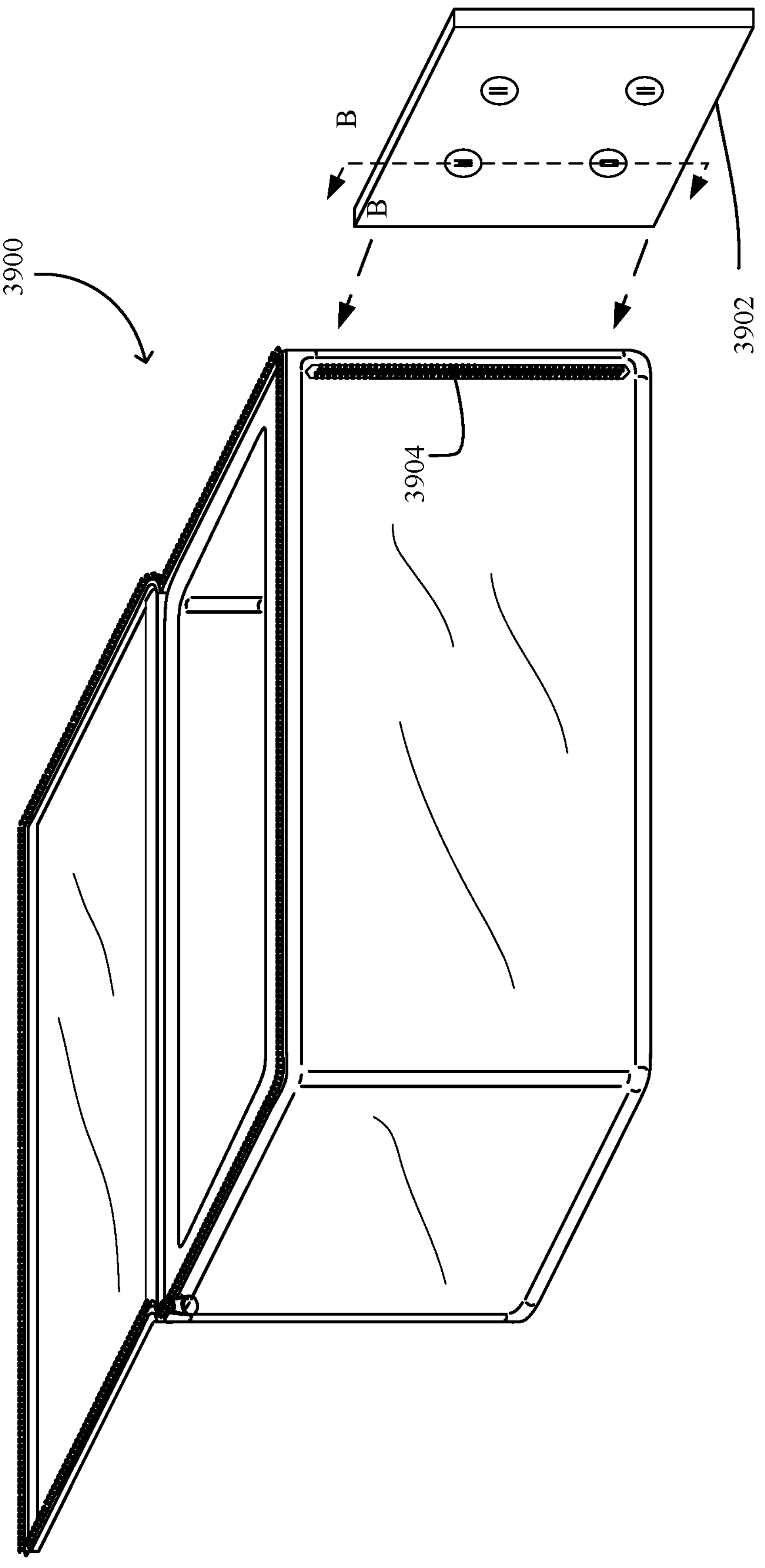
FIG. 39 is a perspective view of a collapsible cooler specifically adapted to accept a magnet carrier insert in a side wall of the collapsible cooler.

FIG. 39 is a perspective view of another collapsible cooler 3900 specifically adapted to accept a magnet carrier 3902 in a side wall of collapsible cooler. Cooler 3900 is substantially similar to cooler 3700, except that a zippered opening 3904 opens into a compartment in the sidewall of cooler 3900. This embodiment is useful in situations where it is desirable to magnetically engage cooler 3900 with a sidewall of an adjacent structure. For example, some pickup truck beds have a plastic liner that can interfere with the magnetic coupling to the floor of the pickup truck bed. However, positioning cooler 3900 adjacent the sidewall of the truck bed, so that the magnets of magnet carrier 3902 can magnetically couple with the sidewall of the truck bed, will prevent cooler 3900 from sliding around in the truck bed.

Figure 40:
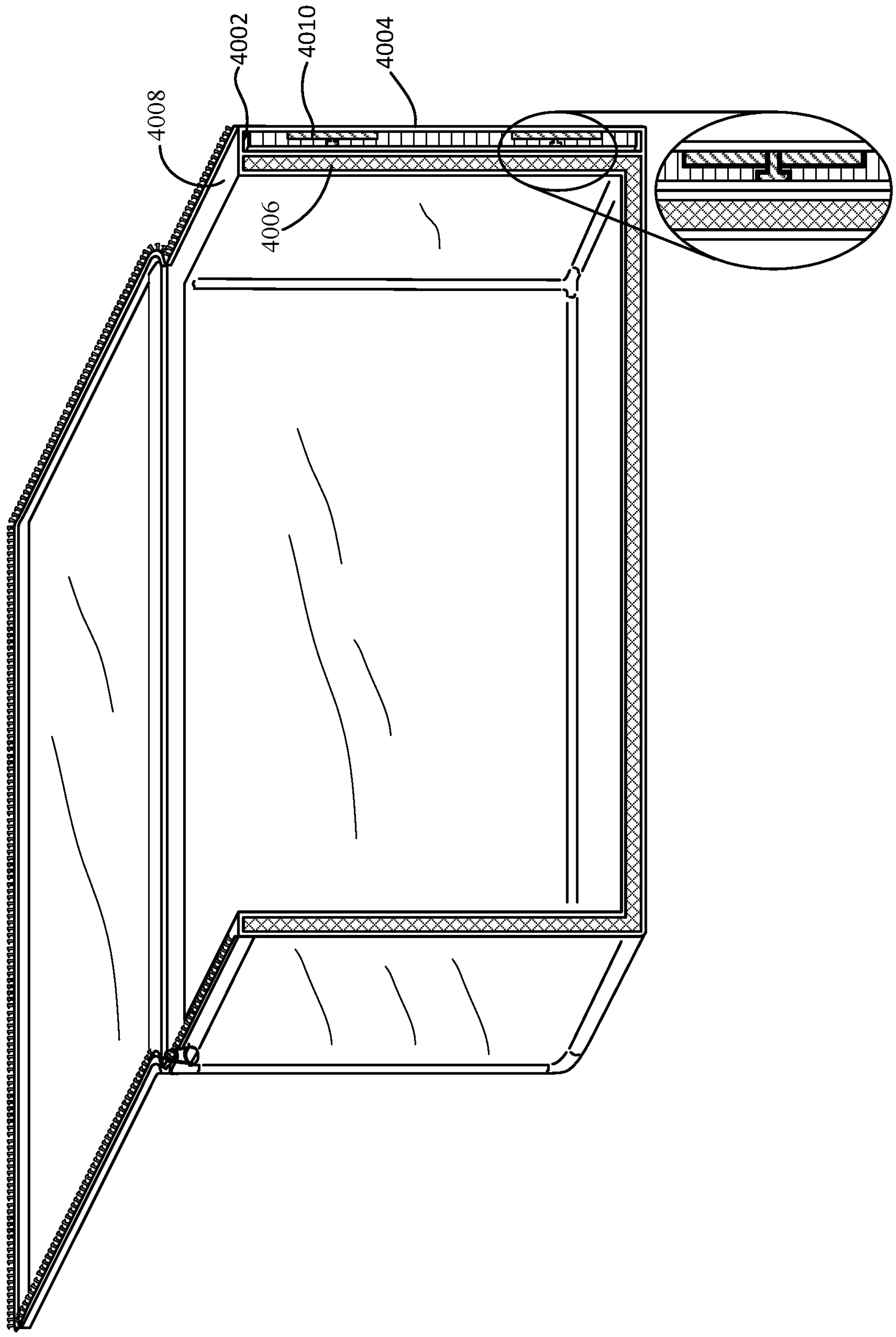
FIG. 40 is a cross-sectional view of the collapsible cooler of FIG. 39 with the magnet carrier of FIG. 39 inserted therein.

FIG. 40 is a cross-sectional view of collapsible cooler 3900 with magnet carrier 3902 inserted therein. Opening 3904 (FIG. 39) opens into a compartment 4002 formed between an outer covering 4004 and a thermally insulating layer 4006 of side wall 4008. In this embodiment, the only thing between magnets 4010 and an adjacent surface to which cooler 3900 can magnetically attach is outer covering 4004. As a result, the magnetic attraction between magnets 4010 and the adjacent surface is significantly increased. Because of the proximity between magnets 4010 and the adjacent surface, magnets 4010 can be smaller, lighter, and/or weaker, and therefore less expensive.

Similar to cooler 3700, cooler 3900 can be used with or without magnet carrier 3902. If a user wants to immobilize cooler 3900 by attaching to an adjacent ferromagnetic surface, then magnet carrier 3902 is placed inside compartment 4002 to provide the desired magnetic attraction. Otherwise, magnet carrier 3902 can be removed, reducing the weight of cooler 3900 when the magnetic feature is not desired.

Figure 41:
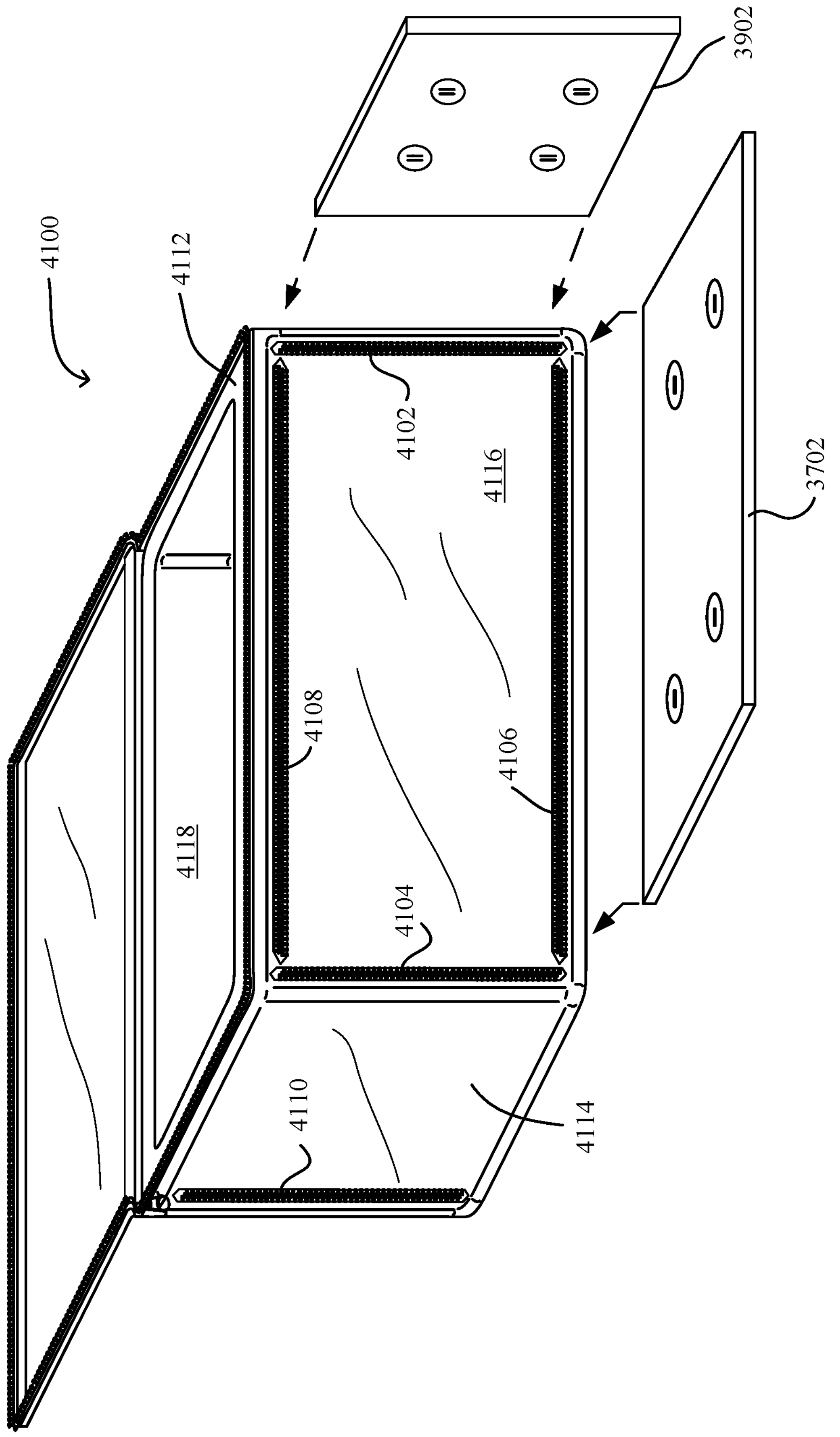
FIG. 41 is a perspective view of a collapsible cooler specifically adapted to accept a magnet carrier insert in any wall of the collapsible cooler.

FIG. 41 is a perspective view of a collapsible cooler 4100 specifically adapted to accept a plurality of magnet carriers 3702, 3902, each in any wall of collapsible cooler. In particular, opening 4102 facilitates the insertion of magnet carrier 3902 into a right sidewall 4112 of cooler 4100. Similarly, opening 4104 facilitates the insertion of magnet carrier 3902 into a left sidewall 4114 of cooler 4100. Opening 4106 facilitates the insertion of magnet carrier 3702 into a bottom wall (not visible) of cooler 4100. Opening 4108 facilitates the insertion of magnet carrier 3702 into a front sidewall 4116 of cooler 4100. Finally, a similar opening (not visible) in back sidewall 4118 facilitates the insertion of magnet carrier 3702 into back sidewall 4118 of cooler 4100. Cooler 4100 can be used with magnet carriers 3702, 3902 inserted in some (any), all, or none of right sidewall 4112, left sidewall 4114, bottom wall (not visible), front sidewall 4116, and back sidewall 4118.

Figure 42:
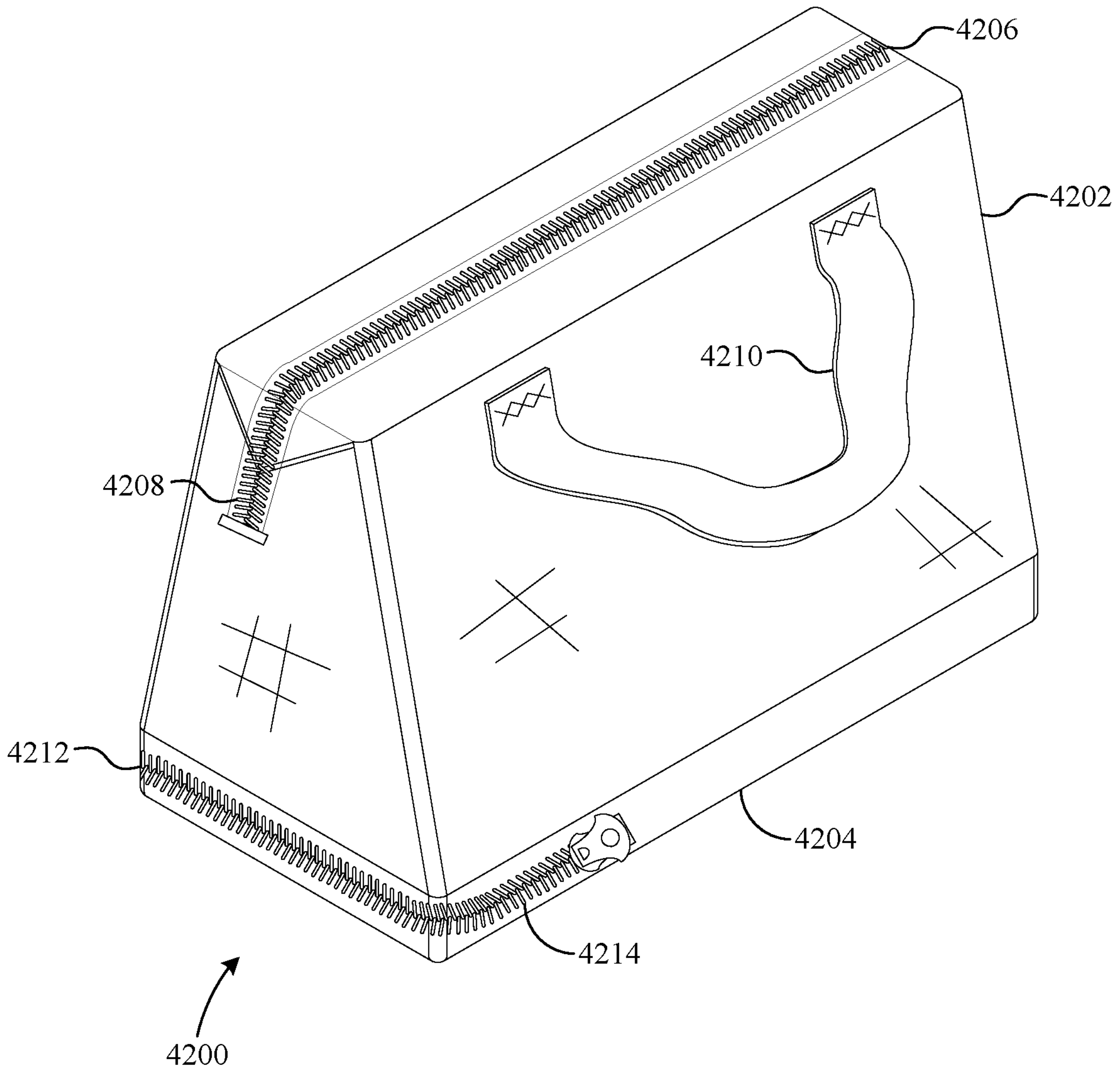
FIG. 42 is a perspective view of a cloth bag specifically adapted to accept a magnet carrier insert in a bottom compartment of the cloth bag.

FIG. 42 is a perspective view of a soft-sided carrying bag 4200 (e.g., a canvas tool carrier, a fabric/leather case, etc.) specifically adapted to accept a magnet carrier (not shown). Carrying bag 4200 includes an upper portion 4202 that defines a top compartment and a lower portion 4204 that defines a bottom compartment. The top compartment is adapted to store items (tools, clothes, books, etc.) and is accessible via a top opening 4206, which can be opened and closed using a top zipper 4208. A pair of handles 4210 (only one is visible) is fixed to the upper portion 4202 and facilitates the lifting and carrying of carrying bag 4200 by a user. The bottom compartment of lower portion 4204 is adapted to receive a magnet carrier 4300 (FIG. 43) through a bottom opening 4212, which can be opened or closed using a bottom zipper 4214. The adaptation of the bottom compartment includes, but is not limited to, sizing the bottom compartment to limit the movement of the magnetic carrier, providing features in the bottom compartment that complement features of the magnetic carrier, properly orienting the bottom compartment with respect to the top compartment, and so on.

In the example embodiment, carrying bag 4200 is made from a polyester fabric, but it can be made from cotton, hard or soft plastic, canvas, leather, or any other suitable material. Additionally, carrying bag 4200 can include any number of compartments and any number of pockets, dividers, or other storage features. In the example embodiment top opening 4206 and bottom opening 4212 are zippered openings, but alternate embodiments can include buttoned, hook-and-loop, or tied closures, or no closures at all. Additionally, while handles 4210 are cloth in the example embodiment, in alternate embodiments they can be plastic, wood, or any other suitable material. Handles 4210 can also be replaced and/or supplemented with a shoulder strap or omitted entirely.

Figure 43:
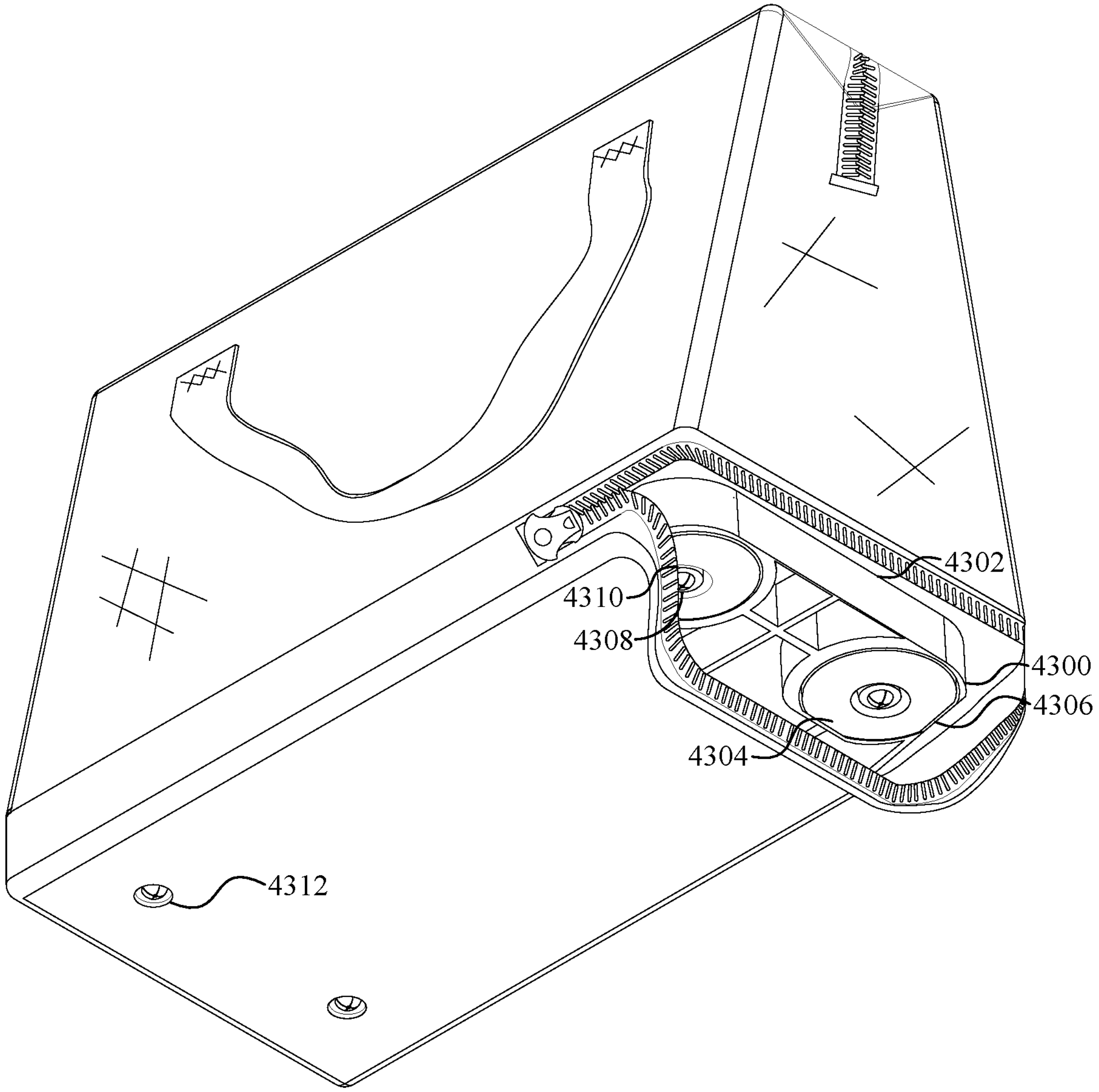
FIG. 43 is a perspective view of the cloth bag of FIG. 42 with the bottom compartment open and the magnet carrier insert visible inside.

FIG. 43 is a perspective view of carrying bag 4200 with bottom opening 4212 partially open and a magnet carrier 4300 visible therein. Magnet carrier 4300 includes a substrate 4302 adapted to receive a set of magnets 4304 within a set of depressions 4306. Magnets 4304 are fixed to substrate 4302 by a set of threaded fasteners 4308. Magnets 4304 each include a recess 4310 to receive the heads of threaded fasteners 4308, thereby preventing the heads of threaded fasteners 4308 from rubbing the bottom of carrying bag 4200 and causing damage. Lower portion 4204 of carrying bag 4200 defines a set of holes 4312 into bottom compartment, which facilitate the passage of alternate threaded fasteners, which will be described below. The alternate threaded fasteners can include additional structures, for example suction cups or rubber feet to facilitate mounting carrying bag 4200 to a non-ferromagnetic surface.

Figure 44:
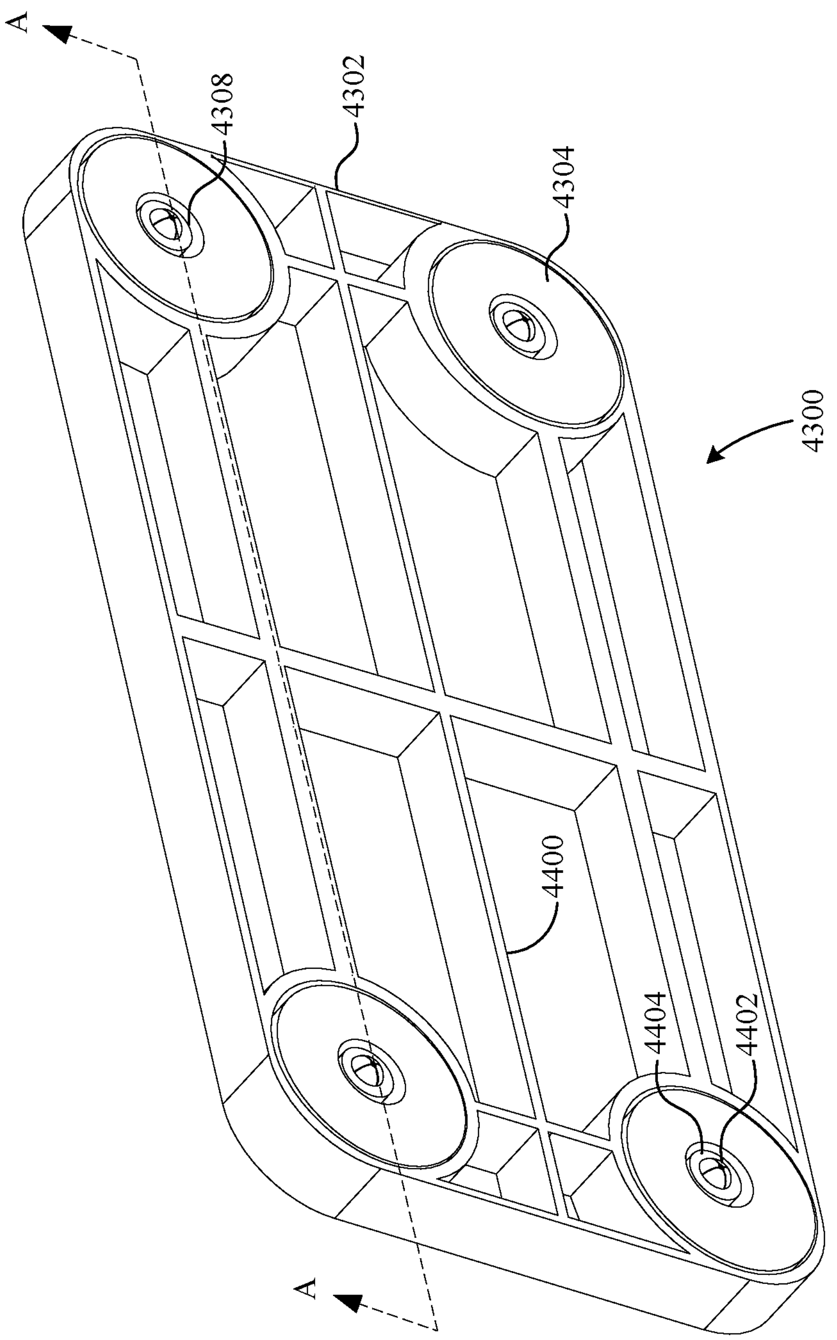
FIG. 44 is a perspective view of the magnet carrier insert of FIG. 43.

FIG. 44 is a bottom perspective view of magnet carrier 4300, including substrate 4302, magnets 4304, and threaded fasteners 4308. Substrate 4302 includes ridges 4400 to provide structural support to substrate 4302. Threaded fasteners 4308 each include a screw 4402 and a washer 4404. The combination of screw 4402, washer 4404, and depressions 4306 fixes each of magnets 4304 to substrate 4302 without allowing them to slip or become displaced. It is an advantage that magnet carrier 4300 can be used in any of magnetic coolers 3200 and 3500 or collapsible coolers 3700, 3900, and 4100, as well as in carrying bag 4200.

Figure 45:
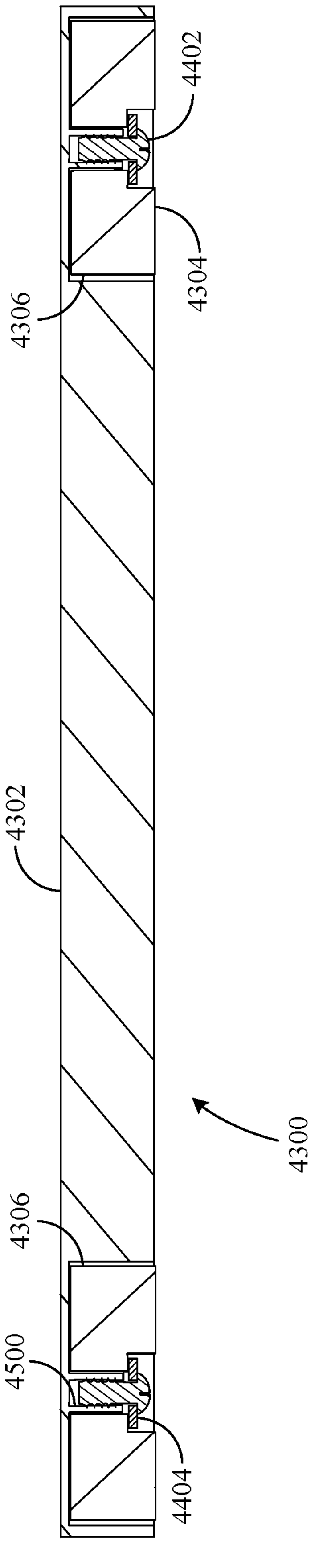
FIG. 45 is a sectional view of the magnet carrier insert of FIG. 44 taken along line A-A.

FIG. 45 is a sectional view of magnet carrier 4300 along line A-A of FIG. 44, showing substrate 4302, magnets 4304, screws 4402 and washers 4404. Substrate 4302 includes a set of threaded projections 4500 formed inside depressions 4306 and adapted to receive screws 4402. Thus, FIG. 45 shows how magnets 4304 are fixed to substrate 4302.

Figure 46:
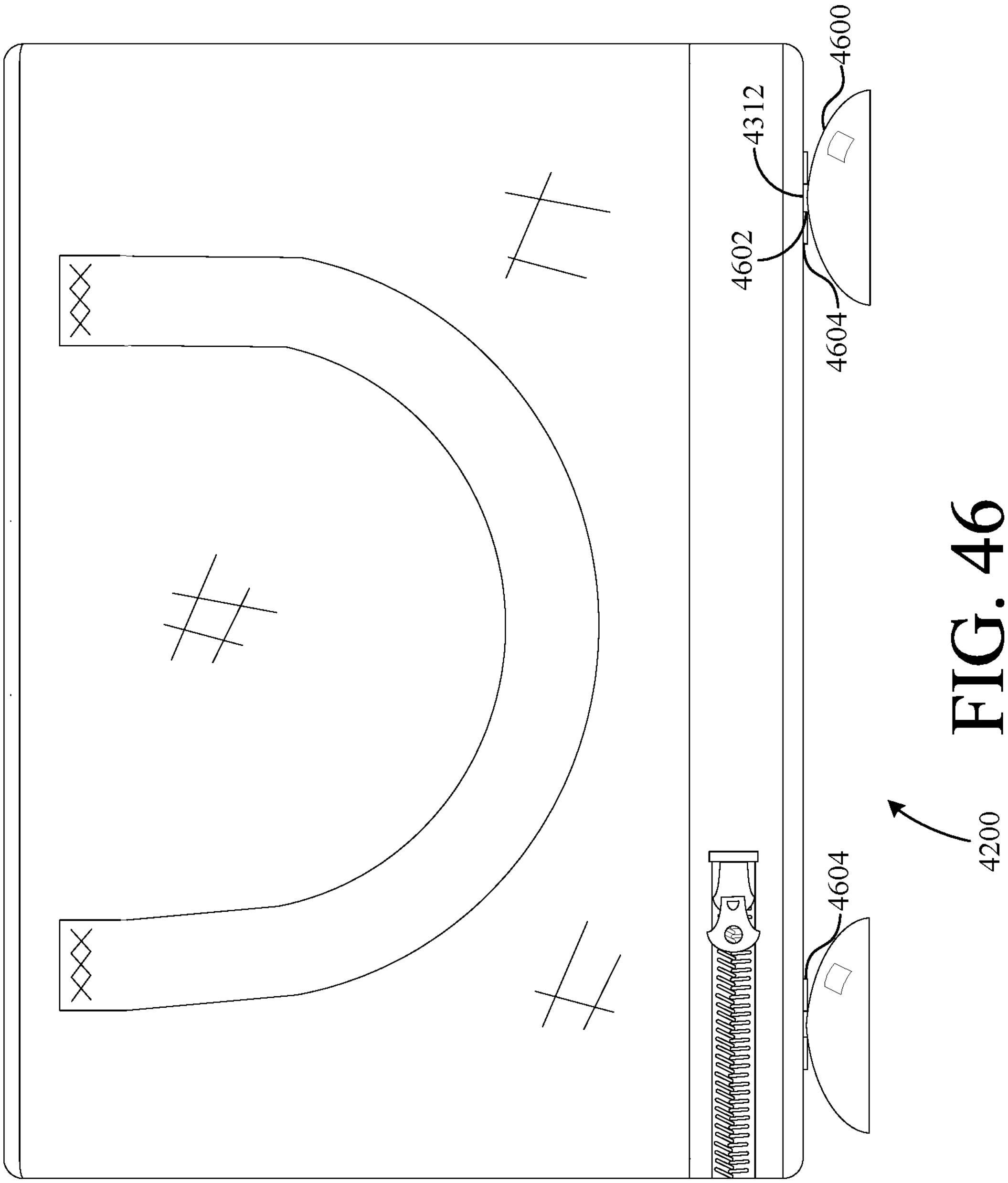
FIG. 46 is a side view of the cloth bag from FIG. 42 with suction cups attached to the bottom.

FIG. 46 is a side view of carrying bag 4200, including a set of suction cups 4600 being substituted for threaded fasteners 4308. Suctions cups 4600 each include a screw 4602 extending upwards through holes 4312 and into magnetic carrier 4300. Plate washers 4604 prevent suction cups 4600 from being drawn into depressions 4500 of substrate 4302. Suction cups 4600 not only provide an alternate way to mount carrying bag 4200 to flat surfaces (e.g., non-ferromagnetic surfaces such as fiberglass, etc.), they also retain magnets 4304 (FIG. 47) in substrate 4302. Alternatively, magnets 4304 can be omitted when suction cups 4600 are used, thereby lessening the weight of carrying bag 4200.

Figure 47:
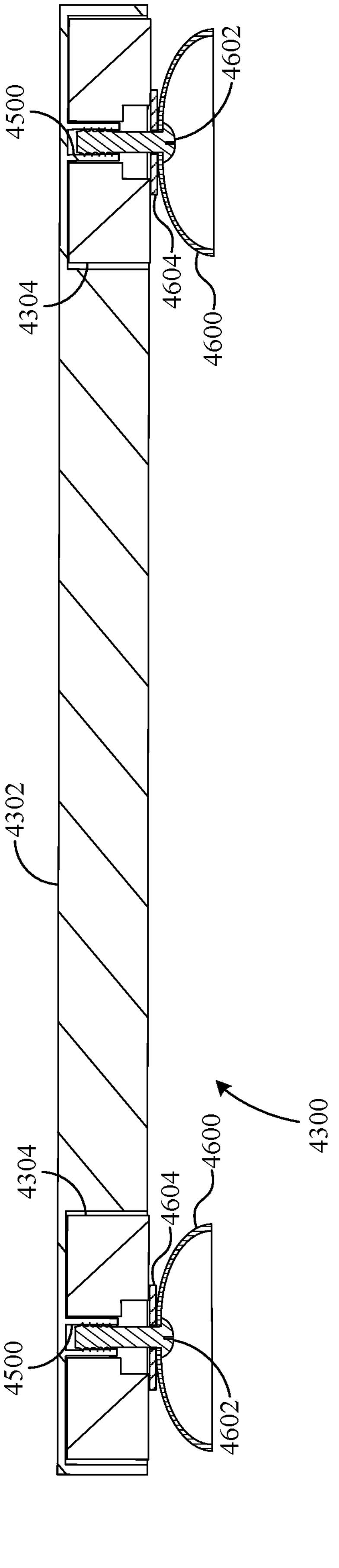
FIG. 47 is a sectional view of the magnet carrier insert from FIG. 44 taken along line A-A with suction cups attached to the bottom.

FIG. 47 is a sectional view of magnet carrier 4300 along line A-A from FIG. 44, with screws 4402 and washers 4404 replaced with suction cups 4600. Lower portion 4204 of carrying bag 4200 is not shown, so as not to unnecessarily obscure the drawing. Screws 4602 of suction cups 4600 extend upward into threaded projections 4500 of substrate 4302. Plate washers 4604 eliminate the need for washers 4404, because plate washers 4604 also hold magnets 4304 in place. If rubber feet or alternate attachment devices are used in place of suction cups 4600, plate washers 4604 will still maintain the position of magnets 4304 within depressions 4306.

The description of particular embodiments of the present invention is now complete. Many of the described features may be substituted, altered or omitted without departing from the scope of the invention. For example, different numbers, shapes and locations of magnets may be substituted for those shown in the example embodiments, including the disclosed magnet carrier inserts. As another example, the invention can be used in combination with alternate cooler design details (e.g., sizes, shapes, handles, lids, etc.). As yet another example, the magnetic trays disclosed may be altered (e.g., by making one of the side walls taller, alternate straps and/or points of attachment) to facilitate more secure attachment of differently shaped containers. As yet another example, alternate fastening means (e.g., hook-and-loop fasteners, mechanical fasteners, etc. can be substituted for suction cups 2904. As yet another example, the embodiments described in combination with magnet carriers include pliable sidewalls, but the magnet carriers can be used in combination with coolers/warmers with rigid walls. These and other deviations from the particular embodiments shown will be apparent to those skilled in the art, particularly in view of the foregoing disclosure.

I claim:

1. A carrying bag, comprising:

a first compartment including a bottom wall, a plurality of side walls, and a first opening, said first opening disposed at a top of said first compartment to facilitate insertion and removal of items from said first compartment;

a carrying handle fixed to said first compartment to facilitate lifting and carrying of said carrying bag;

a magnetic carrier insert, including a substrate and a set of discrete, annular magnets fixed to said substrate, said discrete, annular magnets spaced apart from one another; and a second compartment, including a second opening and a first wall, said second opening configured to facilitate insertion of said magnetic carrier insert into said second compartment and removal of said magnetic carrier insert from said second compartment through said second opening; and wherein said bottom wall of said first compartment forms a top wall of said second compartment;

said first wall of said second compartment forms a bottom wall of said carrying bag;

said magnetic carrier insert is disposed within said second compartment between said bottom wall of said first compartment and said first wall of said second compartment;

said second compartment is sized to accept said magnetic carrier insert within said second compartment and disposed to facilitate engagement of said magnetic carrier insert with a ferromagnetic surface outside of said carrying bag through the first wall of said second compartment; and said carrying bag can be lifted off of said ferromagnetic surface by said carrying handle, to disengage said magnetic carrier insert from said ferromagnetic surface.

2. The carrying bag of claim 1, wherein:

said second compartment is substantially rectangular and has a first length and a second length;

said first length of said second compartment is greater than said second length of said second compartment; and said first length of said second compartment is greater than the length of said second opening.

3. The carrying bag of claim 2, wherein said second compartment includes a zipper disposed to selectively open and close said second opening.

4. The carrying bag of claim 1, wherein said second compartment includes a zipper facilitating opening and closing of said second opening.

5. The carrying bag of claim 1, wherein said first wall is pliable.

6. The carrying bag of claim 5, wherein said first wall is formed from polyester fabric.

7. The carrying bag of claim 1, further comprising:

a plurality of apertures through said first wall; and a plurality of suction cups mechanically engaging said magnetic carrier insert through said apertures and from outside of said carrying bag while said magnet carrier insert is disposed in said second compartment.

8. The carrying bag of claim 1, wherein said substrate is rigid.

9. The carrying bag of claim 8, wherein said substrate includes at least one rib stiffener.

10. The carrying bag of claim 8, wherein:

said substrate includes a set of magnet seats;

each magnet of said set of discrete magnets is disposed in a respective one of said magnet seats of said set of magnet seats; and each magnet seat of said set of magnet seats is spaced apart from one another.

11. The carrying bag of claim 1, wherein said substrate has substantially a same shape as a bottom of said carrying bag.

12. The carrying bag of claim 1, wherein said substrate and a bottom of said carrying bag are substantially rectangular.

13. The carrying bag of claim 1, wherein:

said substrate is rigid;

each discrete, annular magnet of said set of discrete, annular magnets is fixed in a spaced apart relationship by said rigid substrate;

each discrete, annular magnet of said set of discrete, annular magnets includes a respective magnetic shunt; and when said magnetic carrier insert is disposed in said second compartment, at least a portion of said substrate being disposed between said set of discrete magnets and said bottom wall, and bottom surfaces of said magnets of said set of discrete magnets are exposed by said substrate.

14. The carrying bag of claim 1, wherein each discrete, annular magnet of said set of discrete, annular magnets includes a respective shunt.

15. The carrying case of claim 1, wherein:

each magnet of said set of discrete magnets includes a respective shunt; and bottom surfaces of said magnets of said set of discrete magnets remain exposed by said substrate and said shunts.

16. The carrying bag of claim 1, wherein:

said second compartment includes two long sides and two short sides; and said second opening is formed in one of said short sides.

* * * * *